US010467550B1

(12) United States Patent
Gupta et al.

(10) Patent No.: US 10,467,550 B1
(45) Date of Patent: *Nov. 5, 2019

(54) OPERATIONAL BUSINESS INTELLIGENCE MEASUREMENT AND LEARNING SYSTEM

(71) Applicant: OpsVeda, Inc., Sunnyvale, CA (US)

(72) Inventors: Sanjiv Gupta, San Jose, CA (US);
Abhishek Bhoot, Cupertino, CA (US);
Dinesh Somani, San Jose, CA (US)

(*) Notice: Subject to any disclaimer, the term of this patent is extended or adjusted under 35 U.S.C. 154(b) by 356 days.

This patent is subject to a terminal disclaimer.

(21) Appl. No.: 15/582,643

(22) Filed: Apr. 29, 2017

Related U.S. Application Data

(63) Continuation-in-part of application No. 14/328,123, filed on Jul. 10, 2014, now Pat. No. 9,639,595.

(60) Provisional application No. 61/845,916, filed on Jul. 12, 2013.

(51) Int. Cl.
| | |
|---|---|
| *G06N 20/00* | (2019.01) |
| *G06F 7/02* | (2006.01) |
| *G06N 5/02* | (2006.01) |
| *G06Q 30/06* | (2012.01) |
| *G06Q 30/02* | (2012.01) |
| *G06F 16/22* | (2019.01) |

(52) U.S. Cl.
CPC ............ *G06N 20/00* (2019.01); *G06F 7/023* (2013.01); *G06F 16/22* (2019.01); *G06N 5/02* (2013.01); *G06Q 30/02* (2013.01); *G06Q 30/0633* (2013.01)

(58) Field of Classification Search
CPC .......................... G06F 30/0633; G06N 20/00
USPC .......................................................... 707/600
See application file for complete search history.

(56) References Cited

U.S. PATENT DOCUMENTS

| | | | | |
|---|---|---|---|---|
| 6,216,252 | B1 * | 4/2001 | Dangelo | G01R 31/31704 714/E11.167 |
| 7,197,474 | B1 * | 3/2007 | Kitts | G06Q 30/02 705/7.31 |
| 7,617,159 | B1 * | 11/2009 | Donner | G06Q 10/02 705/67 |
| 7,647,250 | B2 * | 1/2010 | Abo-Hasna | G06Q 10/083 705/1.1 |
| 8,001,185 | B2 * | 8/2011 | Nicholls | G06Q 10/06311 709/204 |
| 8,165,993 | B2 * | 4/2012 | Broda | G06F 16/252 707/634 |
| 8,515,902 | B2 * | 8/2013 | Savage | G06F 16/93 707/608 |

(Continued)

*Primary Examiner* — Sheree N Brown
(74) *Attorney, Agent, or Firm* — Stephen E. Zweig

(57) ABSTRACT

An automated method of detecting patterns corresponding to a plurality of real world business measures corresponding to a plurality of business processes, assessing the next instance of such measures and related business attributes, and describing the next best action to optimize business outcomes based upon a plurality of control parameters. The system operates by continuously abstracting input data from a process agnostic data system (PADS) that links real-world things, activities and processes, into a process agnostic measure store (PAMS) configured to accept measures data without limitation as to a specific process or a plurality of processes. The machine self-learning system can then automatically project a business outcome, suggest most relevant attributes that can impact the said outcome, and suggest actions to change such outcome(s).

19 Claims, 31 Drawing Sheets

(56) References Cited

U.S. PATENT DOCUMENTS

| | | | | |
|---|---|---|---|---|
| 9,473,532 B2* | 10/2016 | Pearl | ........................ | G06F 21/60 |
| 2003/0084053 A1* | 5/2003 | Govrin | ................... | G06Q 10/10 |
| 2007/0021992 A1* | 1/2007 | Konakalla | .............. | G06Q 10/04 |
| | | | | 705/7.28 |
| 2010/0251264 A1* | 9/2010 | McGuire | ............ | G06Q 10/0637 |
| | | | | 719/317 |
| 2012/0124584 A1* | 5/2012 | Addala | ................... | G06F 9/542 |
| | | | | 718/102 |
| 2012/0185425 A1* | 7/2012 | Reeves | ................. | G06F 16/283 |
| | | | | 707/600 |
| 2014/0018951 A1* | 1/2014 | Linton | .................... | G06N 5/02 |
| | | | | 700/105 |

\* cited by examiner

Figure 19

N Attributes/Serial Number
N Events/Serial Number

| | PAMS Attributes 1902 |
|---|---|
| PK | SERIAL NUMBER |
| PK | ATTRIBUTE |
| PK | VALID FROM |
| | ATTRIBUTE VALUE |
| | IDENTIFIER TYPE |
| | VALID TO |
| | Additional Detail |

| | PAMS Measures 1900 |
|---|---|
| PK | MEASURE |
| PK | MEASURE TYPE |
| PK | VALID FROM |
| PK | SERIAL NUMBER |
| PK | MEASURE COUNTER |
| | MEASURE DATE |
| | MEASURE TIME |
| | PROCESS |
| | FINAL MEASURE |
| | QUANTITY |
| | UOM |
| | AMOUNT |
| | CURRENCY |
| | AGGREGATE QUANTITY |
| | AGGREGATE AMOUNT |
| | OBJECT QUANITITY |
| | OBJECT UOM |
| | OBJECT AMOUNT |
| | LOCATION FROM |
| | LOCATION TO |
| | MEASURE END DATE |
| | MEASURE END TIME |
| | VALID TO |
| | DELETED |
| | IGNORE |
| | Additional Detail... |

OPERATIONAL BUSINESS INTELLIGENCE MEASUREMENT AND LEARNING SYSTEM

CROSS REFERENCE TO RELATED APPLICATIONS

This application is a continuation in part of U.S. patent application Ser. No. 14/328,123, "Operational Business Intelligence System and Method", filed Jul. 10, 2014, now U.S. Pat. No. 9,639,595 issued May 2, 2017; application Ser. No. 14/328,123 claimed the priority benefit of U.S. provisional patent application 61/845,916 "Operational Business Intelligence System and Method", filed Jul. 12, 2013; the entire contents of all of these applications are incorporated herein by reference.

BACKGROUND OF THE INVENTION

Field of the Invention

This invention is in the field of computerized systems and methods for managing and measuring complex processes, such as complex business processes.

Description of the Related Art

Modern corporations and other organizations are often highly complex entities. These organizations often carry out a variety of different processes (e.g. business processes) that may require input from different departments or divisions (e.g. sales, purchasing, planning, manufacturing, finance, etc.). Indeed business organizations often operate in a global marketplace. Such organizations have a need to process a huge amount of operational data, often on an around the clock basis, and often attempt to meet these needs using various automated systems, often referred to as online transaction processing (OLTP) type systems.

Additionally, modern management techniques have found that it is important to have a high degree of operational and process level co-operation between various groups, such as buyers and sellers. However along with such high level of cooperation comes a heightened susceptibility to economic, political and environmental disruptions. Here various types of online analytical processing systems (OLAP) systems have been developed to analyze data according to multiple perspectives.

It has become increasingly important to react quickly to changes, and not be hindered by problems with data flow and management across internal business process boundaries or silos. Here, however, there is a problem because prior art OLTP systems typically do not interact well, if at all, with prior art OLAP systems.

To meet these needs various prior art enterprise resource planning (ERP) computer systems and software applications have been developed by companies such as SAP AG, Oracle, IBM, and the like. These vendors, often assisted by various third-party application packages typically provide computer application software suites intended to serve the needs of these various organizational departments and divisions for business processing and other purposes. However these prior art solutions tend to be inflexible and difficult and expensive to implement.

A new class of OLAP type business intelligence (BI) applications, typified by software vendors such as Tableau, QlikView, Birst, and the like have attempted to address some of the shortcomings of traditional BI tools by offering "self-service". With these tools the business user directly imports the operational data into the tool and runs their own reporting and analysis. Nonetheless there remains a need for further improvements in business intelligence art.

In general, particularly for business applications, prior art database approaches can be considered to be either online transaction processing (OLTP) databases, or online analytic processing databases (OLAP). The former are often used for more routine operational use, and can operate very quickly, such as on a real-time basis. By contrast the later, such as Business Intelligence (BI), are often used more by managers and executives for longer term planning purposes and are not intended for rapid operation. The two types of databases are generally quite incompatible, thus keeping organizational data into different silos, and making organizational management inefficient.

For both such systems, computing times can be improved by use of various in-memory computing techniques. These are represented by the SAP HANA system, which is described in the 2011 white paper: 50 110 843 (12/01) "*SAP HANA™ for Next-Generation Business Applications and Real-Time Analytics*".

Prior work these areas also includes Abo-Hasna (U.S. Pat. No. 7,647,250), Addala (US patent publication 20120124584), Beckett (PCT/US2003/016967), McGuire (US patent application 20100251264), and Audimoolam (PCT/US2003/015538).

There are other problems as well. Larger organizations, which may have to support of thousands of products being sold to thousands of customers across hundreds of geographies, produce large amounts of data. This data typically originates from many parts of the organization, and this data is often used to support of thousands of products, being sold to thousands of customers, across hundreds of different geographical locations. This data will typically be provided and used by thousands of personnel, both internal and external to the organization.

At the same time, in order to manage the organization, many different types of time-critical decisions also have to be made. These decisions are often based upon a plurality of different business measures, where various types of data are analyzed on a time (per day, per week, per month, per quarter, or per year basis). If these business measures are out of date or inaccurate, problems may result.

These different business measures are often computed by a variety of different computer systems, as well as by a mix of manual and automated processes. As a result, these business measures are often produced by a complex and often unsatisfactory process that may rarely, if ever, bring all of the relevant measures together in a timely manner.

Thus, particularly for complex organizations and processes, prior art business measurement techniques often do not output high quality measurements on a real-time (or quick enough) basis. These inadequate business measures lead to bad business decisions, creating organizational inefficiencies, lost revenues, and other strategic failures.

Thus improved methods to produce high quality and timely (e.g. as close to real-time as possible) business measures are thus of high practical utility.

BRIEF SUMMARY OF THE INVENTION

In some embodiments, the present invention may be viewed as teaching improved methods that are highly useful for automated predictive analysis, such as machine self-learning assisted predictive analysis. As will be discussed, the invention teaches a new type of process agnostic measure store (PAMS), as well as an Experience Knowledge Database (EKDB) system that works with this PAMS store to facilitate such machine self-learning assisted predictive analysis.

In particular, in some embodiments, the invention teaches that applicant's earlier process agnostic database system (PADS), previously disclosed in parent application Ser. No. 14/328,123, can be used to provide information to the present invention's process agnostic measure store (PAMS).

The PADS system continuously updates the PAMS by feeding it a plurality of business events occurring across a connected supply chain of things, activities and processes. The PADS system uses raw data which may have various changes and subsequent updates. This makes it harder and slower to use the PADS system for accurate business measurements. By contrast, the PAMS system generally holds time adjusted data assigning time validity, making it a more suitable source for accurate business measurements at a given historical time window. However unlike prior art, where raw data was often only cleaned when a particular measurement or analysis was done, the PAMS system is constantly updated with corrected data, and can be configured to hold a vast amount of real-time corrected and time adjusted data. Thus the invention's PAMS techniques are an excellent resource for quickly computing a broad variety of different business measures.

In a further refinement, which will also be discussed, the invention may employ various machine learning techniques (such as the EKDB methods to be discussed), and utilize statistical techniques such as predictive and associative modeling, regression analysis, data mining and other techniques, to analyze data to make predictions about future of such business measures.

The invention is also based, in part, on the insight that it would be useful to automate computation and storage of business measures and key performance indicators (KPI's) in a manner that facilitates high speed production of business insights. In particular, the invention's PAMS (and EKDB methods) enables faster (e.g. real-time or near real-time) analysis of time based business measures. The invention can learn from experience, thus providing more astute measurements as it is used.

Applicant's PADS methods are based, in part, on the insight that it would be useful to develop improved data structures and methods that would allow a single database to simultaneously implement both online transaction processing (OLAP) and online analytic processing (OLTP). In particular, the present invention is based on the insight that it would be useful to provide a system that can take online transaction processing data (OLTP type data), and determine the impact of such data at a higher business level of analysis (e.g. give a OLAP level of understanding), at real time speeds, or close to real time speeds as new data becomes available.

Although the various systems and methods described herein can be used by many different types of organizations for many different purposes, these systems and methods can be particularly useful for helping businesses manage complex business processes across multiple locations, vendors, and customers. Thus many of the examples disclosed herein are focused on business, such as large businesses, which may span different countries, as well as their various business goods (e.g. items for sale, raw materials), services, and their various business activities and processes.

In some embodiments, the systems and methods disclosed herein can be used to assess the impact of internal events, external events and anticipated but missing events (e.g. various types of exceptions) on various business processes and transactions. The impact can be determined in real-time, and can be based on rules that can be updated as business needs change.

As previously discussed, these PADS methods are based, in part, on the insight that present business OLAP like intelligence (BI) systems have various limitations, such as slow speed, and general lack of responsiveness to data obtained from online transaction processing (OLTP) systems. It is thus desirable to produce an improved system that can help overcome these limitations. These limitations include general needs for data models that are designed for specific business processes, as well as general requirements for data analysis tools that often require expensive customization and programming in order to operate efficiently.

Thus prior art systems that were optimized for transaction processing (e.g. high speed OLTP systems) were often not well suited for end-to-end operational reporting, and vice versa. That is, prior art end-to-end operational (OLAP) data models often did not automatically react to changes in upstream events, and often failed to integrate data from external events at all.

These prior art end-to end operational data systems tended to operate on more of a "take-a-snapshot-and-analyze" type basis, in which data tended to be analyzed in batches depending on system schedules, rather than external events. Thus prior art end-to-end operational data systems tended to suffer from relatively slow (not real-time) processing speeds, and often required a substantial amount of time to react to events.

These PADS methods are thus based, in part, on the insight that it would be desirable to produce an improved business intelligence system that could incorporate the high speeds of transaction processing (OLTP) with the deep insights that can come from end-to-end operational reporting (OLAP).

The PADS methods are further based, in part, on the insight that due to advances in computing technology, methods of analyzing vast data stores in certain formats, such as columnar databases, are now feasible. This is due to techniques such as query parallelization and in-memory computing.

The PADs methods are further based, in part, on the insight that these advances in computing technology can thus be used to produce an improved business intelligence system that is both "fast", can make use of useful transaction processing data, and yet at the same time can produce deep insights into the impact of various exceptions on various business processes.

To do this, in as an important aspect of the present invention, the system ingests current business process objects and activities, in real time, into a process-agnostic data store (PADS) and can in some embodiments analyze the events as they occur or fail to occur even without resource to the presently disclosed PAMS and EKDB methods. Thus the underlying PADS component helps recognize anomalies and exceptions, and also recognizes patterns in current and past process execution data, monitors Key Performance Indicators (KPIs) and trends thereof. The PADS system, with or without the PAMS and EKDB methods, can use these methods to predict impending business issues on a continuous basis.

In a typical enterprise system landscape, the OLTP type input data stream never stops. The data may be streamed in from the business' own or the business partners' systems that may span the globe and operate around the clock.

The PADS system makes use of this data. The PADS system takes the raw business data as it streams in, parses it, and incorporates it into the process-agnostic data store (PADS) on a continuous basis. However unlike prior art OLTP systems, in some embodiments the PADS system can then immediately perform a deeper OLAP type analysis to determine the broader business impact of this data. The PADS system thus overcomes a critical shortcoming of prior art "take-a-snapshot-and-analyze" type BI (OLAP) methods. The PADS system reacts quickly (in real time as data from various events are received), yet also, again on a real-time basis, can perform a deep and comprehensive (OLAP type) analysis of the impact of such events on even remotely connected business processes.

The PADS system is also based, in part, on the insight that such objectives can be facilitated by using a computerized method and system that automatically analyzes the impact of new data immediately as it arrives. In particular, it is useful to adopt a computer processor and software mediated processing scheme that may have two distinct parts.

The first part may use various criteria to automatically analyze the input data (often for various goods (e.g. things) and activities) as the data is received. This analysis includes determining linkages (if any) between the various goods (things) and activities described by the input data, and other goods (things), activities and processes that the organization wishes to monitor. This analyzed data is then immediately stored as one or more computer memory objects ("objects") in the process agnostic data store (PADS) database.

The second part is then, preferably as rapidly as possible, and preferably in real-time or as close to real time as possible, automatically determine if there are any exceptions or abnormalities regarding the various goods (things) and activities in the input data, and if so use the linkages between the goods (things) and activities described by the input data, and other goods (things), activities, and processes that the organization wishes to monitor, and various rules to (again in real time or close to real time) estimate the impact these exceptions have on other processes. There is no limitation as to the depth of the analysis, or how large or complex the process may be.

Thus, for example, if incoming data indicates that a supplier or customer has just gone into chapter 7 bankruptcy, the system can immediately and automatically determine what specific processes may be effected (e.g. which payments to put on hold, for which products to initiate alternative sourcing activities, which products to put on back order, etc.). As another example, if incoming data indicates that a particular product (thing) has experienced shipping delays due to bad weather, the system can both immediately determine the impact on various business processes, and also use a historical database of shipping delays to estimate how long the various business processes are likely to be influenced by this delay.

Although the PADS system is quite useful, the invention is also based, in part, on the insight that further refinements to the invention's PADS system would be desirable. In particular although the invention's PADS system does an excellent job at reporting on the current state of the various business processes, many useful and frequently used business measurements require historical data, and historical corrections to this data (e.g. time-corrected historical data).

In particular, accurate business measurements are typically based on time-corrected historical data. For example, sales orders are often adjusted as a function of time (delayed orders come in, other orders are canceled), and thus a snapshot of sales orders as of any specific date in the past may not be accurate if these orders were then adjusted at a different date. However it is time and processor inefficient if, for any particular measure, PADS database has to be queried many different times in order to detect any such adjustments (time-corrections).

Note that, unless otherwise specified, in this disclosure the term "measure" is generally used to denote measurements, in particular business measurements, based on time-corrected historical data. Thus as can be seen, for nearly any measurement, in order to assemble the necessary time-corrected historical data for this measurement, the PADS database would have to be queried many times (e.g. at least throughout the validity time period of the desired measurements) in order to insure that any time-corrections to the historical data in the PADS database would be properly applied.

Put alternatively, the invention is based, in part, on the insight that what is needed is a process agnostic way of storing accurate or corrected enterprise business measures. In some embodiments, this can be addressed by automatically computing and storing business measures and corresponding business attributes/activities/quantities by drawing (e.g. continually feeding from) from a PADS database, preferably at a rate that is at or near the same rate that the PADS database is updated.

This approach, which inherits the process agnostic aspects of the PADS database, allows for measures (e.g. business measures) to be uniformly stored and accessed irrespective of process. That is, the (time-corrected or otherwise more accurate) measures can be uniformly stored and accessed irrespective of whether the data belongs to different processes such as Sales Orders, Purchase Orders, Production Orders, Shipping documents, Invoices, Plant Maintenance orders, and the like.

Accordingly, in a further embodiment of the invention described herein, data (e.g. date, quantity/amount, and location type data) and attributes are, irrespective of process, continually selected from the PADS system according to various measures rules, "cleaned up", and stored in a new type of process agnostic PAMS (Process Agnostic Measurement Store) database.

This PAMS database type system and method transforms selected PADS data into an alternative time-corrected data storage format. The PAMS system employs validity date based methods configured to improve the time and computational efficiency of fetching and analyzing the time-corrected raw data that impact most business measures, without the need to query the entire corresponding PADS process data storage database throughout the range of dates over which the measurement in question is valid.

As will be discussed, this PAMS database can then be used, optionally in conjunction with a machine self-learning system and various pre-defined and machine learning rules, to quickly and automatically analyze time-corrected historical data, and determine various measurements, without the need to query the full relevant time series data stored in the PADS system.

Experience Knowledge Database (EKDB) systems and methods: In another embodiment, the invention may also be configured to analyze for certain measures or trends, or find patterns in these measures or trends, either manually or by a combination of manual and automated process, by use of an optional Experience Knowledge Database (EKDB).

In some embodiments, these EKDB methods can be used to train the system, using machine learning methods, to automatically learn if a given data attribute can provide a statistically meaningful explanation for the variations in the business measure that occurs over the cross-section of business objects.

Here data, such as a cross-sectional data series for the business measure for a given date, along with the set of associated data attributes can be retrieved from the PAMS store. To prevent overload with less irrelevant information, some of this information may optionally be pruned or deweighted.

The system can then use an initial probability distribution to fit the original data series. This probability distribution may identify the data's various distributional properties, and as needed data outliers can be removed. Appropriate probability values (p-values) for rejecting or not rejecting various hypothesis; how much autocorrelation or cross-correlation can be ignored as too small, and the like can also be selected.

Such statistical learning models may require certain data transformations to meet the model's assumptions. Steps to ensure normality of data, stationarity of residuals, and so on may be taken. If, after fitting a model, the results indicate a lack of suitable fit, either automatically, or with manual assistance, different data transformations, possibly motivated by previous failures, may be attempted and the fit to the underlying model can be reassessed. Often this process of data-transformation, model fitting, model validation and parameter tweaking is done in an iterative manner.

Additionally, as described in more detail herein, various statistical measures, for example Cook's Distance or High Influence points, can be used to identify data outliers, and a heuristic-driven cutoff level can be used to eliminate these outliers. To assist in automated machine learning methods, this process can be trained or seeded using prior experience lessons and examples, which can be retrieved from the invention's EKDB store. Some users may have different preferences, and in some embodiments, the system can be "trained" or "personalized" according to user preference. This training or seeding information, along with optional user preference data, can then also be saved in the EKDB store for future use as desired. These steps can thus create a business measure data series to analyze, and a set of data attributes to use for this analysis.

The data series may further require a sequence of transformations to satisfy the assumptions of an underlying learning model being used, such as ANOVA or Linear Regression type models. This sequence of data transformations can also be trained or seeded from the EKDB store by a lookup operation. This allows the system to learn from its prior experience, and the experience obtained at the current operation can also be saved back to the EKDB data for future use.

The system can also be configured to use multiple learning models to iteratively identify different aspects of relationships between a business measure and a data attribute, and save the most successful models in the EKDB store. Once a statistically valid model is obtained, the system can then attempt to correlate the learned pattern (from a model) against the historical norms for that business measure and data attribute.

Users may then further train the system by providing feedback on the business value of these patterns, at least with respect to the user's analytical goals. After such (optional) training, the system can then be used to analyze business measurements and find trends or patterns in these measurements. The system can then also identify certain attributes as being particularly relevant and as candidates for further analysis.

Figure 3:
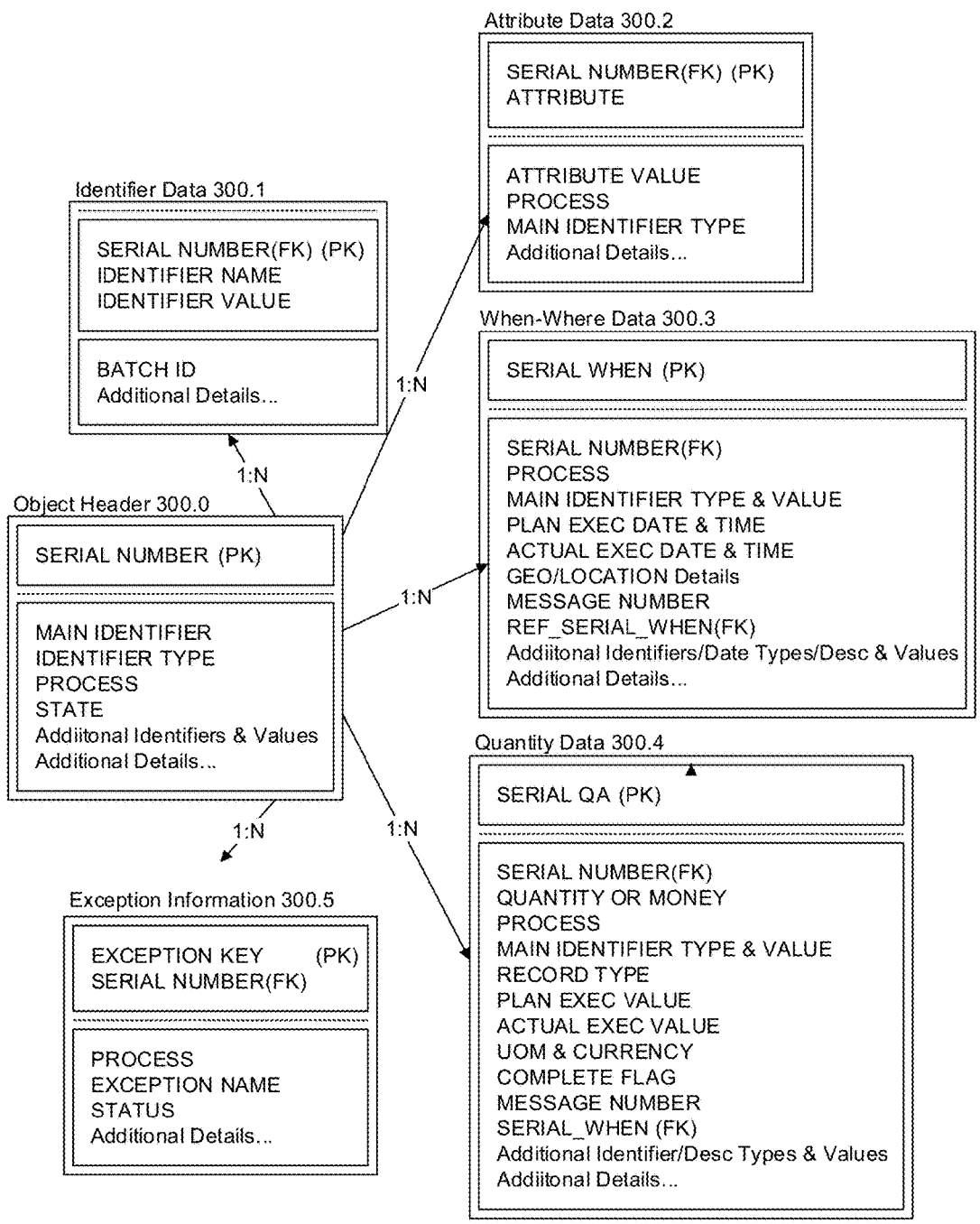
FIG. 3 shows a more detailed view of the logical links and data fields of a PADS database object. This scheme allows various business things and activities to be decomposed into values such as time and place (what-where), quantity, identifiers (useful for linking to other objects), and various attributes. In a preferred embodiment, the system also stores exception data in the PADS database object at the time that the object is initially created.

Note that these data fields are often referred to in the alternative as data tables or simply "tables". Here both "field" and "table" refers to data that is stored in specific portions of the PADS database object memory structure as shown in FIG. 3. Thus, for example, the "Object Header" table or "Object Header field" both refer to data stored in the memory structure of the Object Header 300.0 portion of the PADS database object shown in FIG. 3.

Figure 4:
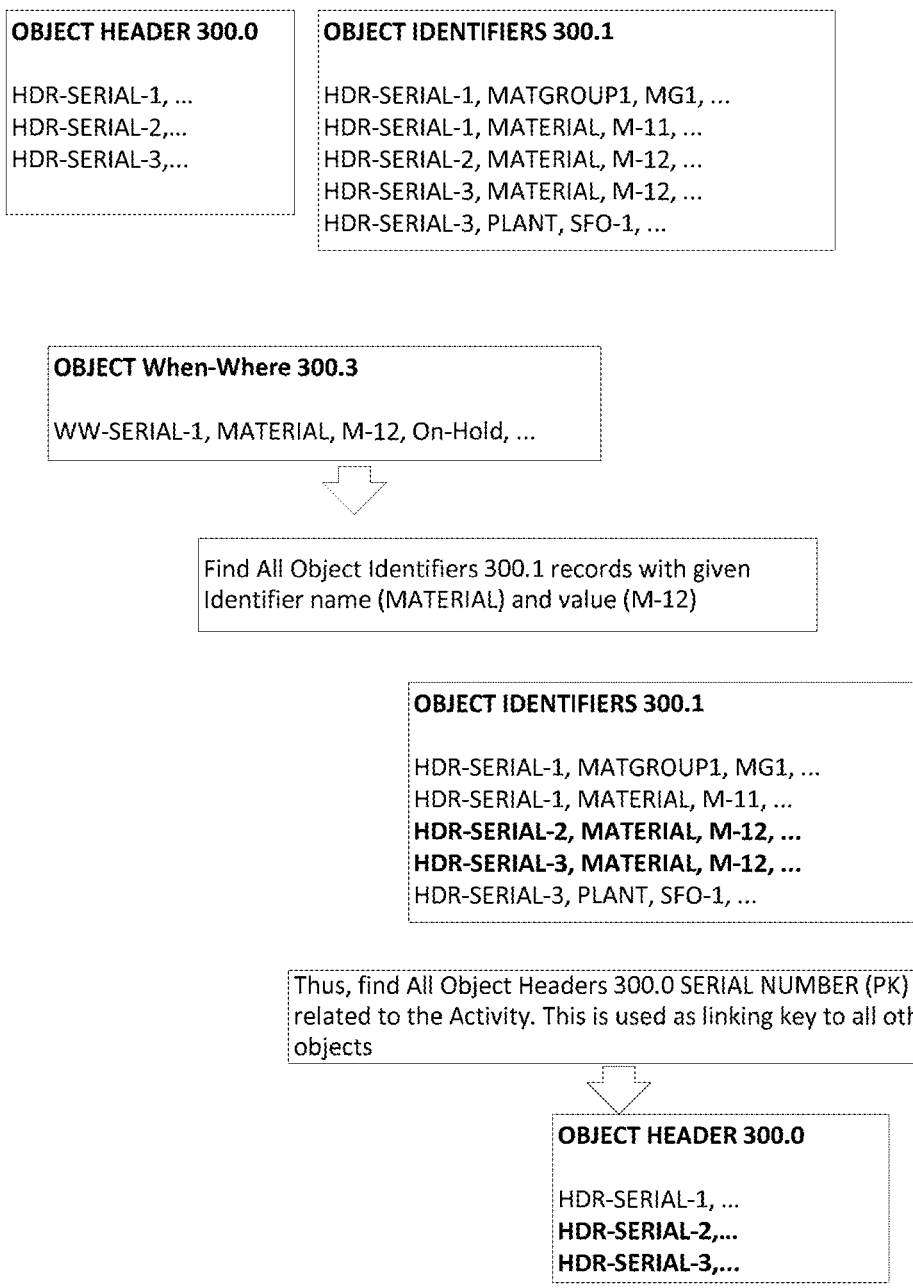

FIG. 4 shows one method of how the system can use PADS data to link various "things" (stored as PADS database objects) to various activities (also stored as PADS database objects).

Figure 5:
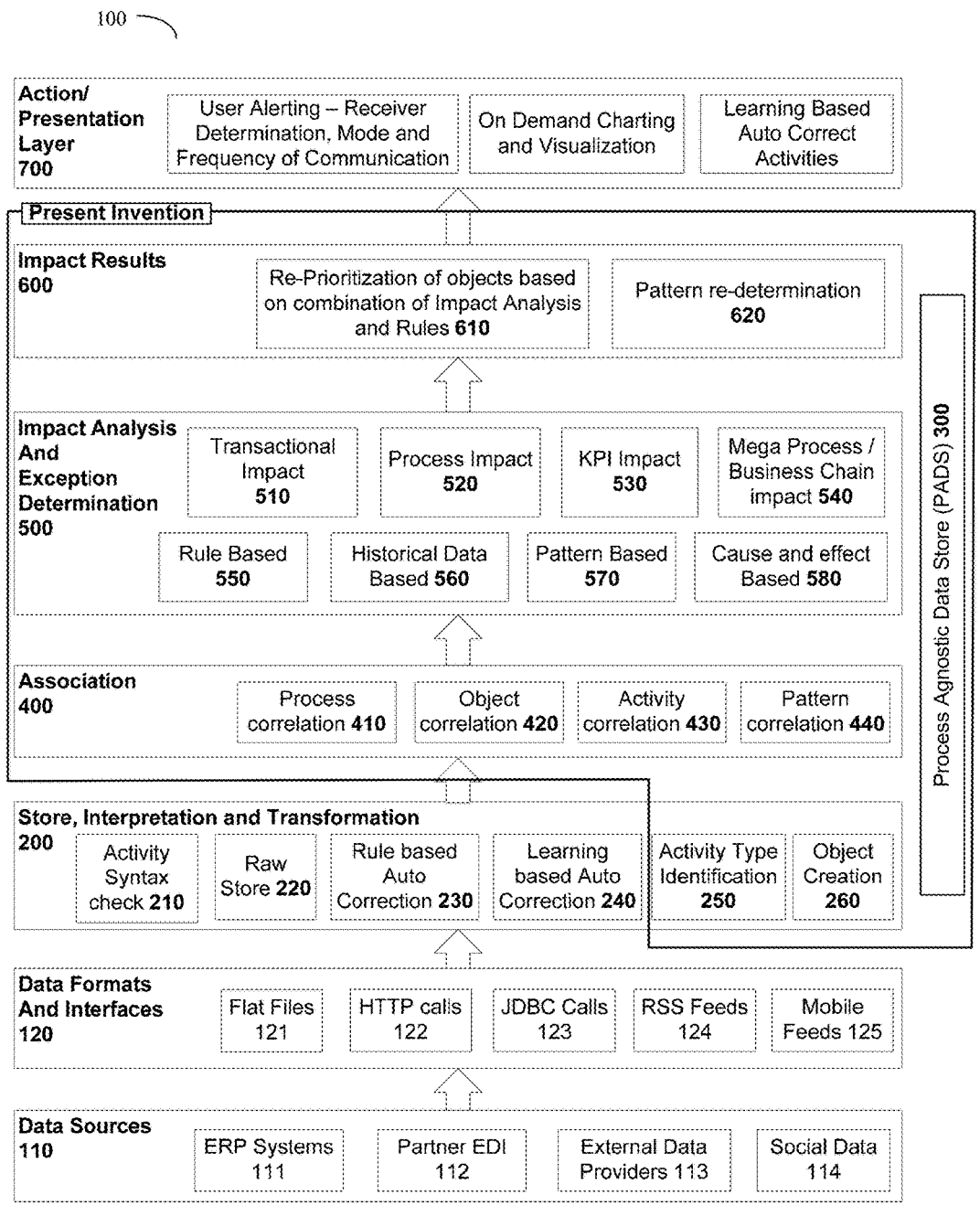

FIG. 5 shows a more detailed block diagram of some of the major software components of the present invention's system and method.

Figure 6:
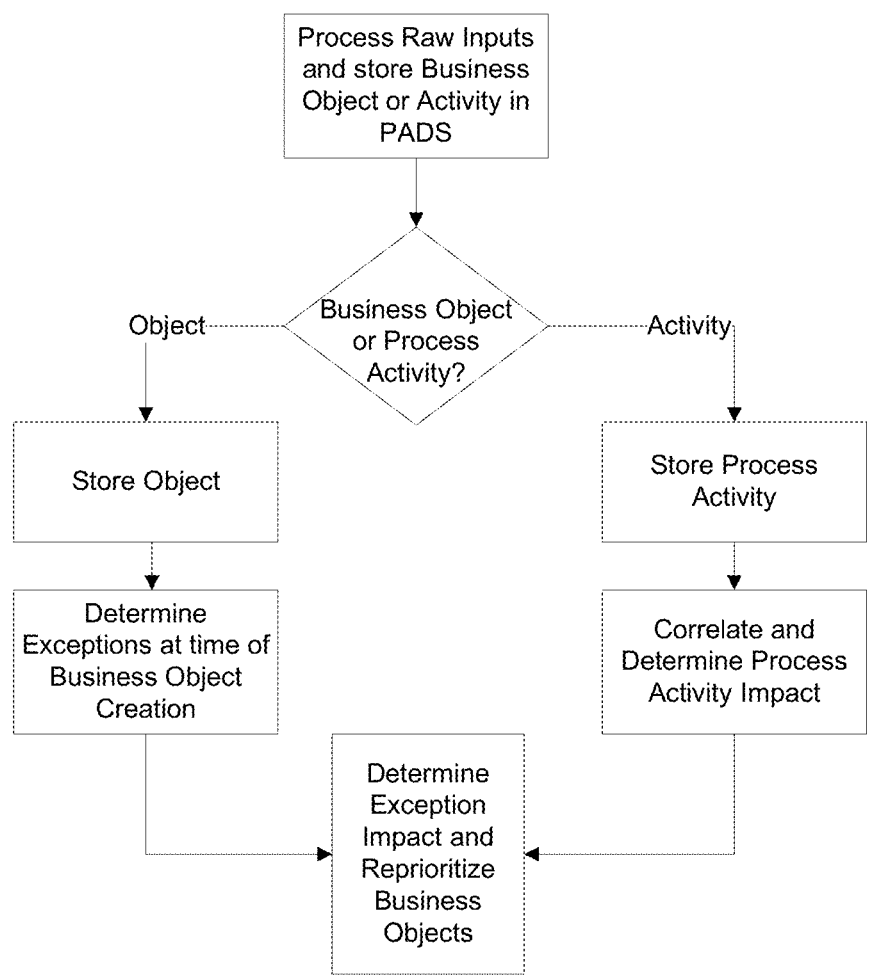

FIG. 6 shows a software flow chart giving a high level view of the how the invention operates. Raw data is parsed, transformed, interpreted, identified as a new business object (e.g. a new sales order or a manufacturing order for one or more "things" or products) or alternatively as a process activity on an existing business object (e.g. a material or "thing" temporarily placed on hold). The data is automatically checked and auto-corrected (to the extent possible) and then stored in the PADS database.

Figure 7:
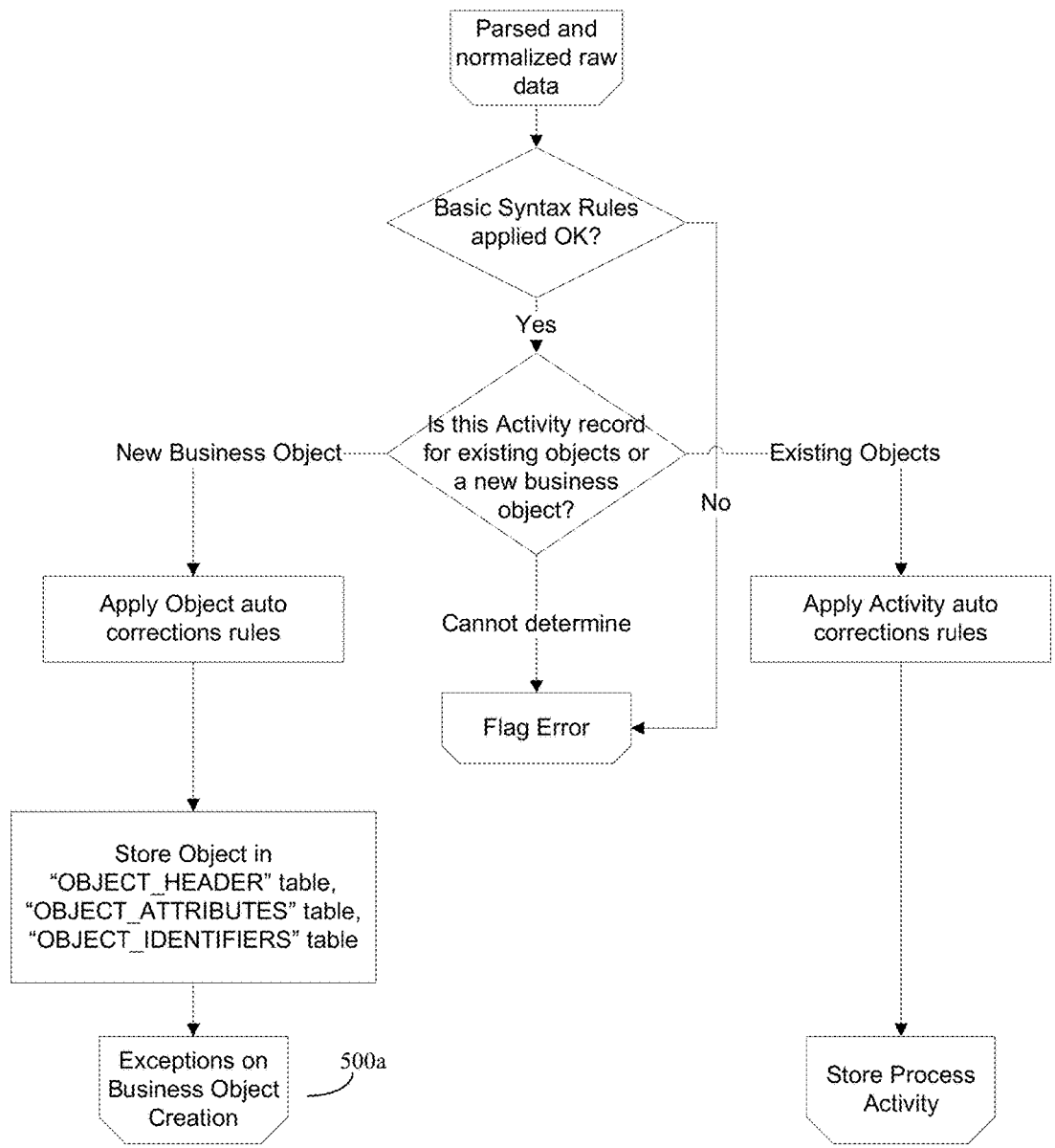

FIG. 7 shows a software flow chart showing how raw data (often obtained from external computerized devices via a network connection) can be parsed, processed, and stored as various PADS objects and processes. The input is parsed into various PADS object tables or fields such as the Object Header table or field (300.0), Attribute Data table or field (300.2) and various Identifier Data tables or fields (e.g. 300.1), and the resulting PADS database object is stored in the PADS database.

Figure 8:
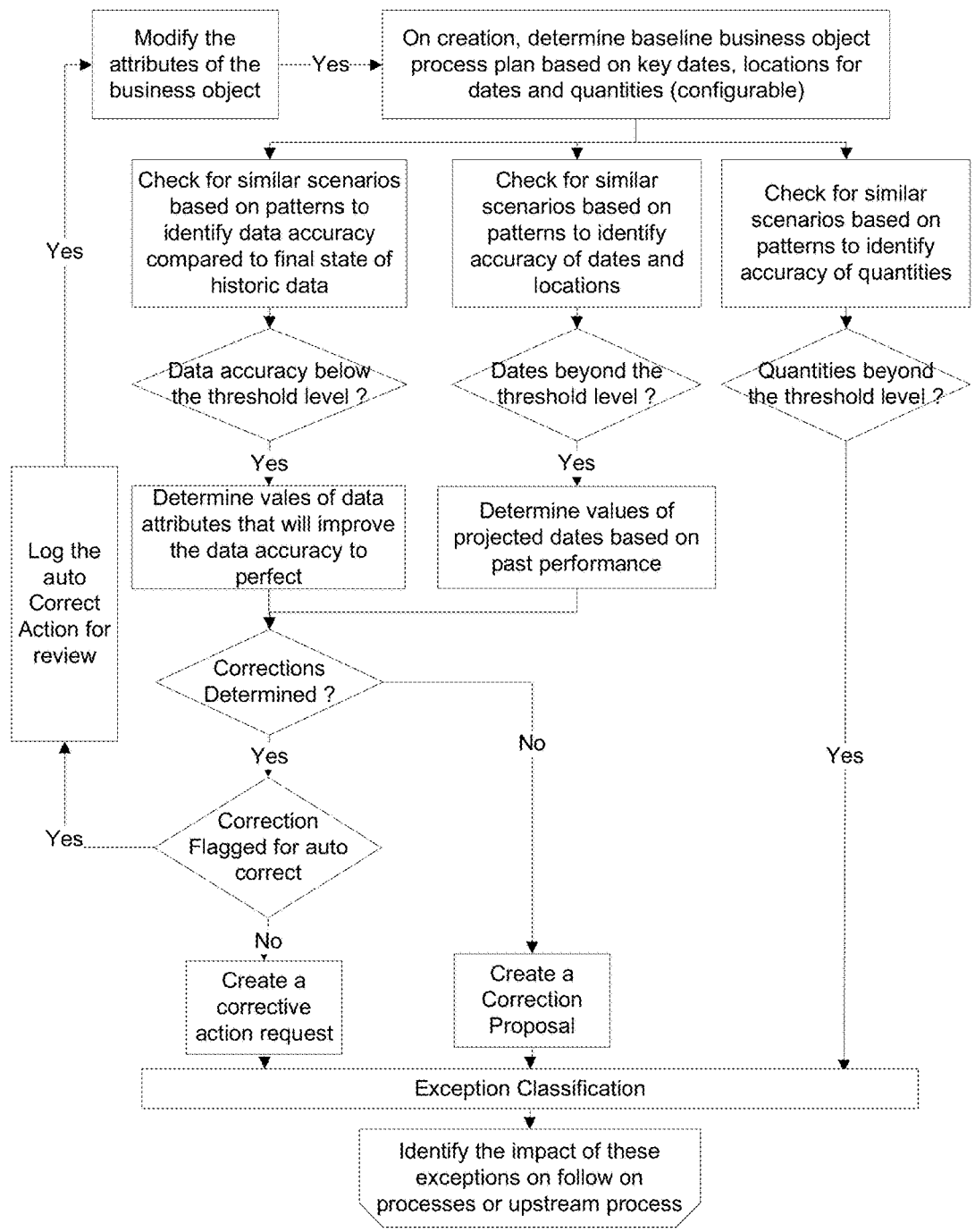

FIG. 8 shows a software flow chart showing how in a preferred embodiment, the invention determines exceptions when the PADS database objects were initially created.

Figure 9:
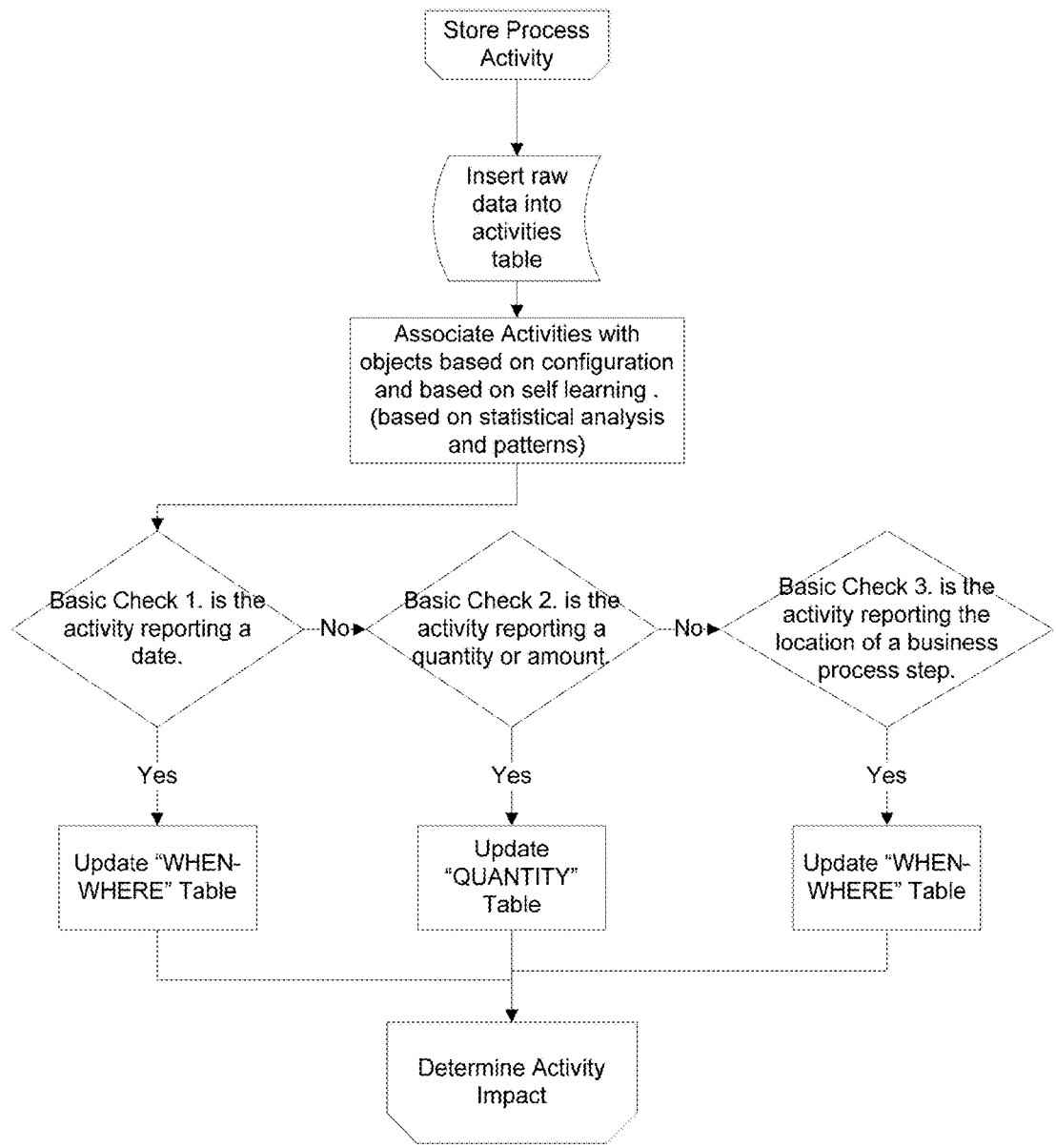

FIG. 9 shows a software flow chart showing further details of how the system analyzes raw data pertaining to various activities.

Figure 10:
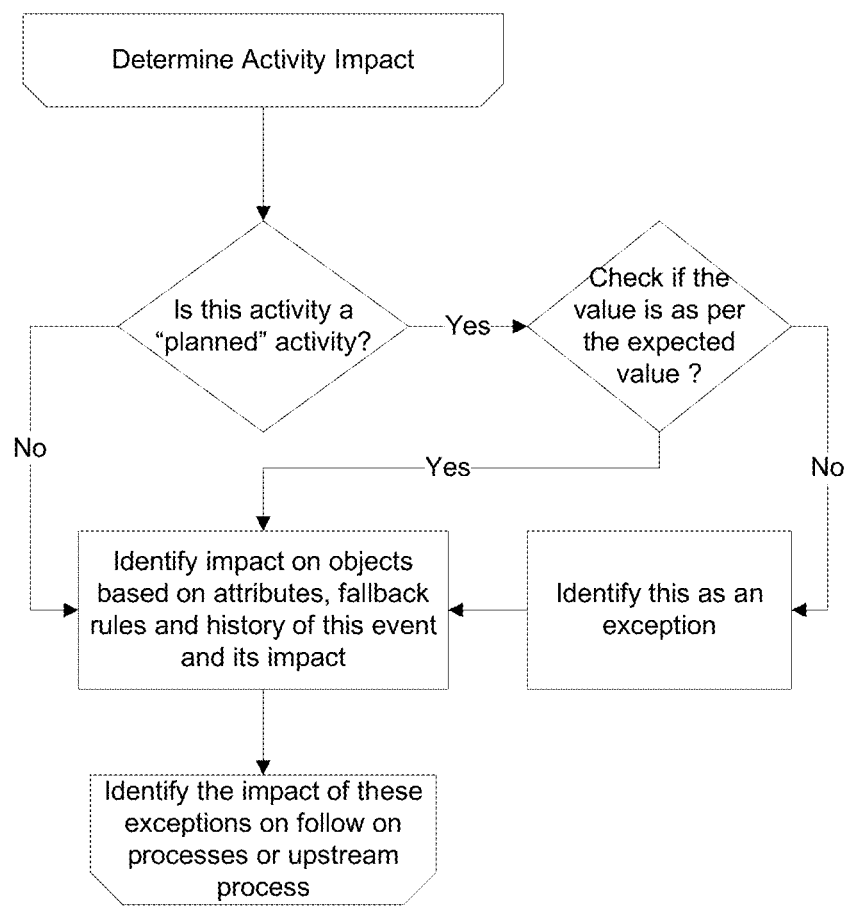

FIG. 10 shows a software flow chart showing how the system determines if various activities are either "planned" activities (e.g. expected with standard rules for exceptions already established) or "unplanned" (not expected, so automatically analyze exceptions using fallback rules for when standard rules are not available). In some embodiments, the system may be configured to obtain such fallback rules by analyzing patterns of historical data (e.g. automatically determined what happened in similar situations like that in the past) and using this historical data to estimate the impact of any unplanned deviations.

Figure 11:
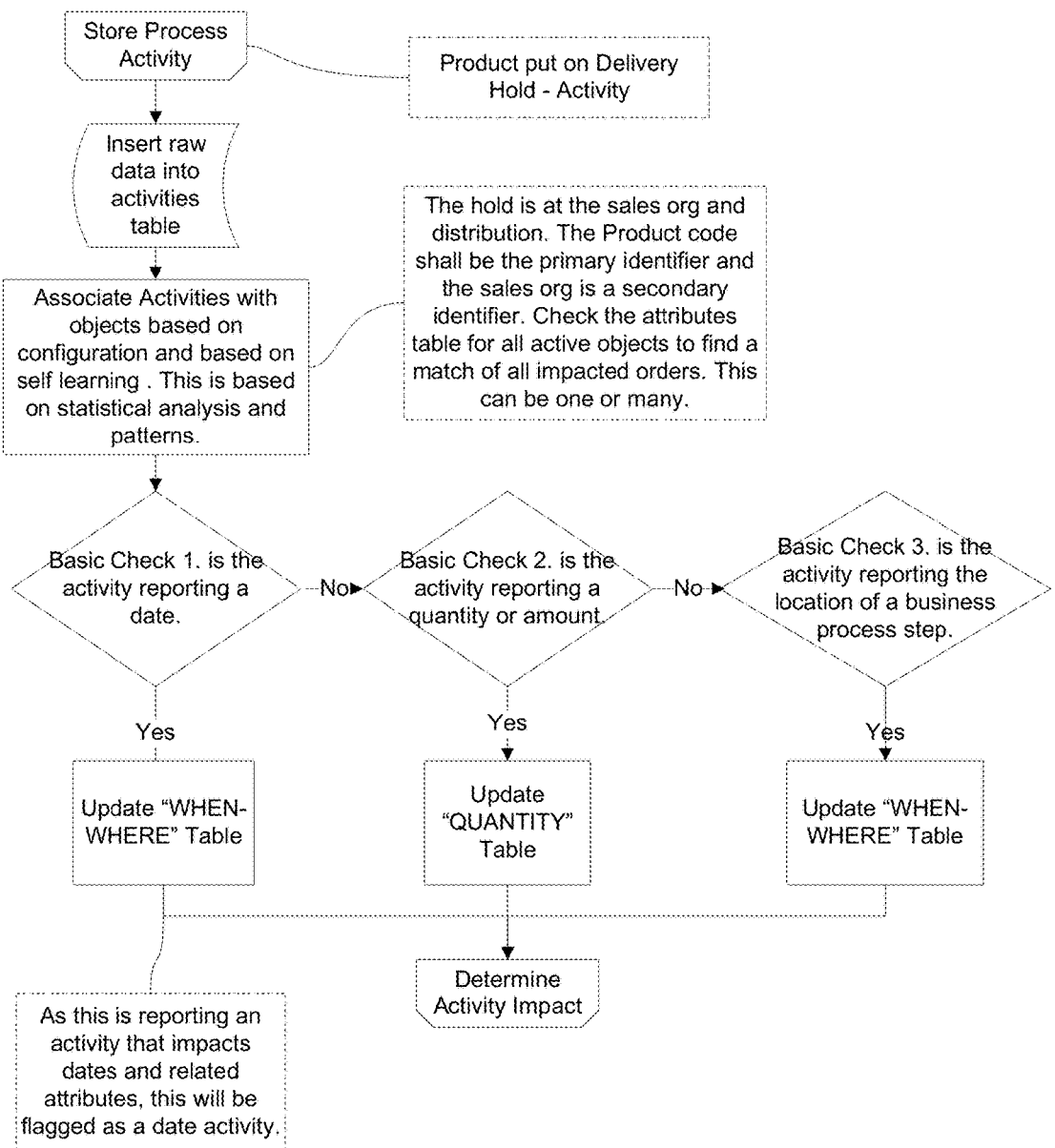

FIG. 11 shows software flow chart showing a first example of the invention's exception analysis system in operation for a business process. Here someone in the sales organization has informed the system that a particular "thing" (product normally available for sale) has been put on delivery hold (perhaps the product in inventory was defective and needed to be replaced). This "product hold could thus potentially impact the delivery dates for various customers.

Figure 12:
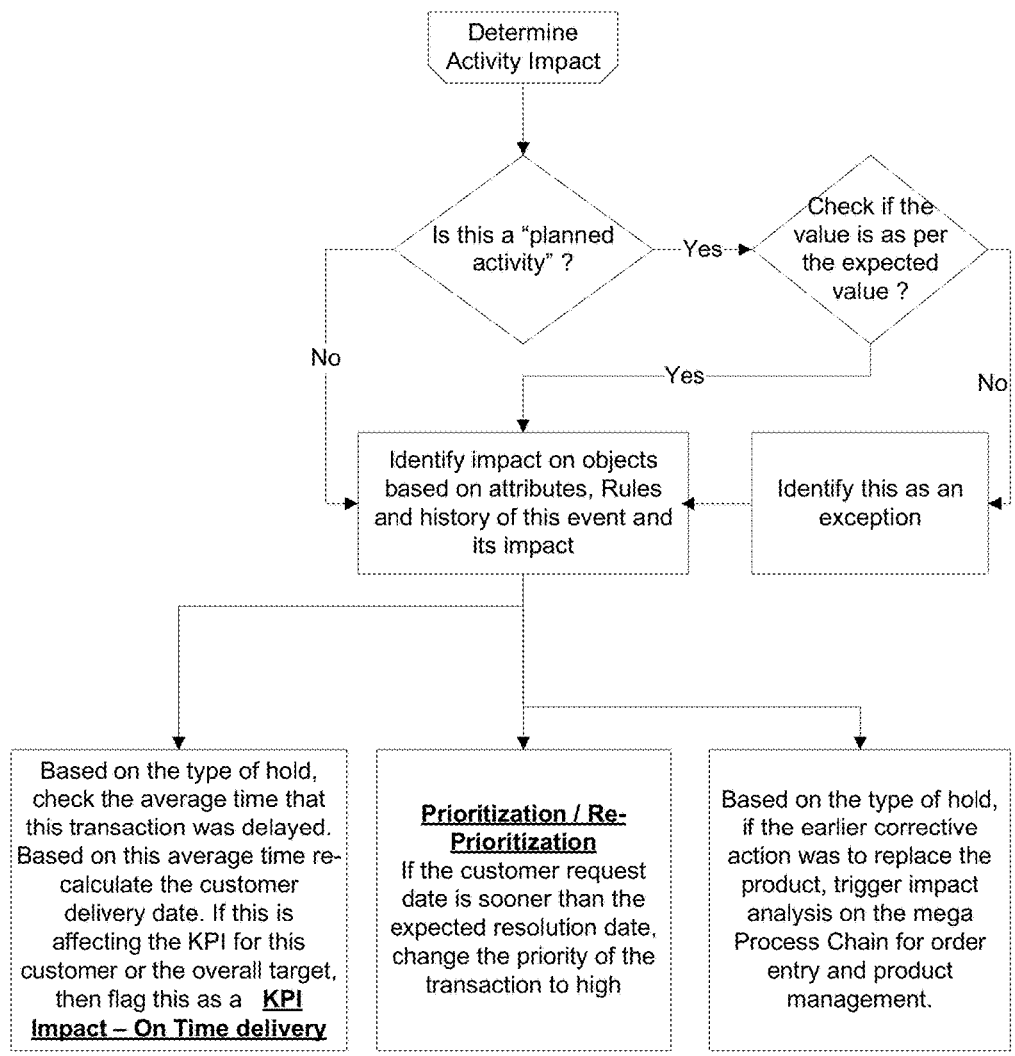

FIG. 12 shows how, in this first example, the system analyzes the impact of placing a product on hold on various subsequent (e.g. dependent) processes and activities. Here if the system determines that this hold is "planned", the system can use its standard expected value algorithms to determine the resulting impact. However if the system can't find standard rules, and instead determines that this "on hold" event was not "planned", and the impact of this exception can be analyzed using various fallback rules. Either way, the impact of placing the product on hold has on various downstream processes, such as various customer deliver dates, can be almost instantly calculated and reported by the system.

Figure 13:
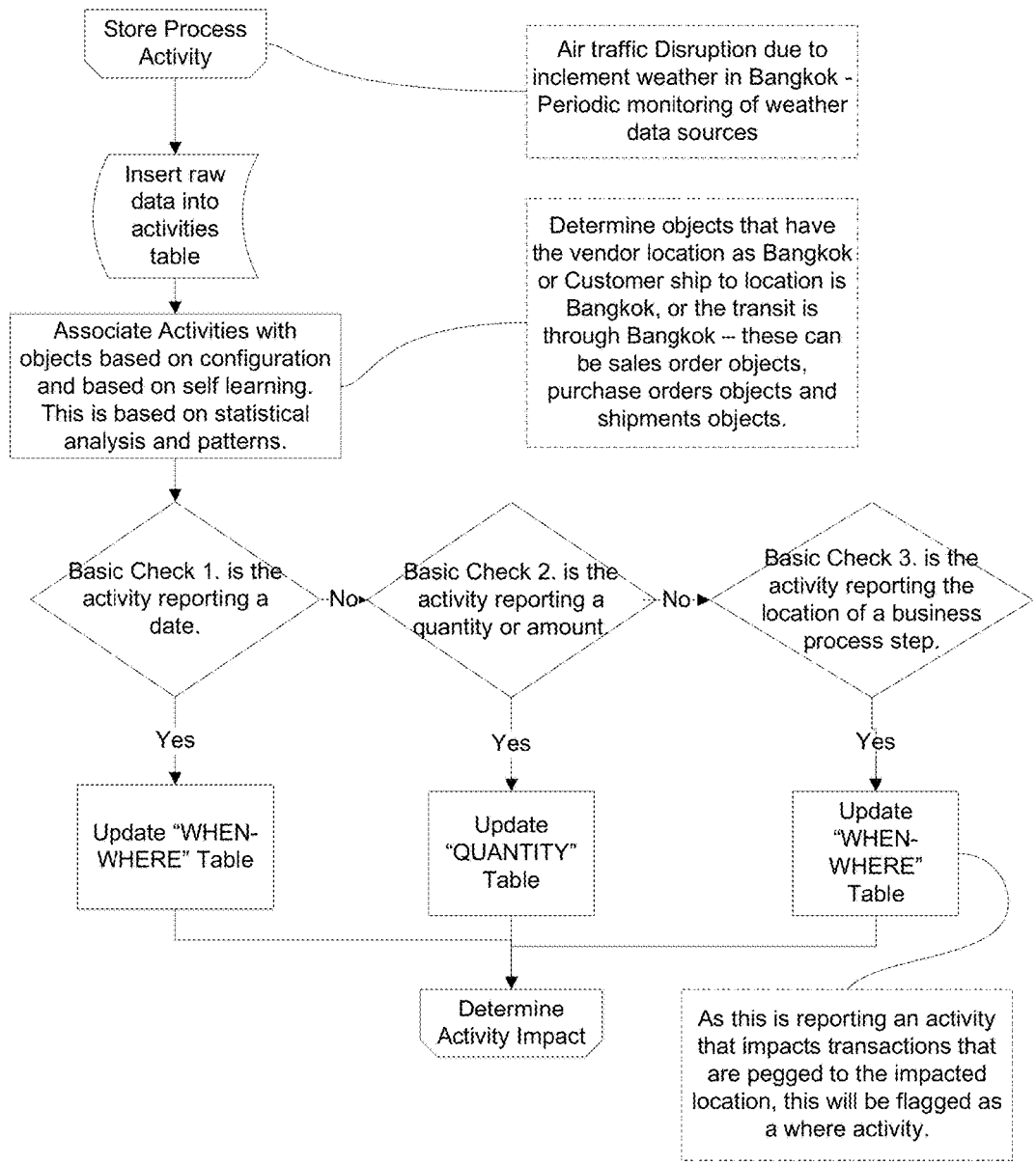

FIG. 13 shows a second example of the invention in operation. Here the system is handling the impact of bad weather on product shipments (e.g. from a supplier). In FIG. 13, the system is doing the initial data input and PADS object creation steps of the process.

Figure 14:
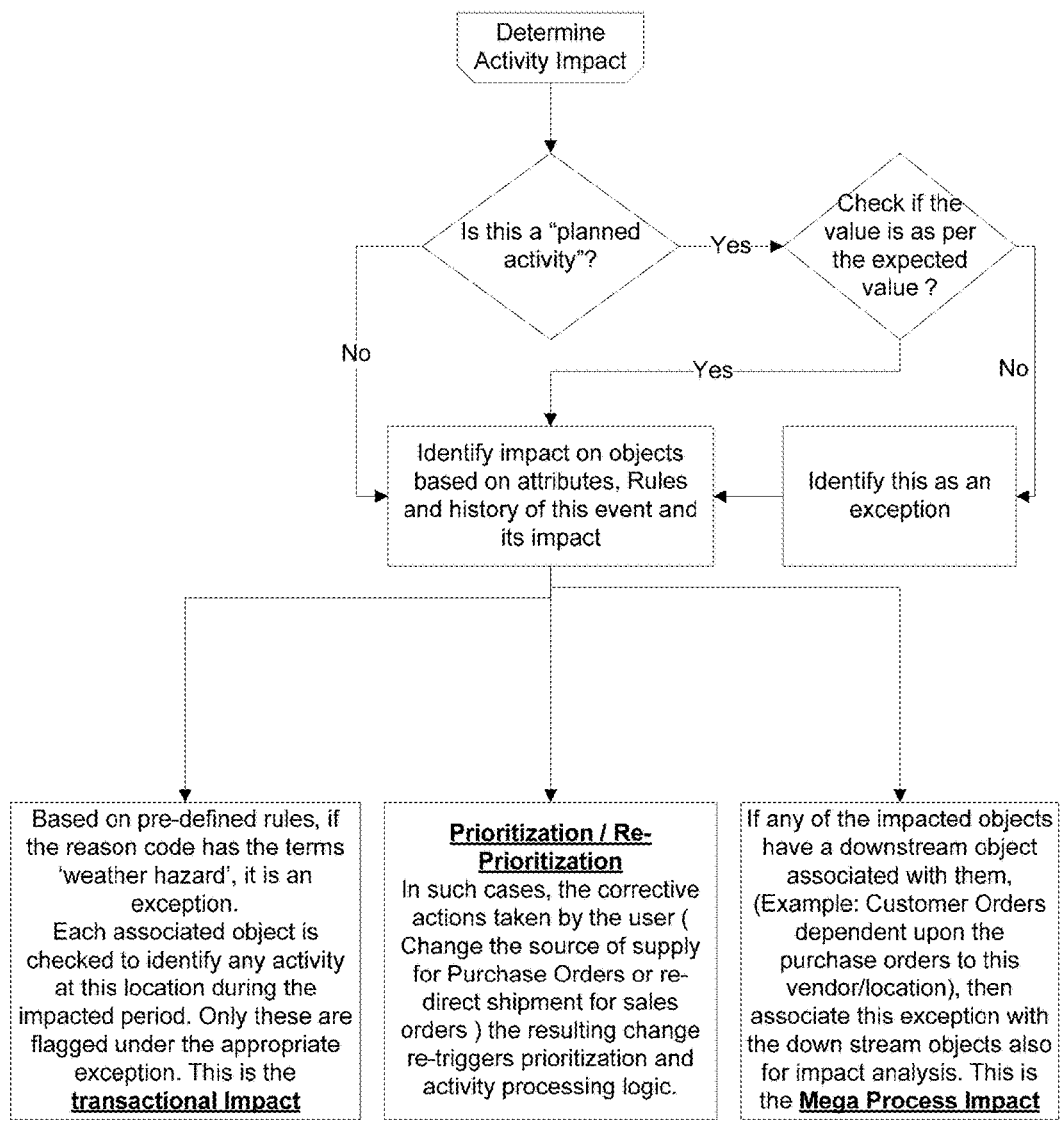

FIG. 14 shows how, in this second example, the system then analyzes the impact of this supplier shipment delay on subsequent (e.g. dependent) processes and activities. As before, if the system determines that this shipment delay was "planned", the system can use its standard expected value algorithms to determine the resulting impact. However if the system can't find standard rules, and determines that this "shipment delay" was not "planned", and the impact of this delay can be analyzed using various fallback rules. Either way, the impact of the shipment delay on various subsequent business processes can be almost instantly calculated and reported by the system.

Figure 15:
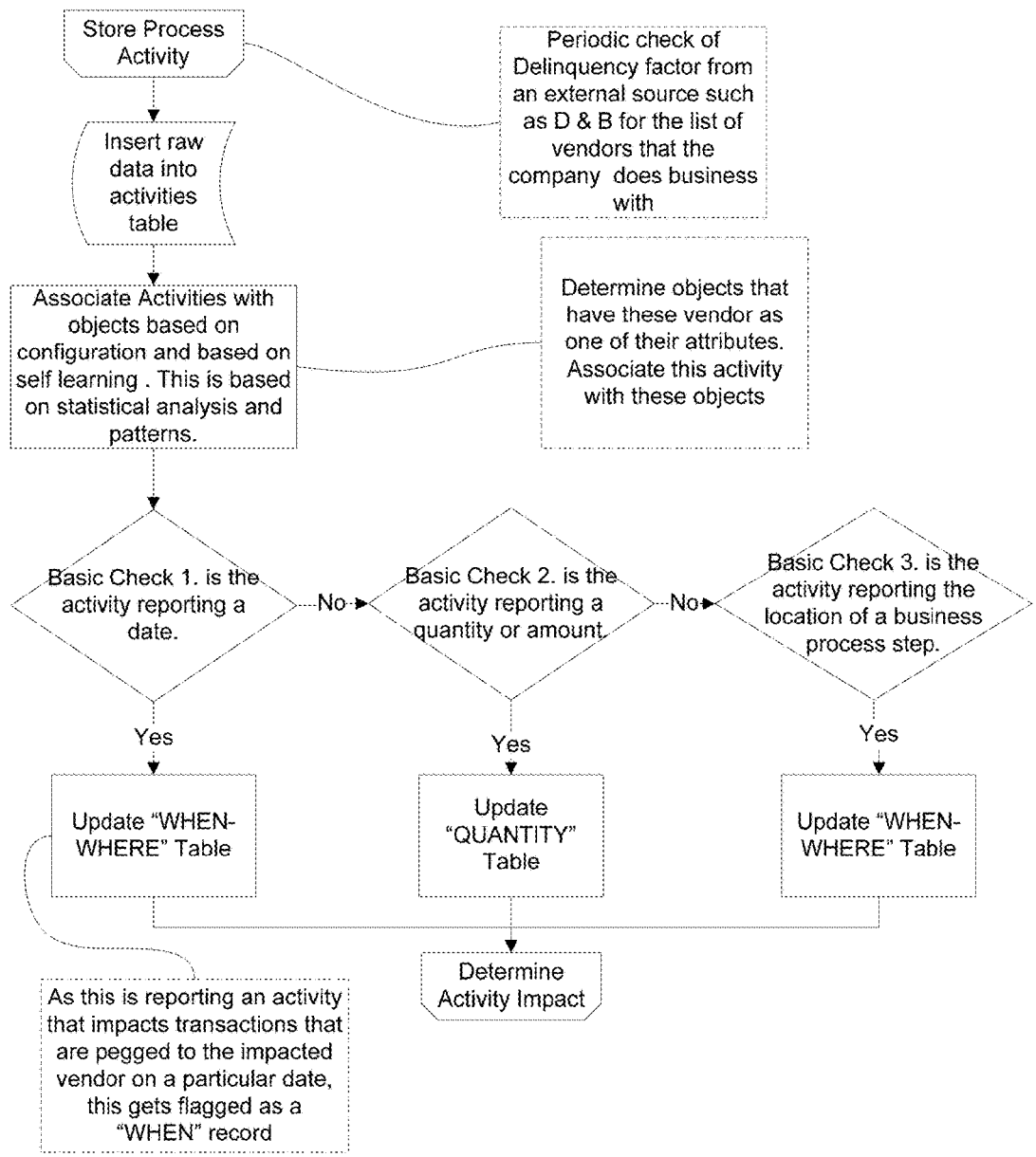

FIG. 15 shows a third example showing how the system can handle more complex problems, such as the problem of a supplier or vendor having chronic reliability or delinquency problems. Here the system is configured to receive automatic data feeds from various external sources. Here the system automatically received business status information from an outside source, such as Dun & Bradstreet (D&B) showing that the supper or vendor was in serious financial trouble. The system can use this to estimate the impact of an impending vendor failure on various products (things) or activities provided by this vendor, and hence on other dependent business processes. Here the data has been obtained from a business rating service provider (such as D&B), and the system is automatically linking this information, via the PADS database objects, to the various products or services provided by this problematic vendor.

Figure 16:
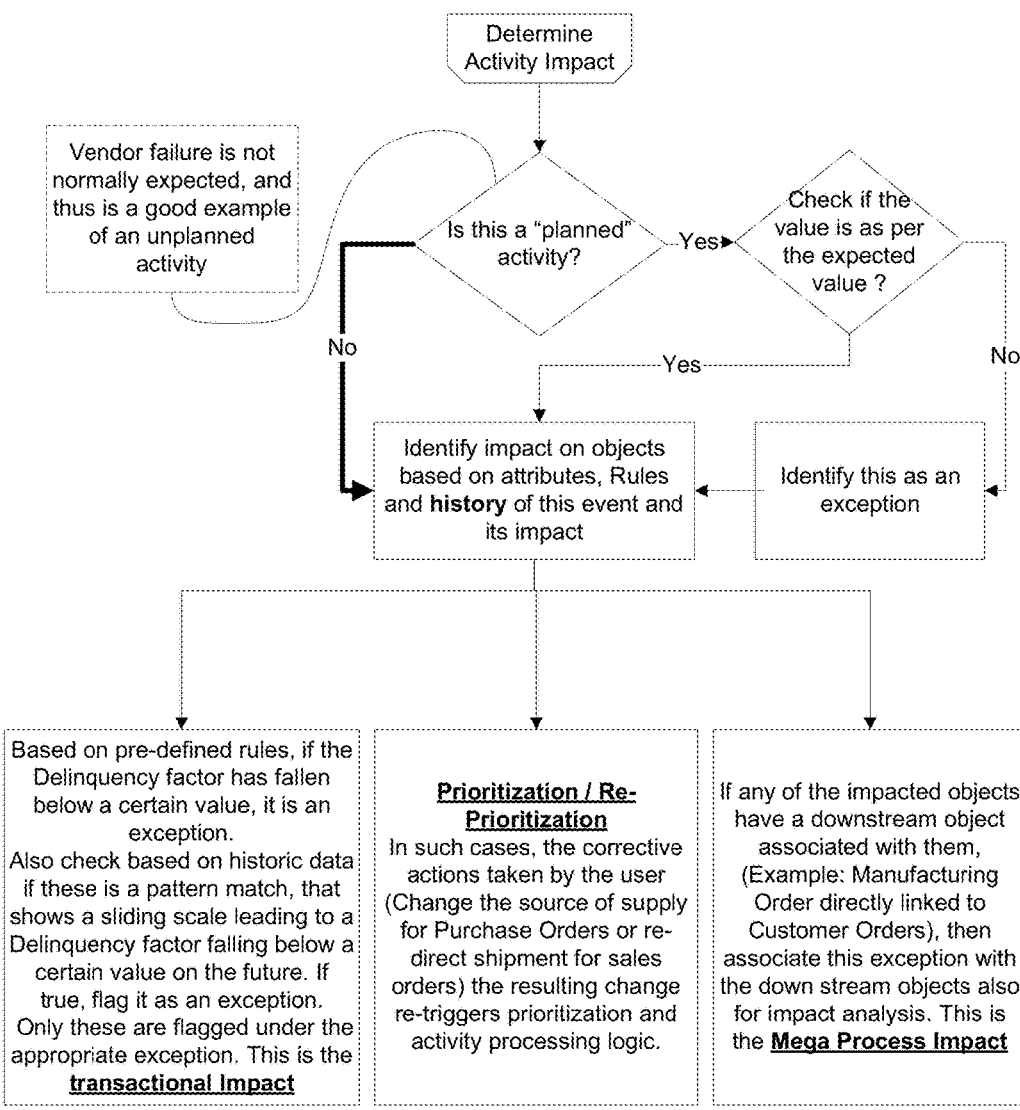

FIG. 16 shows the continuing analysis of the third example previously discussed in FIG. 15. Since vendor failure is unusual, this third example is a good example of an unplanned activity. Here the system can use various fallback rules such as "analyze if vendor is experiencing a chapter 7 (vendor will likely cease operations) or chapter 11 (vendor will likely continue to operate) bankruptcy" and estimate the impact on various dependent processes accordingly.

Figure 17:
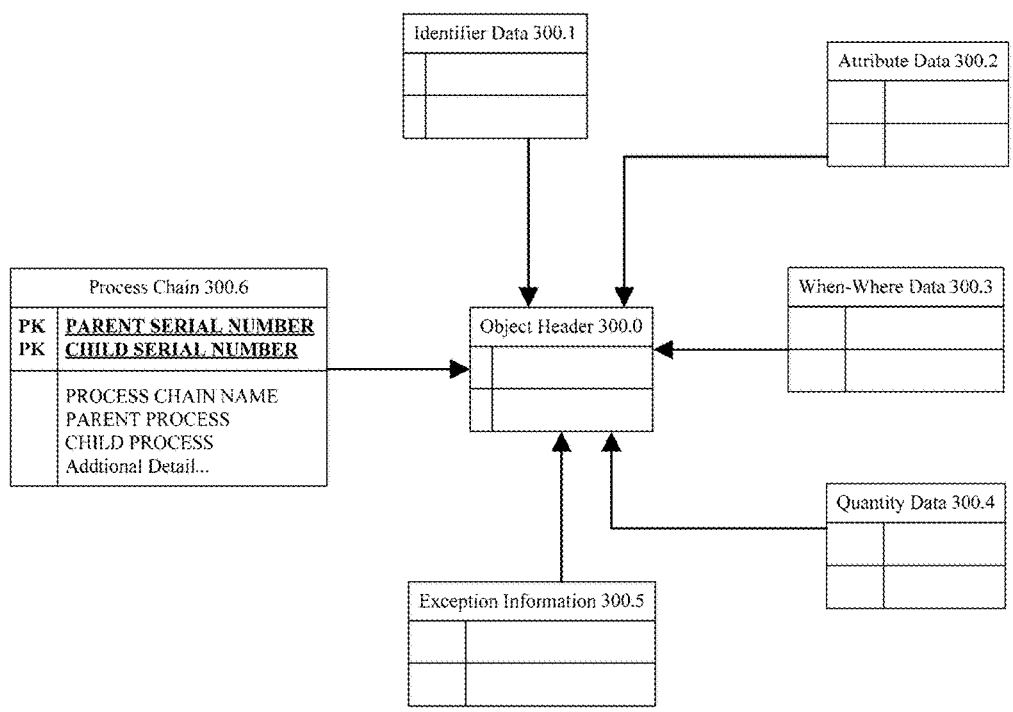

FIG. 17 shows an extension to the PADS data model, previously shown in FIG. 3, now showing additional logical links and data structure used to handle process chain type linkages between related processes.

Figure 18:
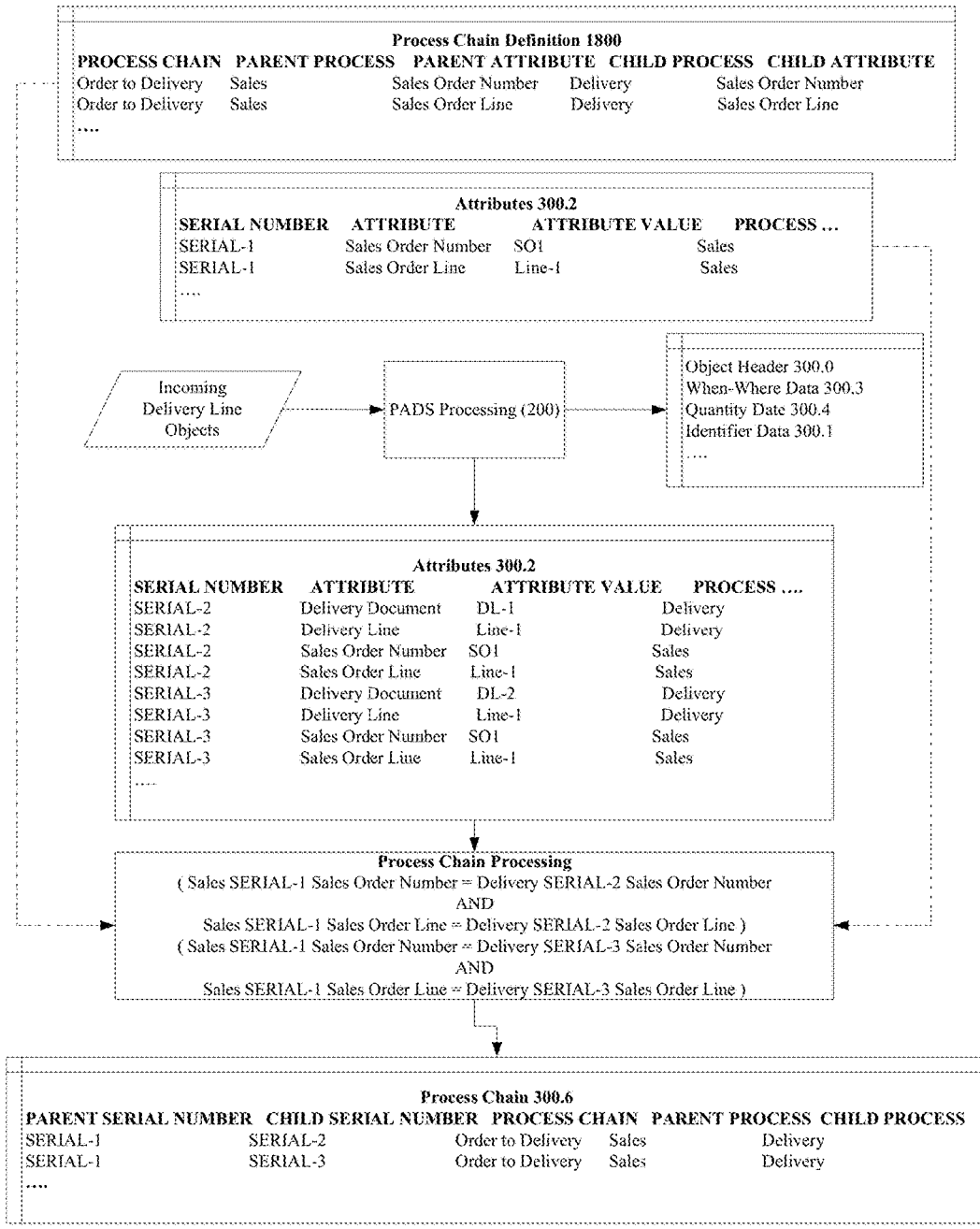

FIG. 18 shows example of linking two process objects via predefined linkage attributes to create object links in process-chain store (FIG. 17, 300.6).

FIG. 19 shows that the PAMS data model can be divided into Measures (1900) and Attributes (1902) components.

Figure 20:
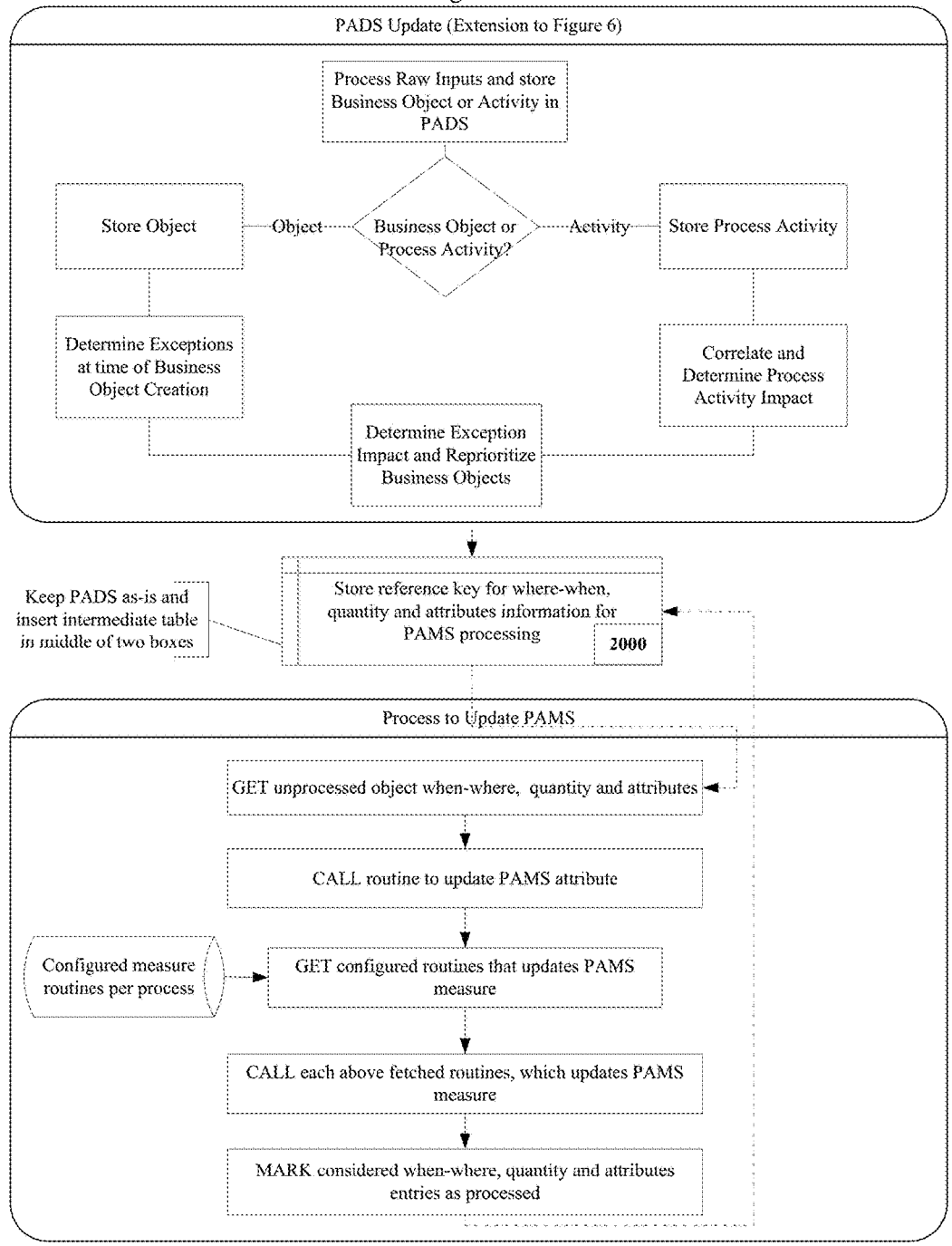

FIG. 20 describes using the PADS data source to update PAMS, and how measures and attributes get updated based on configuration.

Figure 21:
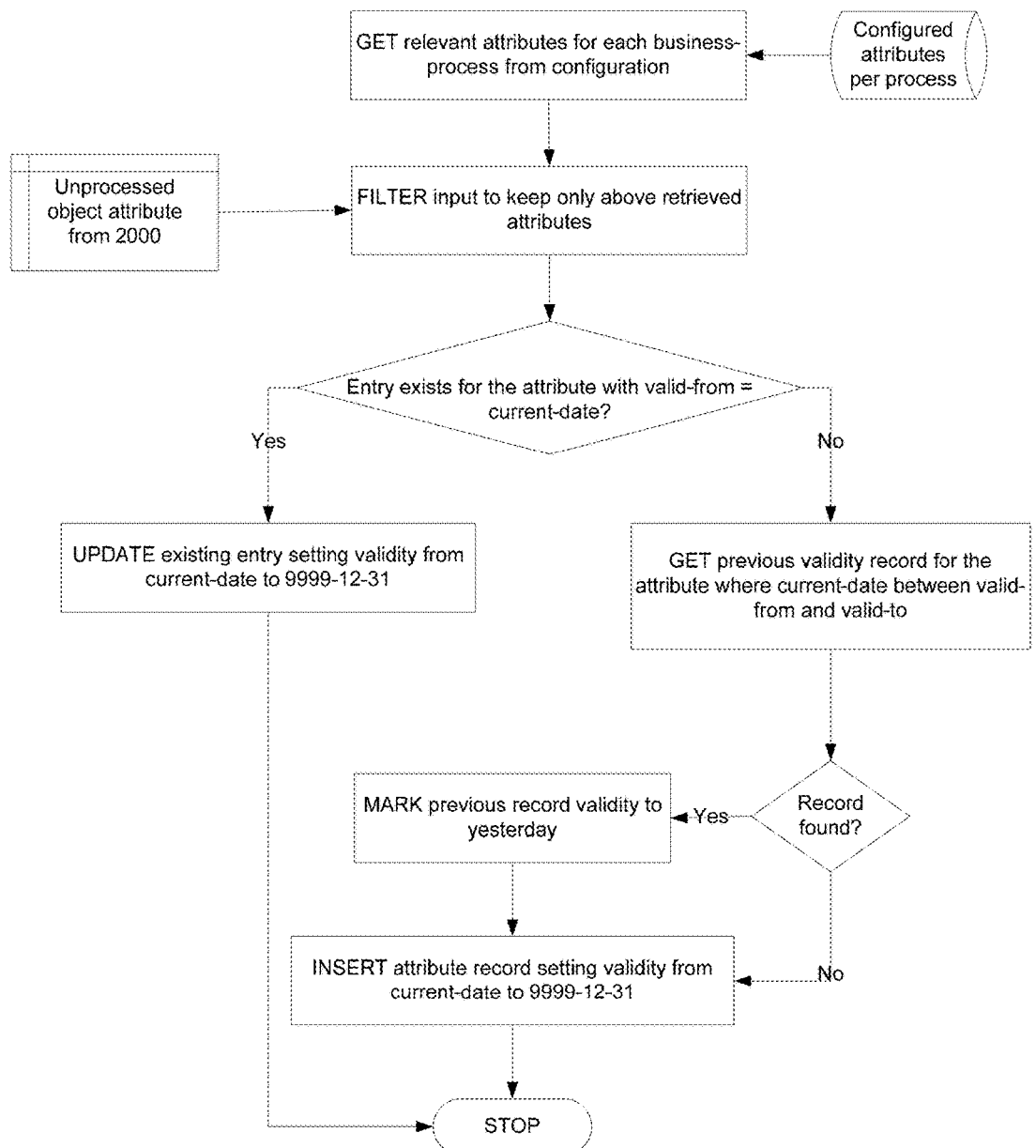

FIG. 21 further describes the PAMS measure update logic.

Figure 22:
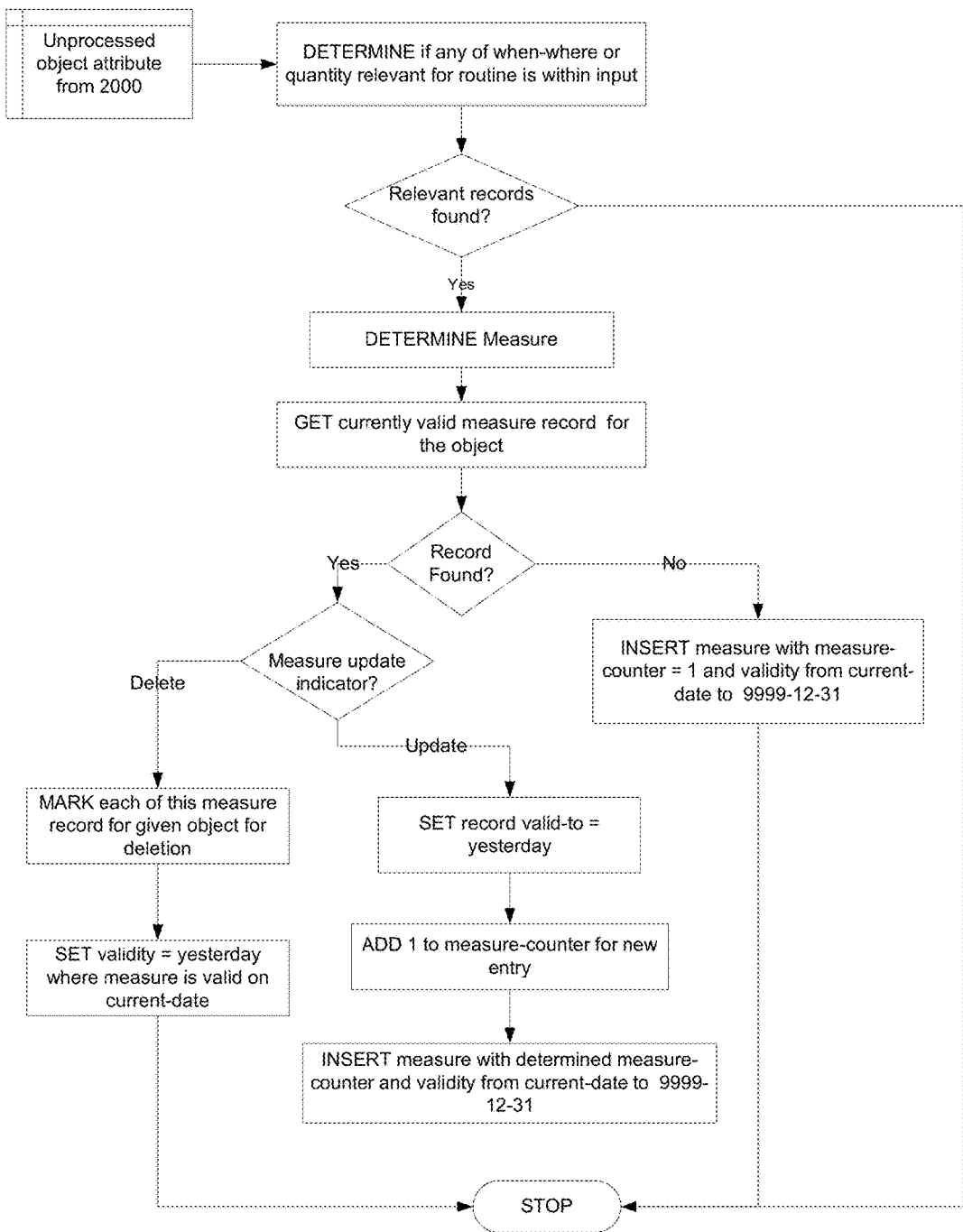

FIG. 22, along with Table 1 shows an example of measure records creation in PAMS.

Figure 23:
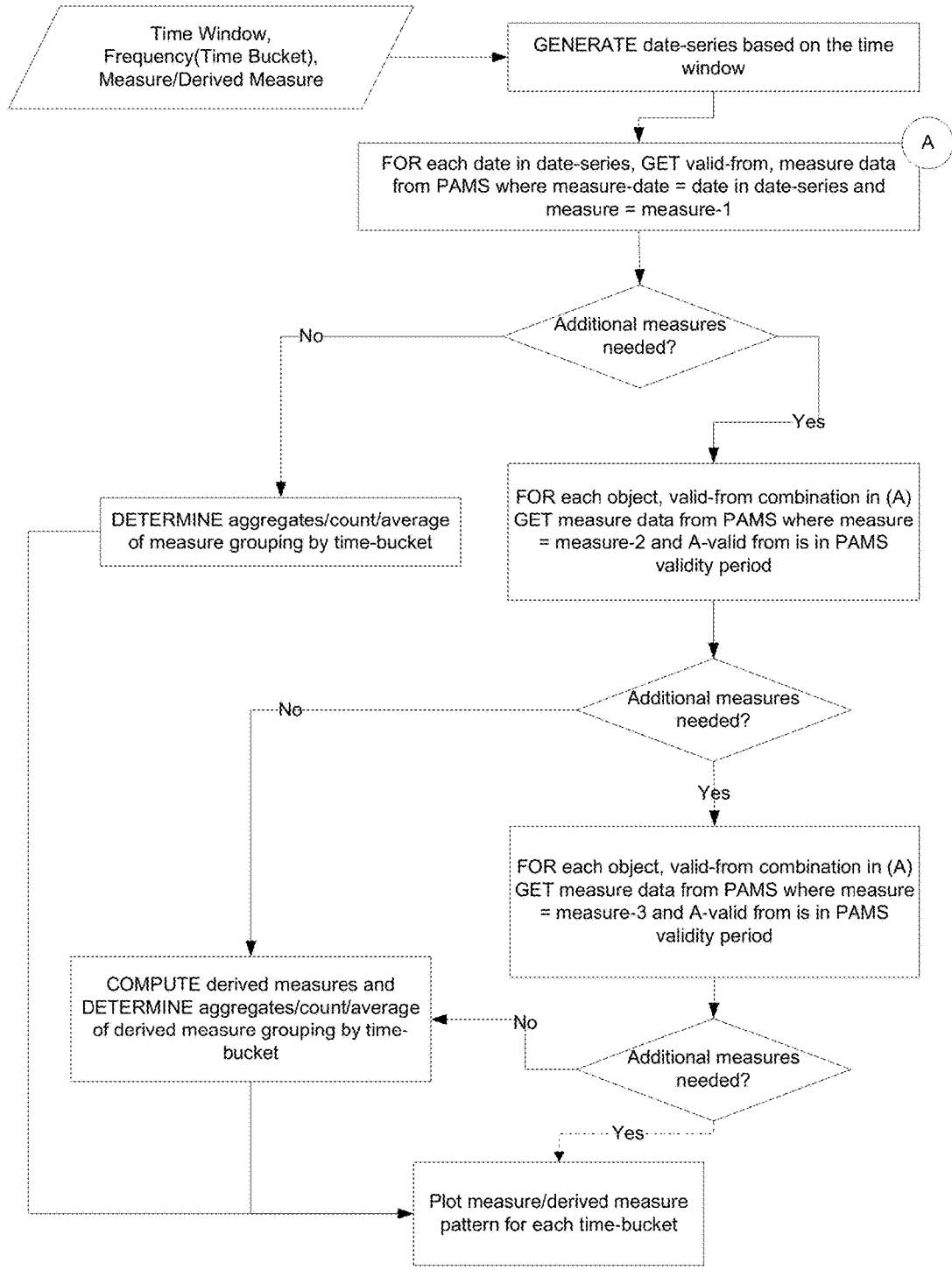

FIG. 23 along with Table 2, shows an example of attributes records creation in PAMS.

Figure 24A:
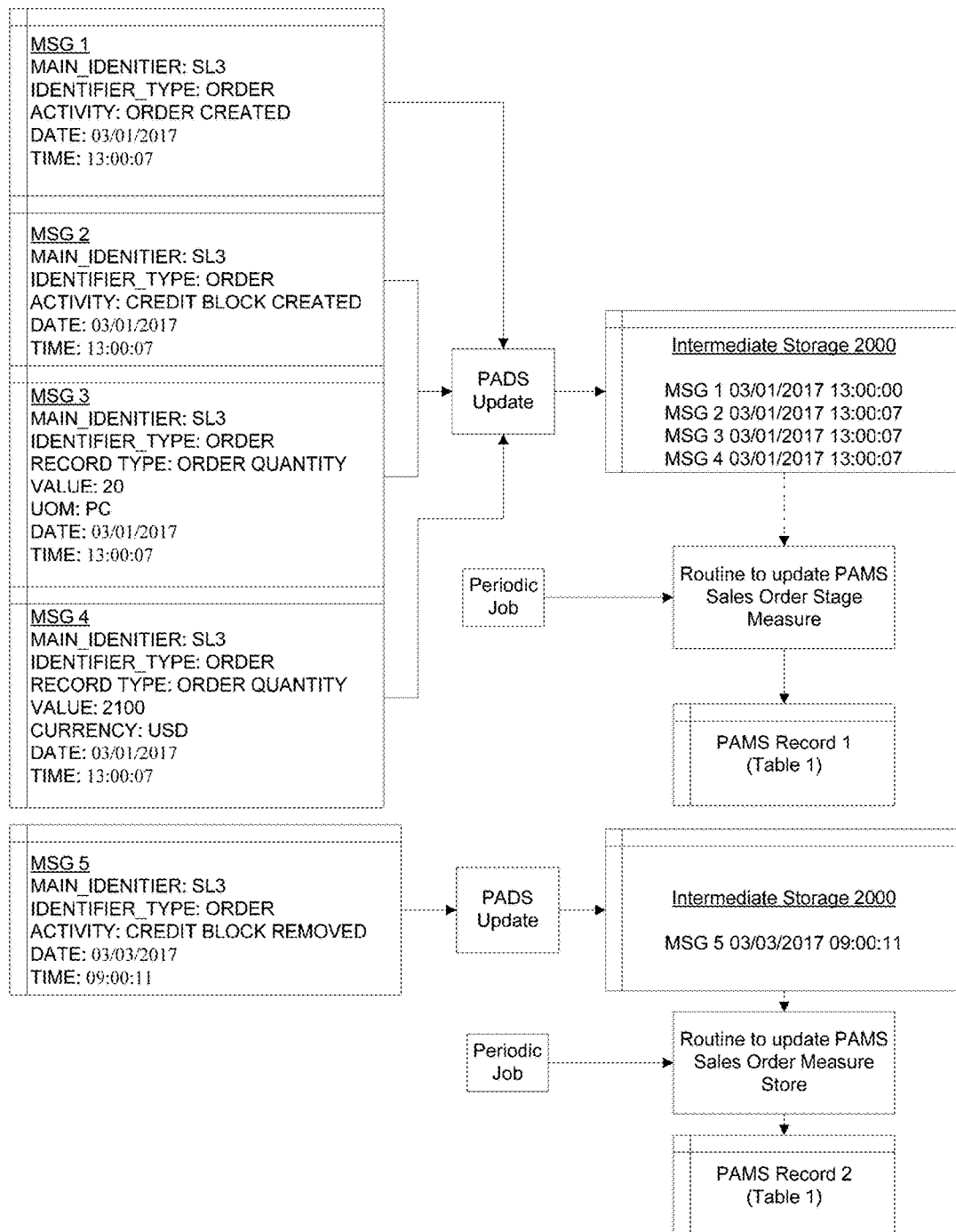

FIG. 24A illustrates one scheme by which data updated in the PADS system can then be ported to the PAMS system.

Figure 24B:
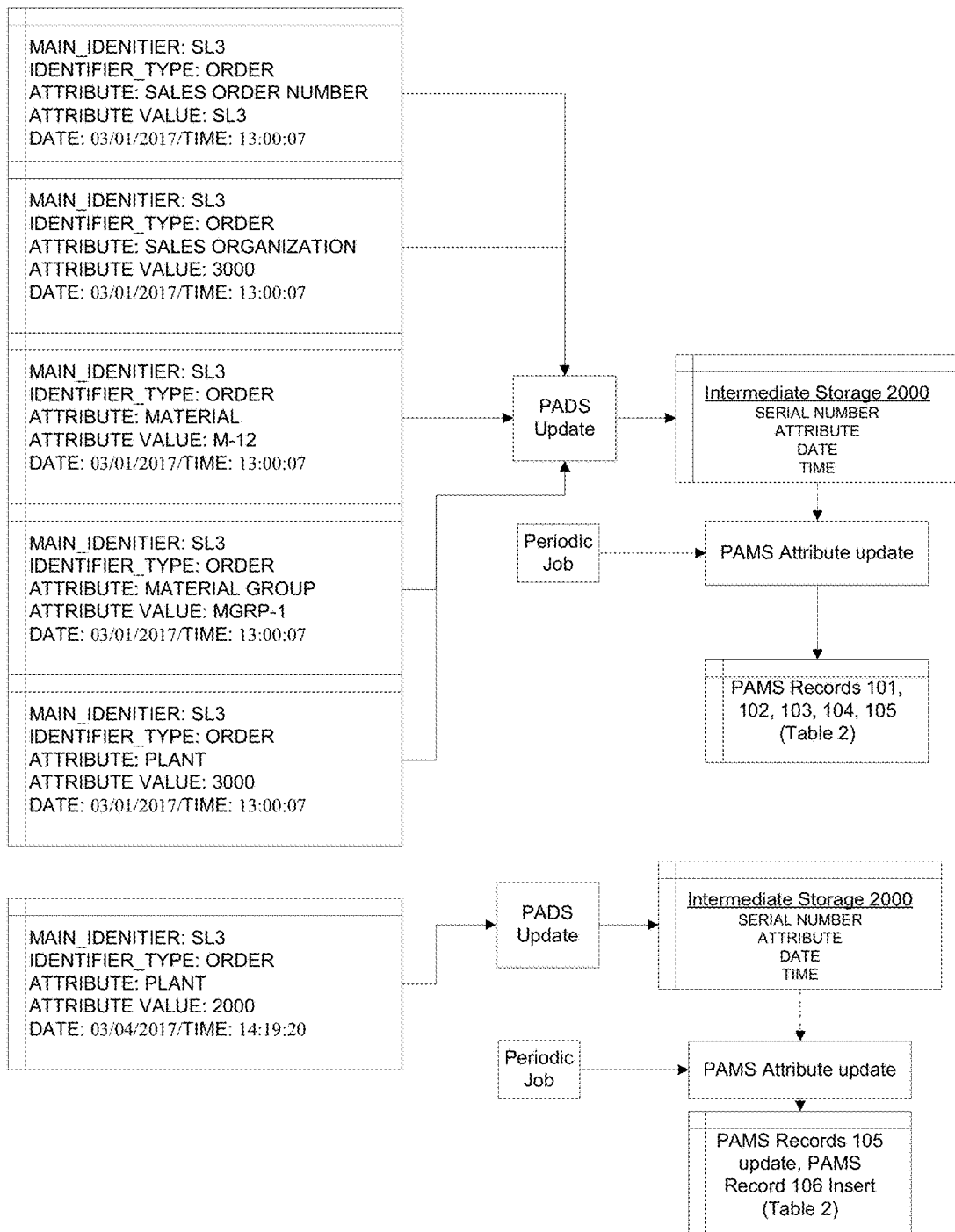

FIG. 24B further shows how data updated in the PADS system can be ported and handled by the PAMS system.

Figure 25A:
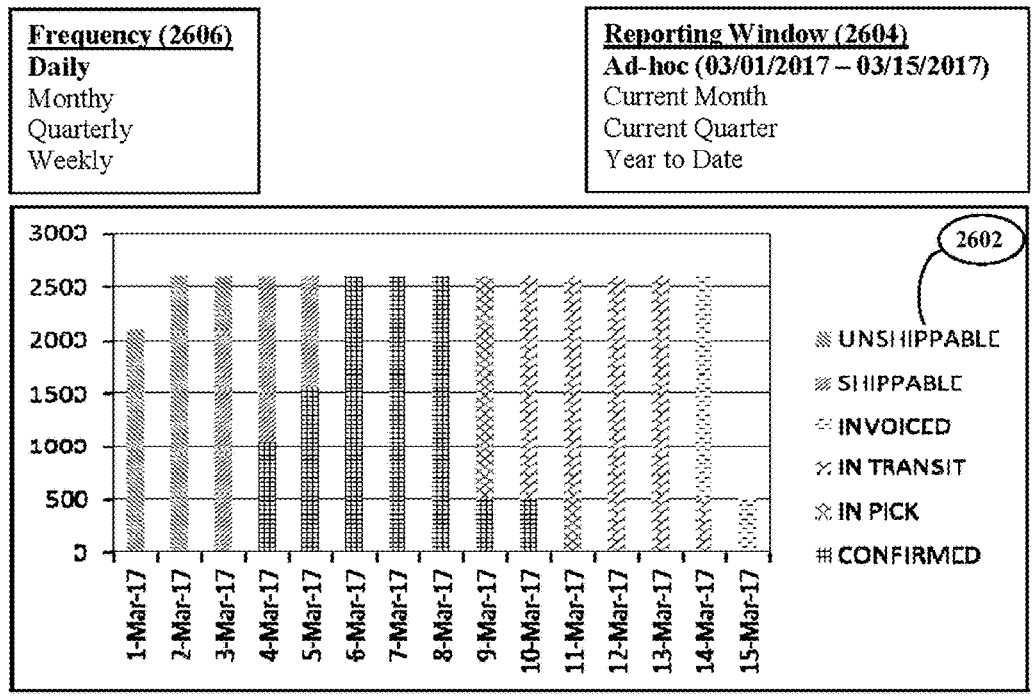

FIG. 25A is a trend plot illustrating a particular business measure "amount by shipment state" from table 5, without any filter.

Figure 25B:
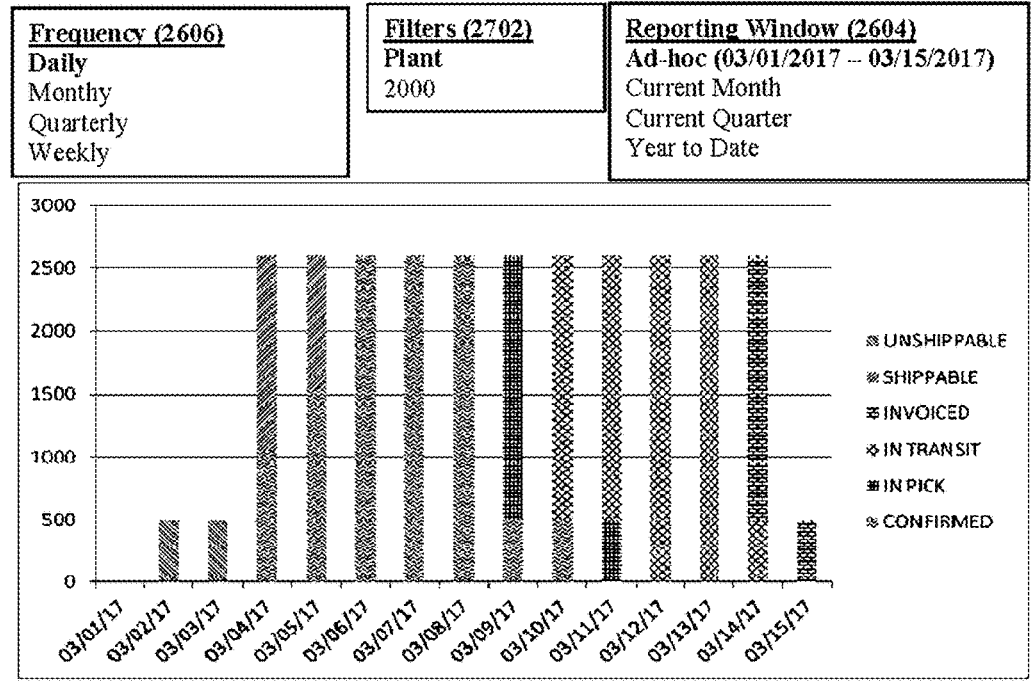

FIG. 25B is a trend plot illustrating the same business measure "amount by shipment state" from table 5, here filtering the data according to a specific manufacturing facility, designated as plant 2000

Figure 26A:
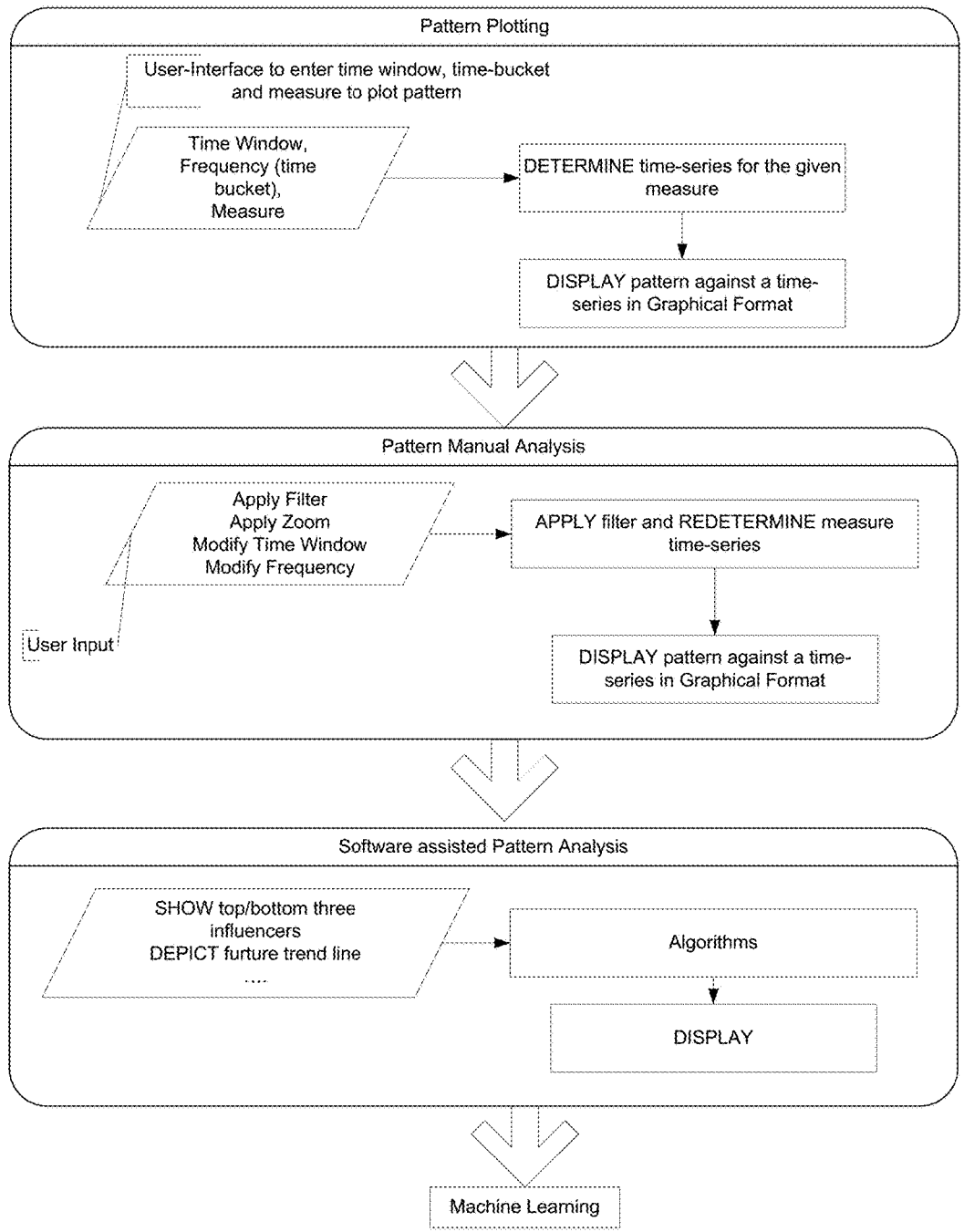

FIG. 26A show a process flow chart illustrating how a pattern can be analyzed either manually and/or by a combination of manual and automated process.

Figure 26B:
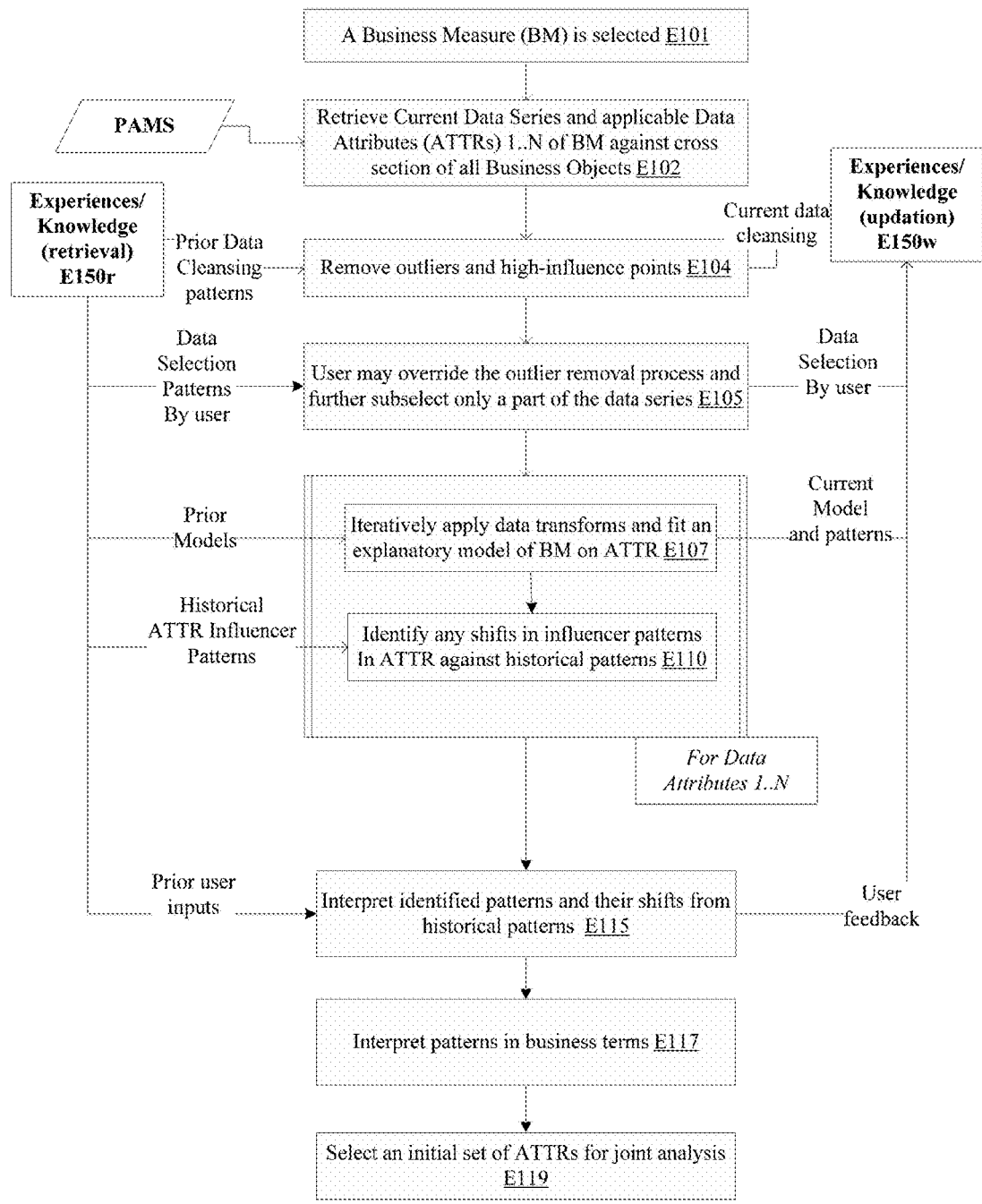

FIG. 26B illustrates how the system can automatically identify an initial data attribute that has the most influence on a business measure. The system is using a self-learning system that shows how prior models, and historical influencers, were used to fine tune the analysis and update the system's EKDB (Experience Knowledge DataBase) (knowledgebase). This allows experience from this analysis to be used to help in future analysis.

Figure 27:
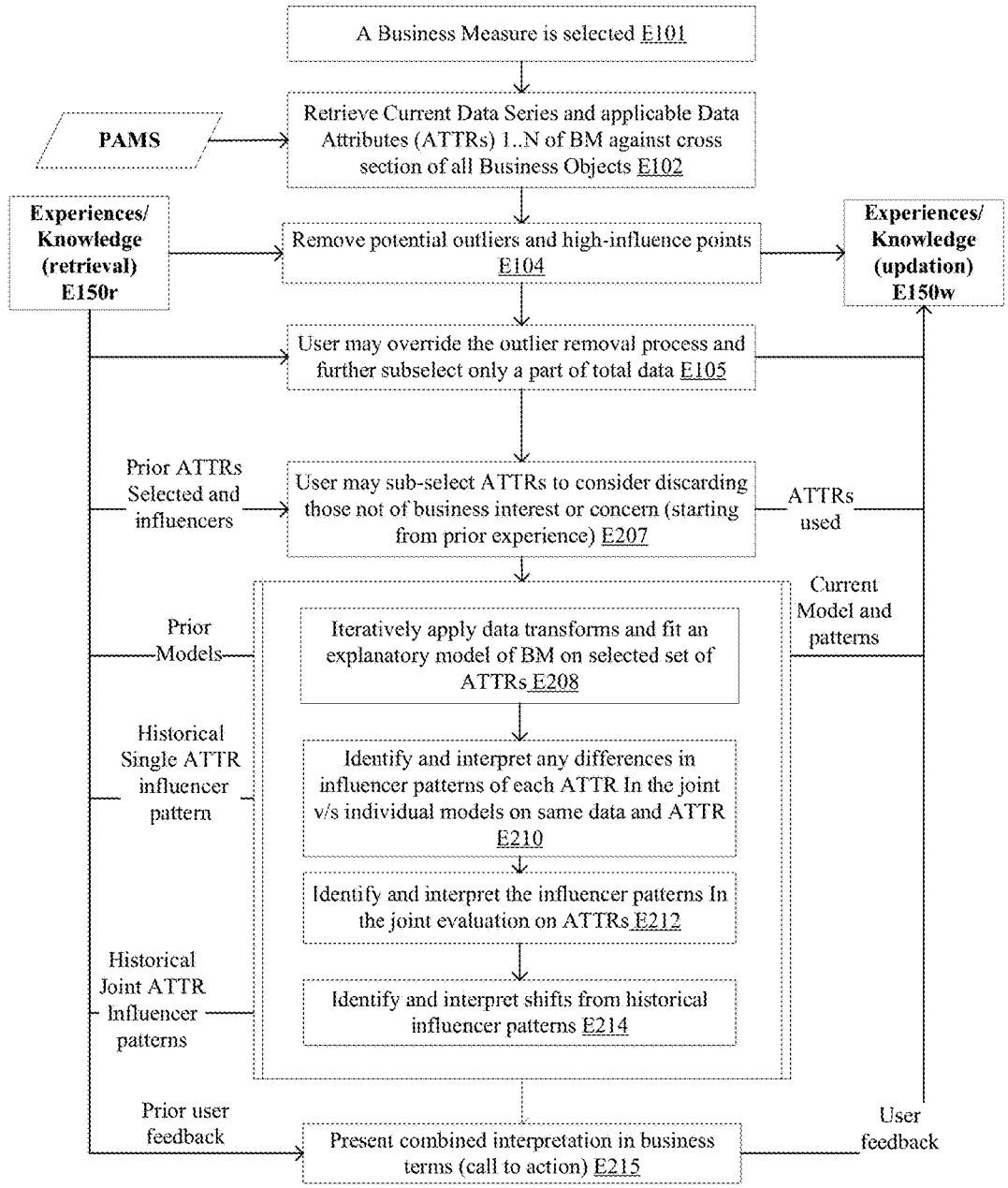

FIG. 27 shows how the EKDB store can be used to identify and order key influencer data attributes in the context of an already selected set of data attributes for a business measure.

Figure 28:
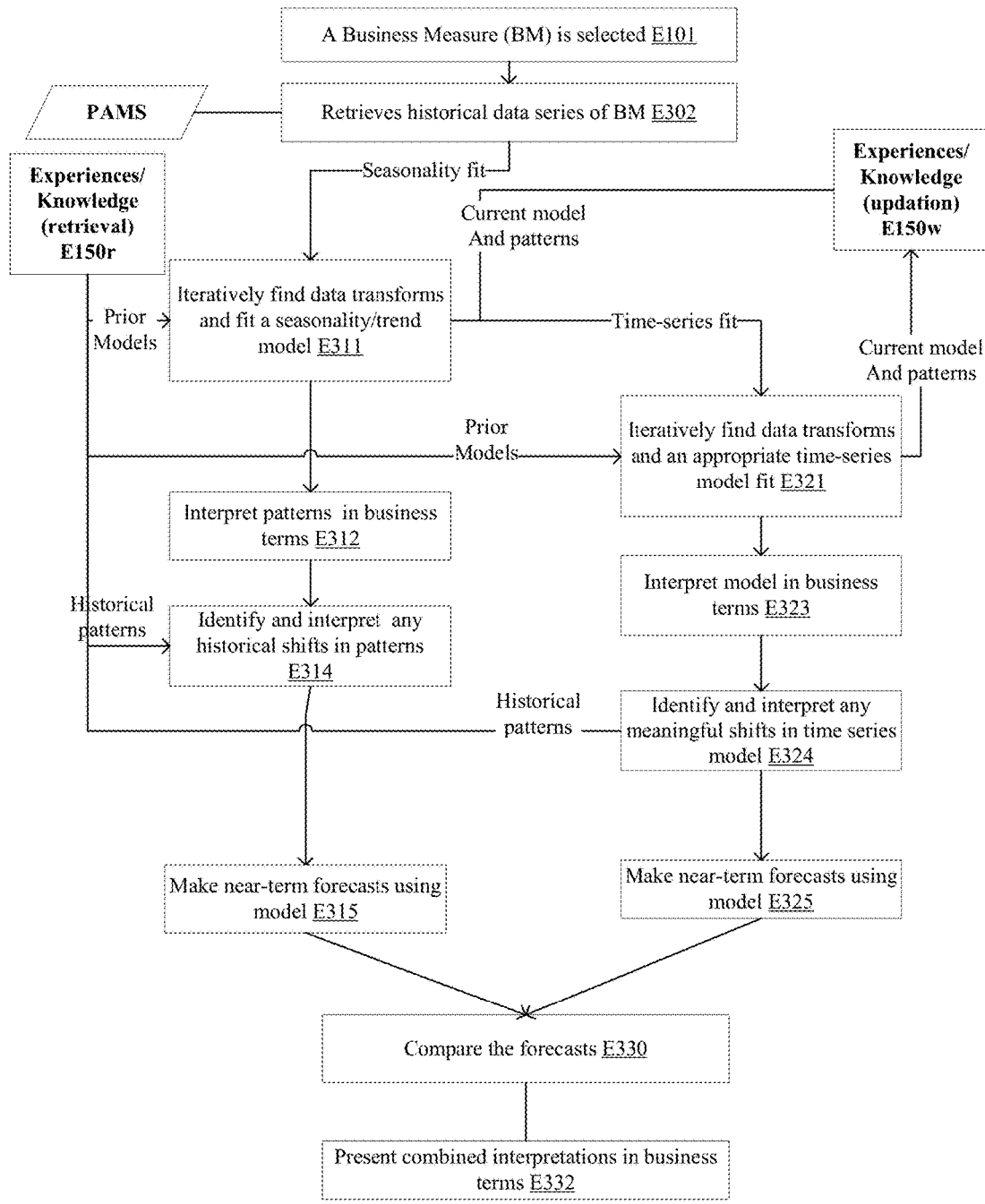

FIG. 28 shows how the EKSB store can be used in a time series analysis of a business measure, as well as to set a predictive model score for a business measure.

Figure 29:
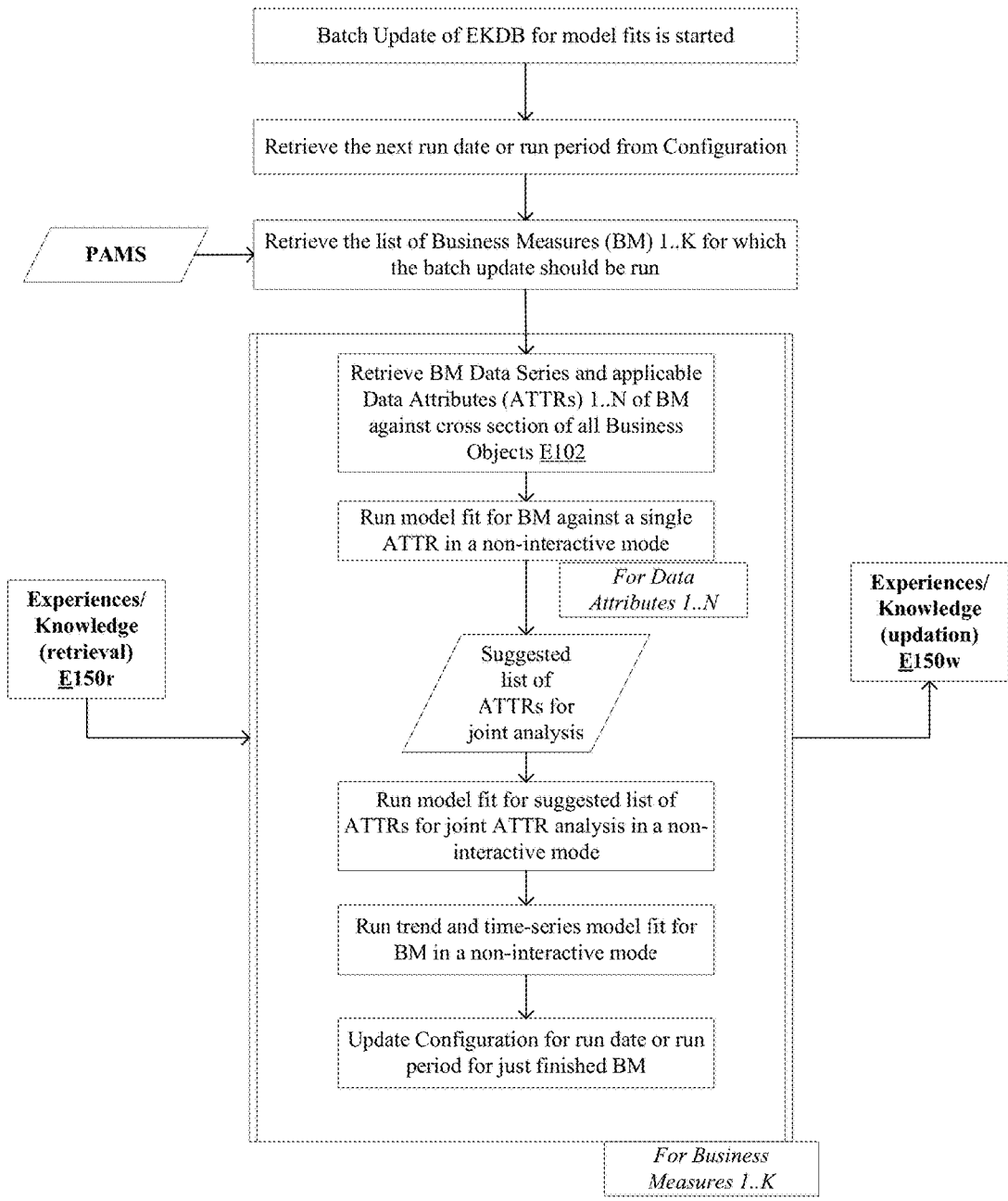

FIG. 29 shows how a batch process can be used to build the models of FIGS. 26B-28, as well as to EKDB Store updated with respect to the historical record of various business measures from the PAMS store

DETAILED DESCRIPTION OF THE INVENTION

Although the present application focuses more a novel PAMS (Process Agnostic Measurement Store) database, and various machine learning based business measurement systems and methods, the present application is based extensively on applicant's previous Process Agnostic Data Store (PADS) database systems and methods. These PADS methods were previously discussed in applicant's parent application Ser. No. 14/328,123, the entire contents of which are incorporated herein by reference. These PADS techniques will be discussed in detail shortly.

As a high level overview of the invention's PAMS methods, which will be discussed in more detail shortly, in some embodiments, the invention takes the raw business data as it streams in, parses it, and incorporates it into the invention's unique process-agnostic data store (PADS) on a continuous basis, and feeds the process-agnostic measure store (PAMS) on a continuous or periodic basis. This update into PAMS may take place in two distinct parts.

The PAMS database may be viewed as having an attribute store and a measure store. The first part of the PAMS update may update the PAMS attribute store in a manner that is specific to objects and serial numbers along with validity of each attribute. If an entry is already found, the validity is truncated for the existing entry and the future entry marked valid till an end of a given time horizon. This facilitates speedy fetch of relevant attribute for the corresponding times.

The second part of the PAMS update may update the PAMS measure store. This captures events, quantities and amounts for the objects and serial numbers and linked process chain objects. As before, if an entry is already found, the validity is truncated for the existing entry and the future entry marked valid till the end of a given time horizon. This also facilitates speedy fetch of relevant attribute for the corresponding times.

In some embodiments, the invention may then utilize the PADS data to obtain a current snapshot of business process objects, which gives insight into the current business status. The invention may also utilize the PAMS data for depicting shifts in business pattern (e.g., finding trends).

These PAMS techniques facilitate rapid detection of shifts or trends because the business status information is now available in PAMS for any time window in history. The system can determine any given business status by using key business measures for business objects. These are often further automatically sliced and diced (e.g. transformed) by the system according to various object attributes.

To determine trends (changes over a set period of time) in any given business status, various business measures and attributes, usually obtained at the business object level, can be retrieved from the PAMS data store (database). The PAMS data structure can be used to fetch this object level data for the relevant historical time window. This data can then be compared and analyzed at near real time speeds because the data can be obtained from the PAMS data structure with relatively little computational effort.

The invention is thus able to combine the advantages of a live (real time or near real time) data model with more sophisticated, and time-corrected methods of providing various business measurements. The invention also provides a rapid way to detect trends in these business measurements.

In other embodiments, to be discussed, the invention is also able to use machine intelligence methods to monitor user actions (e.g. user queries), learn from these user actions, and use its observations of these user actions to proactively offer its own measurements and trend analysis as well.

Review of PADS Techniques:

Although, as previously discussed, the various systems and methods described herein can be used by many different types of organizations for many different purposes, the systems and methods disclosed herein are particularly useful for helping businesses manage complex business processes across multiple locations, vendors, service providers, and customers. Thus throughout this discussion, various business processes and business applications will be used as specific examples of the invention in operation.

As previously discussed, the PADS system addresses the limitations of current state of the art OLAP type BI systems in solving a business's need for the ability to deeply assess the impact of internal events, external events and non-events on their business processes and transactions in real-time, based on rules that can be updated as business needs change in a self-learning framework.

According to the PADS system, such fast and deep analysis can be facilitated by using a process-agnostic method and data model to record and analyze relevant enterprise data. Data from varied processes (examples: Sales, Supply, Manufacturing) can be stored in a relatively raw format, and modeled to facilitate uniform automated access, irrespective of the originating process that generated the raw data. The PADS data oriented system and method also facilitates easy cross-linkage, pattern recognition and "what-if" type analysis of data across processes.

In some embodiments, the PADS system may be an automated system or method for detecting and reporting exceptions to various different real-world processes. Generally these real world processes are formed from various real world things (e.g. goods, products, raw materials in a business context) and various real world activities that are often performed on, or using these various real world things. An activity, for example, might consist of a simple step such as ordering a product, placing something on hold, shipping a product, one step in a manufacturing process, and so on. Usually at least some of these various real-world things and activities in turn are linked together to form real world processes. Thus a real world manufacturing process might combine multiple raw material things and various manufacturing activities to produce a finished good. A real-world delivery process might combine multiple raw material things (e.g. various products to be shipped, and the shipping carton) and multiple activities (accepting the order, loading the products into the carton, bringing the carton to the shipping location, shipping the carton, finally delivering the carton to the customer, getting the receipt, getting payment for the order, and so on.

Figure 1:
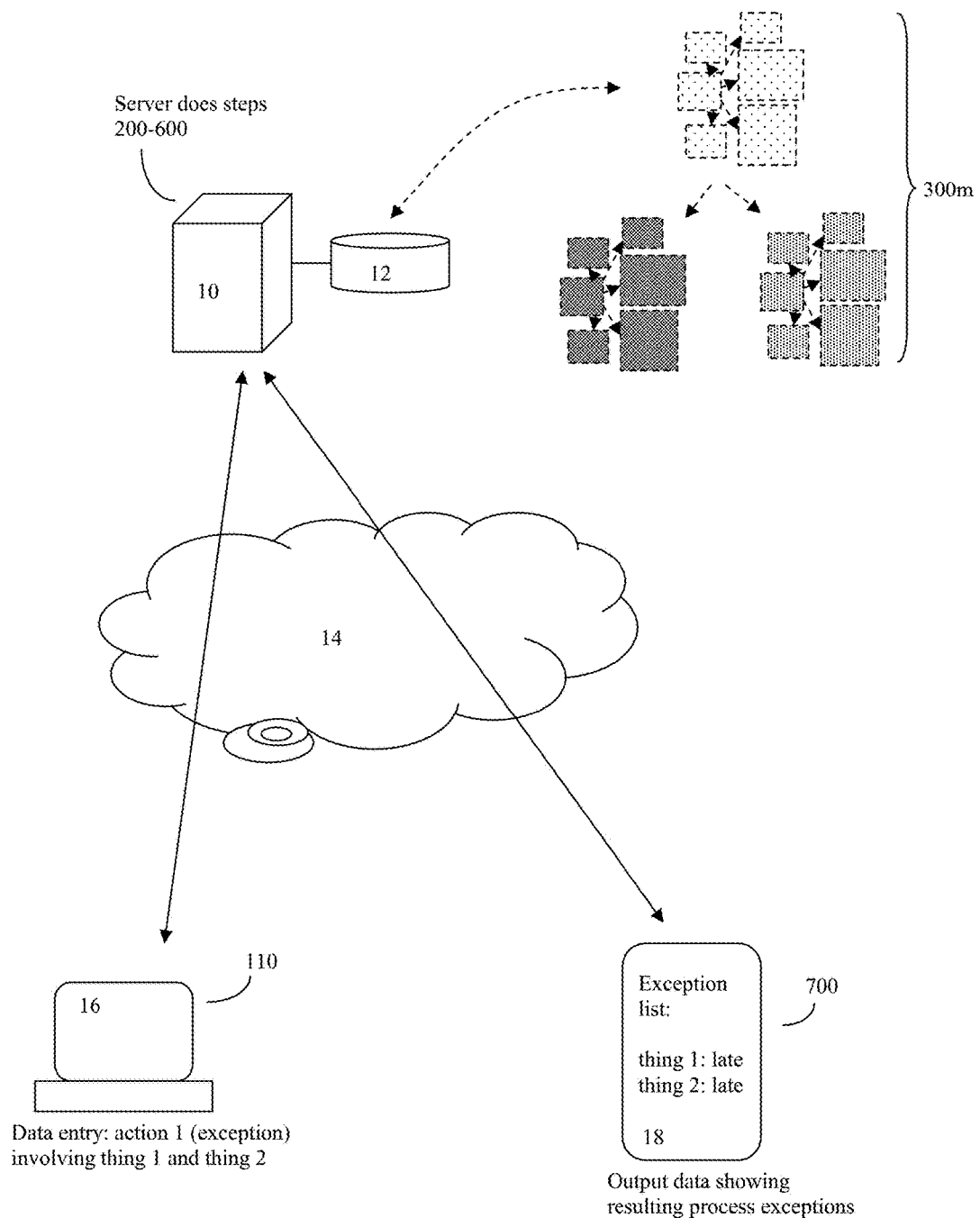
FIG. 1 shows how the methods disclosed herein may be implemented on a computer server system, connected to various other computerized devices through a network such as the internet.

FIG. 1 shows how the methods disclosed herein may be implemented on a computer server system, connected to various other computerized devices through a network such as the internet.

According to the invention, at least one computer processor, such as a processor located in a computer server (10) can be used to receive raw data properties pertaining to various real-world things and activities. These raw data properties will generally comprise data such as when-where data (e.g. the location and time that the thing or activity is or may be taking place), attribute data (some attribute data may comprise link attribute data), identifier data (e.g. thing-activity identification code to identify with specificity what thing or activity is involved), and quantity data (e.g. how many things, or how much money was involved, etc.) associated with these real-world things and activities.

Although this raw data could be input directly into the computer housing the computer processor, such as server (10), often at least some of these raw data properties may be received from a human or automated user by way of a remote, network connected computerized device (such as terminal or computer or tablet computer or smartphone (16) and a computer network connection (e.g. internet connection 14). Generally the remote computerized device (16) itself will have at least one remote processor. In some embodiments, this remote processor will do some preliminary data processing, such as accepting and error checking the raw data properties from the user, and automatically linking these raw data properties to other information. This other information can, for example, be information relevant to the object header or thing-activity identifier data (for subsequent use by the PADS database objects). In this embodiment, computer (16), optionally assisted by ERP type data entry software or other data source software (110) thus uses its at least one remote processor and its network connection (14) to receive raw data properties from the user along with other information such as object header information and/or thing-activity identification information. Here "thing-activity" identifier information can be, for example, a serial number or other identification scheme to uniquely identify which particular thing or which particular activity is covered by this particular set of raw data.

In real time, or as these raw data properties are received, the invention will typically use at least one computer processor (such as server processor(s) on server 10) to create and store these raw data properties, thing-activity identifier data and any link attribute data in computer memory a PADS database with various PADS database objects (see FIG. 3). In a preferred embodiment, these PADS database objects may be stored in rapid access computer memory such as RAM or flash memory (for higher access speeds). In this regard, use of in-memory computing techniques, such as the SAP HANA system, can be useful. Alternatively the PADS database objects may also be stored on computer disk memory and other forms of computer memory. The computer memory used by the PADS database objects is shown in FIG. 1 as (12), and a diagram of some of the PADS database objects in the computer memory (12) is shown as (300m).

These computer memory based PADS database objects generally comprise object header information and at least one set of when-where data, attribute data, thing-activity identifier data, quantity data and object exception information.

According to the PADS method, when the object header information and other information is received (the object header can either be received along with the raw data properties such as from device (16), or alternatively the object header information can be obtained by using computer processor (s) (10) to compare the raw data properties against a previously defined set of categories of real-world things and activities, classify this raw data according to these previously defined categories of real-world things), the system then (preferably in real-time) will also determine the object exception information.

This object exception information can be understood as being an automated way of having the computer scan the raw data properties, and determine if anything is not as expected or as desired. If so then in some embodiments, a computer memory record of this exception (e.g. that something is not expected or desired, and related information) can be stored in the PADS database objects in computer memory in an exception information data field (see FIG. 3, 300.5).

More specifically, this object exception information can be obtained by using the computer processor(s) (e.g. in server 10) to compare the raw data properties against a set of previously defined baseline properties of a defined set of real-world things and activities. Is there a match, or is something not right? The system is configured to automatically determine if any of the raw data properties represent an exception from these baseline properties. If an exception is found, it can be stored in computer memory (12) and PADS database object memory (FIG. 3, 300.5) as object exception information. From a terminology perspective, those PADS database objects that have at least one exception (e.g. at least one item of stored object exception information) will be designated as "exception marked PADS database objects".

In the PADS system, at least one computer processor (again such as one or more server processors in 10) can be used to link at least some different PADS database objects (comprising data pertaining to real-world things and activities) together to form real-world processes. This can be done by various methods, such as by setting the link attribute data in the different PADS database objects to create appropriate links according to at least one set of process linking rules. Other linking methods will also be discussed shortly.

For example, a product sales process might link order activities, various things for sale, shipping activities, billing activities, product return activities, complaint activities, and the like. Here the set of process linking rules (e.g. software) can be used to let the system know that some things and activities should be linked together in the product sales process. From a terminology perspective, those PADS database objects that are together by setting this linked attribute data will be designated as "linked PADS database objects". Again, in a preferred embodiment, the above steps will be done in real time, at least as the raw data is received by the system. Here "real time" will generally mean times between 0 to 5 minutes, and often times less than 60 seconds.

After the above steps have been done, and then preferably on a real-time basis, and/or additionally according to other timing criteria, the invention can automatically use at least one computer processor (e.g. server 10) and at least one algorithm to analyze these various exception marked PADS database objects, and various linked PADS database objects. In particular, the system can then determine an impact that any exception marked PADS database objects has, via the linked PADS database objects, on the status of at least some real world processes. As a result, the system (e.g. server 10) can determine if there are any real-world process exceptions. The system can then use its computer processor (and various external computerized devices such as device (18) and software (700) to output data pertaining to at least some of these real world process exceptions.

Figure 2:
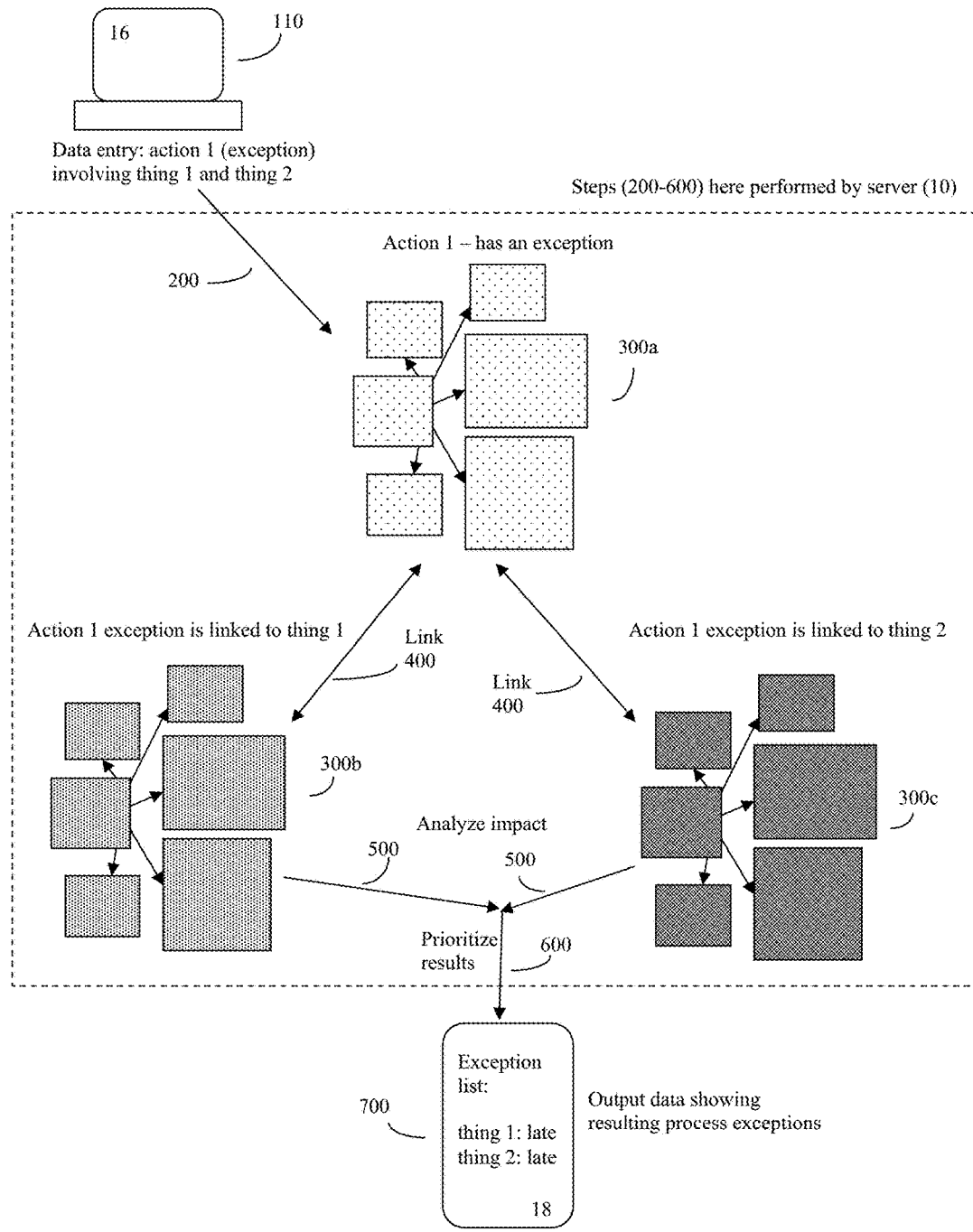
FIG. 2 shows more detail of the system where data (typically involving various business processes involving various real-world things and activities) is received from various human and non-human data sources (often from external computerized device). This data may be analyzed and stored (often in real time) in the computer system's memory as a series of process agnostic data store (PADS) objects linked together to form various real world processes (e.g. business processes). Thus when any exceptions occur, the system can rapidly compute how these exceptions impact the various real world processes, as well as rapidly output data pertaining to the resulting real world process exceptions.

FIG. 2 shows more details of this system and example of the system in action. As before the raw data is received (often into a server 10) from various human and non-human data sources (e.g. from external computerized device 16). Here some of the various software steps (described in more detail in FIG. 5 and elsewhere) taking place in the processor (s) and memory of server (10) are shown.

In this example, raw data involving an "action 1" that ultimately will impact two different goods (here, called "thing 1" and "thing 2") is entered using a remote computerized device (16) optionally as handled by data source software (110). Then as per FIG. 1, this data is transmitted over a network such as the internet (14) to server (10) which then is running some or all of the software (100 see FIG. 5) responsible for implementing the invention's methods.

In this example, assume that there is a problem. Perhaps both things were to be shipped on the same transport, where action 1 represents this transport activity, and the problem (exception) is that the transport is delayed.

As the raw data is received, it is analyzed at the server (10) using various software modules (200, see FIG. 5 for more detail) and is automatically stored in the server's system memory (12) as a series of process agnostic data store (PADS) objects (300a). The data pertaining to thing 1 and thing 2 (here represented by PADS objects (300b) and (300c) are linked to the transport activity object (300a) because they are both connected to the same transport activity.

Note that this transport activity PADS object (300*a*) can also be linked (via linking process 400, see also FIG. 4) with other PADS objects for other activities (not shown) to form a larger real world process, such as a sales and distribution process (not shown).

Thus when any exceptions occur, the system can trace the links (using software modules 400), analyze the impact of any exceptions (using software modules 500, see also FIG. 5 and elsewhere) and rapidly compute how these exceptions impact the various real world processes. The impact of the exceptions can also be prioritized for reporting purposes as well according to other software modules (FIG. 5, 600, see also FIG. 6 and elsewhere). This allows the system to rapidly (preferably real time) output data pertaining to the resulting real world process exceptions. This data can be output on computerized device (18) or elsewhere.

In the example shown in FIG. 2, the prioritization software has concluded that the impact of the exception (delayed transport) is that both thing 1 and thing 2 will be late, and that according to the prioritization criteria (software module 600), thing 1 is more important. Thus the server (10) transmits data (e.g. to smartphone 18) (with the aid of software module 700) showing that both thing 1 and thing 2 are likely going to be late, and that thing 1 is more important. Thus thing 1 is reported first.

Put alternatively, and as also will be discussed further, in some embodiments, the PADS system may use at least one computer processor (again this can be in server 10) and at least one algorithm to analyze these exception marked PADS database objects and linked PADS database objects and determine an impact of these exception marked PADS database objects and linked PADS database objects on a status of at least some of real world processes. This allows the system to determine various real-world process exceptions. Note that although preferably this will be done automatically by the system on a real-time bases, in some embodiments this can also or additionally be done by the system on a non-real time basis as determined by schedules set according to other criteria. For example, the accounting department may also wish to schedule their own runs and analysis according to a calendar schedule, such as one a day, week, month, quarter, etc. Alternatively an auditor may wish to schedule a surprise audit of the system's state at a certain time and date, and so on.

The PADS system may use various different software schemes and linking methods to link the various PADS database objects. Some of these will be discussed in more detail in FIG. 4 and related paragraphs. Generally, the invention's linking methods (400) enable PADS database objects, such as (300*a*), (300*b*), (300*c*) that comprise data pertaining to real world activities and things to be linked to any number (including zero) of other different PADS database objects comprising data pertaining to real world activities and things. Thus, for example, any given PADS database object, pertaining to things, such as (300*b*) and (300*c*) can be linked with zero or more different PADS database objects comprising data pertaining to different real world activities, such as (300*a*). Here the system may use at least one processor (again often located on server (10)) to create, delete, change or otherwise alter at least some of these links according to at least one set of business process link configuration rules.

FIG. 3 shows a more detailed view of the logical links and data fields of a PADS database (shown in FIG. 5, 300) schema in a standardized Entity-Relationship (ER) notation showing different database entities and conveying key relationships among them, including the components of each entity's primary keys (PK) shown in the upper half of each entity's diagram box. The "1:N" notation shows that an object in one entity may be associated with zero or more related objects in another entity but not vice versa. For example one object in Header entity (300.0) may be associated with multiple objects in Identifiers entity (300.1). The "FK" (Foreign Key) notation associated with a field in an entity indicates that value in this field may be used to locate the object, in this or more commonly another database entity, which contains the primary information about that particular object. This PADS database object scheme allows various business things and activities to be decomposed into values such as time and place (what-where), quantity, identifiers (useful for linking to other objects), and various attributes, and stored in computer memory. In a preferred embodiment, the system also stores exception data in the PADS database object at the time that the object is initially created.

In some embodiments (in particular to OLAP type BI based systems for broader and deeper type business management purposes), the PADS database objects operate by abstracting raw-data into a small number of general but enterprise relevant categories. In these embodiments, the same basic type of abstraction will operate, regardless of the specific business process that the raw data belongs to. These basic categories can include:

Object Header information 300.0, which can store fundamental details for all PADS objects; Identifier Data 300.1, which contains various data object identifiers, and is useful to help in the linking process; Attribute Data 300.2, which can contain all the parameters that do not belong to the other cases; When-Where Data 300.3 which can contain location and time based parameters, Quantity Data 300.4; and Exception information 300.5. This data model helps uniformly store and access data irrespective of whether the data belongs to different areas such as sales orders, purchase orders, production orders, shipping documents, invoices, plant maintenance orders, and the like. As previously discussed, having all data from all relevant business processes packaged into a unified model greatly facilitates fast access for various OLAP type pattern recognition and what-if analysis purposes.

Note the difference between prior art methods, and the PADS methods. The PADS (and PAMS) system teaches use of database objects which are relatively generic (e.g. process agnostic). By contrast, prior art enterprise application data models generally tended to use customized database objects that were relatively specific to the artifacts specific of the business activity at hand. Thus, for example, in a sales system, the key prior art database objects might be limited to customers, finished goods, sales order header, sales order lines, and so on. In a procurement system the key prior art database objects might be limited to vendors, raw materials, purchase order header, purchase order lines, and so on. By contrast, the invention's process agnostic methods impose no such limitations—activities across multiple such processes are harmonized into the PADS database.

Note also that in prior art large enterprise systems, some of these objects might only be references to a master data management system object—for example materials in place of finished goods and raw materials, or business partners for vendors and customers.

While such prior art data models might be sufficient for various custom-built applications, use of such specific database objects still leaves much to be desired. For example, in such a data model, any searches generally have to be specific for a material or a business partner. Thus it is difficult to give a legacy OLTP system an ability to handle searches for a business partner who is both a vendor and a customer. Additionally, with regards to legacy systems, the burden of adding new searchable attributes (e.g. a new warehouse location) generally requires additional custom programming, and is thus both slow and expensive. With legacy systems, adding other new functions, such as creating linkages between a given sales order and a purchase order, also generally to requires additional custom programming, with the same drawbacks.

By contrast, the PADS objects method, and the associated PAMS system, based on process agnostic objects, allow for more generic data models that are significantly more flexible and easy to configure. Indeed the invention's PADS objects approach allow for improved forms of statistical analysis and machine self-learning, because the system is better able to handle data that spans multiple business process.

Regarding Linking:

Links can be static links, or data driven (e.g. dynamic) links. FIG. 4 shows one method of how the system can use PADS data to link various "things" (stored as PADS database objects) to various activities (also stored as PADS database objects).

According to one automated method, linking data can be stored as FK (foreign key) data (see FIG. 5 (300.1), (300.2), (300.3), (300.4), (300.5)), which can be used to provide the various fundamental linkages at a static level.

Often, however, the linkages may be data driven (e.g. dynamic). For example, if an activity puts a certain material on hold, then the Attribute Data 300.2 may be examined to find the fields (e.g. rows) where the attribute name is "material" and the attribute value is that specific material. This in turn allows the system to find the relevant SERIAL NUMBERS which in turn allows the system to find to all of the other header objects that are then evaluated for impact by this activity.

FIG. 4 shows an example of this type of data driven (e.g. dynamic) chain of determination in operation.

Here an Object Header (300.0) field (e.g. table row) identifies a real-world "thing" (if the PADS database object is for a thing). If the PADS database object is for an activity (300.3, 300.4), then the Object Identifiers 300.1 field, which contains a set of associated Identifier-value pairs, can be used to indirectly link the activity to other "things" by means of having at least one Identifier-value pair in common with the thing.

Consider for example, a WHEN-WHERE type of Activity, where Material M-12 has been put on hold because of short inventory.

For every Identifier-and-value pair in the WHEN-WHERE field 300.3 (e.g. table record) being processed, the system can first look up the matching rows in the OBJECT IDENTIFIERS field (300.1), and match the input Identifier to the ATTRIBUTE field, and its value to the ATTRIBUTE VALUE field. This process can be repeated for every pair of Identifier-and-value contained in the Activity record.

This process thus finds the IDENTIFIERS Table rows which have at least one specified Identifier-value pair in common with the Activity record being processed. The foreign key (FK) SERIAL NUMBER field in the IDENTIFIERS Table records can then be used to provide the requisite cross-linkage to identify the HEADER Table records in which the SERIAL NUMBER is the primary key (PK), thus achieving the proper linking.

FIG. 5 shows a more detailed block diagram (100) of some of the major software components of the present invention's system and method. Here these major software components may be called, in the alternative, "PADS database object management software".

In the PADS system, at least one and often multiple data sources (110) can provide raw data into the system pertaining to various things and activities. These input data sources can include a business's own enterprise resource planning (ERP) Systems (111), as well as the electronic data interchange (EDI) Systems of outside agencies, such as various business partners (112).

In some embodiments, the ERP system (111) used as the source of primary data about various things and activities can be a legacy ERP system (for example: SAP ECC, Oracle E-Business, JDEdwards EnterpriseOne). Similarly for (112), the EDI Systems of business partners (example: suppliers, logistics providers) can be used to provide additional information about various things and activities as well.

As an example consider an order (activity) for a thing that is a raw material. Here a supplier may provide periodic updates on this order, such as completed stages of production, preparing for delivery, an advanced ship notification (ASN), and so on.

Additionally, other External Data sources (113) or Social Media sources (114) may also be used to obtain data. These types of external data sources may provide additional inputs that may or may not relate directly to a single business object or activity; instead their correlation is discovered by the system. For example, imagine that a natural disaster renders a region temporarily inaccessible: this might be correlated to suppliers and customers, warehouses and logistics providers; and consequences can be delay in receiving raw materials or a decision to delay shipping to a customer, and so on. Such business impact must be uncovered, assessed and prioritized. Alternatively input from business rating sources, such as Dun & Bradstreet, may also be incorporated. In an analogous manner, various Social Media data sources (example: twitter) may be integrated into the system by way of identifying and correlating the input to relevant business things or activities.

The data input formats and methods (120) may be varied in form, interfaces and use of various communication methods, as is known to be fairly typical in any large enterprise system today. Here this layer of software in the FIG. 5 system architecture diagram has been simplified. Data may be transmitted as simple flat file objects (121) (example: comma separated values—CSV) using file systems, HTTP methods (122) or RSS feeds (124). Additionally or alternatively, use of various stateful interaction models (123) such as Java Database Connectivity (JDBC) or simple object access protocol (SOAP), or RESTful webservices and mobile feeds may also be used.

The computer networks used (see FIG. 1 (14)) may be generally-connected endpoints on LAN/WAN systems, generally-disconnected endpoints such as Mobile devices (125), the internet and associated internet connected devices, and the like.

As previously discussed in FIGS. 2 and 5, the raw input data may be stored, interpreted, and transformed (200) by parsing it for conformity to syntax (210) and then recording it in the system (220) for any backtracking needs. The data can also be analyzed for semantic correctness and completeness, and various error correction software can be invoked in case any errors or missing data elements are detected. Here for example, the system can automatically flag aberrant raw input data as erroneous, and flag it for subsequent review by a designated user or the sender. Alternatively the system may trigger certain automated corrections.

Here for example, if a date field was expected in the data, but the input date format is incorrect, or the input date did not include the year, the correct answer can often be automatically inferred by the system. Similarly if a business partner name is present, but the partner's identifier serial number is missing, the system can also attempt to automatically auto-correct based on various pre-defined rules (230). These correction methods may be maintained via configuration rules, or errors may be corrected based on rules self-learned by the system using various machine learning software methods (240).

After the raw input has been filtered for errors, it goes through an automated process that identifies the relevant business activity or activities (250) represented by the data. Following this phase, the required PADS database objects are created (260) in the process-agnostic data store (PADS) database (300).

For example, a material (e.g. a thing) at a shipping location could be placed on hold (an activity, where an absence of an activity is also an activity). This in turn may impact numerous business partners, orders, KPIs, etc.). This hold could impact a number of sales orders for that material, a new order being created in a manufacturing process, or require that the confirmed delivery date being for a purchase order that in turn is tied to a sales order, be updated.

In association step (400), after the raw data has been automatically input into the PADS database, the system next correlates the PADS database objects to any relevant business process or processes (410), things (420), activities (430) and to any applicable patterns (440) based on historical data. This helps determine the scope of each input data record in the PADS database system at that moment.

The next step, impact analysis and exception determination (500) can be a continuous activity that often will be triggered in real-time as new data arrives. Alternatively this step can also be triggered by other criteria, such as the passage of time, or other pre-defined triggers as discussed previously.

Here the system may use various methods of assessing the impact of various exceptions. These methods can include rule-based methods (550), historical data-based methods (560) or historical pattern-based methods (570). The key difference between the latter two (560 and 570) is that the historical data based methods (560) are based on a statistical abstract of historical data, while the pattern based methods (570) may be based on various patterns in the historical data that can be inferred using various types of machine learning methods. The invention may often combine different assessment methods as well. Here for example, the system may automatically handle a business exception that is taking too long to clear by using a first rule (e.g. an "over 5 days" rule) as well as a second rule based on historical data (e.g. an "age exceeds 66 percentile of historical data" rule).

The system can then compute the impact of various exceptions on various processes, things and activities. These can include the impact of exceptions on various transactions (510), processes (520) and pre-defined metrics or KPIs (530).

Particularly large processes (e.g. processes formed from combinations of other processes, here termed "mega-processes") can also be handled by the system. When such "mega-processes" are defined in the system, then the linkages between the various impacted objects and processes may be determined using pre-defined linkage attributes. This allows the impact processing to continue over all impacted processes, transactions and objects (540). For example: a sales order in a sales process may be linked to a delivery document in the delivery process, or to a procurement order for a raw material in the supply process. All of these different processes could be adversely impacted by a credit hold placed on the customer who placed the original sales order. For such mega-processes situations, it is useful to configure the system to clearly identify which initial exception (and resulting impact) is the cause, and which resulting impacts are the effects.

In addition to analyzing raw data, and determining the impact of various exceptions on various processes, the system can also be configured to automatically estimate the relative urgency and the magnitude of such impacts. For example, an exception, such as raw data showing that a material (thing) has been placed on hold (an activity) can potentially impact several order lines, some of which might be more urgent than others. Here the system can be configured to determine (for example by examining their imminent schedule delivery date, or by examining the value of the orders) that the impact of the exception on some orders will be more important than the impact of the exception on other orders.

To do this, another set of software modules (600) can be used to prioritize the impact of various exceptions on various categories such as urgency, magnitude of impact, cost of inaction, and the like (610). Here for display purposes, higher (more severe impacts) may be analyzed according to various pre-defined algorithms, and be reported as most urgent first, ranged by color coding as to urgency, be given numerical ratings, and the like (620).

After the impact results have been analyzed in (600), the system may also employ various software modules (700) to provide an intuitive visual interface to the end user. In some embodiments, these software modules may be implemented on various remote computerized devices (e.g. FIG. 1 (18)), while in other cases, these software modules may be implemented on servers (10), or split between servers (10) and various remote computerized devices (18).

The subsequent paragraphs present further details of the various system components and methods.

FIG. 6 shows a software flow chart giving a high level view of the how the invention operates. Raw data is parsed, transformed, interpreted, identified as a new business object (e.g. a new sales order or a manufacturing order for one or more "things" or products) or alternatively as a process activity on an existing business object (e.g. a material or "thing" temporarily placed on hold). The data is automatically checked and auto-corrected (to the extent possible) and then stored in the PADS database. More specifically, here the system automatically attempts to review and correct the raw data, including any data flagged for errors, and any system generated corrections or gap-fills. The system can also alert human users in the event that it encounters problems that it cannot automatically correct.

After the data is received, parsed for syntactic correctness and repaired for missing or miscoded data elements based on pre-defined or self-learned rules, the data is now ready to be entered into the application's PADS database as various PADS database objects. To do this, the system's processor(s) and software analyze or parse the data down into various parts, and then correlate the various PADS database objects to applicable activities, processes, things and patterns.

Here, the invention's PADS object type data model does not impose any particular process's semantics on the stored data. Instead a set of configuration rules is utilized to attach meaning, such as business meaning, to the various data fields of the various PADS database object. To accommodate a particular enterprise's idiosyncrasies, various user definable configuration rules may be used.

FIG. 7 shows a software flow chart showing step (200) of FIG. 5, showing the various processes of raw data storing, interpretation, and transformation in more detail. Here raw data (often obtained from external computerized devices (16) via a network connection (14)) can be parsed, processed, and stored as various PADS objects and processes. The input is parsed into various PADS object tables or fields shown in FIG. 3, such as the Object Header table or field (300.0), the Attribute Data table or field (300.2), various Identifier Data tables or fields (e.g. 300.1) and so on. The resulting PADS database object is stored in the PADS database (12) (300).

FIG. 8 shows a software flow chart showing how one embodiment of the impact analysis and exception creation determination module shown in FIG. 5 (500) can operate. In particular, FIG. 8 shows the process of run-time object co-relation when, based on the raw input data, new PADS objects are being created. Note that in a preferred embodiment, the invention determines exceptions as the raw data are received and the PADS database objects are initially created, as previously shown in FIG. 7 (500*a*).

The PADS database object activities can be reported in a number of different ways; and this reporting can be based on different parameters or a combination of parameters. In some embodiments, a PADS database object for an action, such as a vendor order acknowledgement, might be reported as an entry in a purchase order field or table in the PADS database object (300.4 Quantity Data). Similarly an activity that is a loading/transport confirmation or ASN (assigned serial number), might be reported as an entry in a line item or schedule line field or table in the PADS database object (300.3 When-Where Data).

However here the problem is that it is difficult to predetermine all possible activities and use cases. This is because there are a large number of unpredictable combinations, and there is a danger that some activities may not be associated with the appropriate things.

To address this difficulty, in a preferred embodiment, the system identifies PADS database object things that are associated with PADS database object activities by matching a complete set of that activity's identifiers (300.1) against the attribute data (300.2) for other PADS database things or activities. This method allows a PADS database object for an activity to be associated with any number of other PADS database objects representing either other things or other activities.

One complication, however, is that not all activities are applicable in a business process at all times. For example, for an apparel maker, a cutting activity might become inapplicable after an order line item enters a later sewing stage or washing activity.

To address this type of issue, according to the invention, the PADS database objects may also have "states" database fields or table entries (see Object Header 300.0 in FIG. 3). These "states" fields are used to define the starting and ending stages of a business process where that particular activity is applicable. The system uses a set of configuration rules to determine if the "state" of a PADS database object is such that the particular activity is applicable or not. Thus even if the PADS database object activity identifiers (300.1) match the attribute data (300.2) for another PADS database object thing or activity, if the state values are incorrect, then the system automatically knows that no association should be made. Thus the "state" data essentially acts as an "AND" logical operation on the other matches, and ensures that PADS database objects are only linked if the state data is appropriate.

FIG. 9 shows a software flow chart showing further details of how the system analyzes raw data pertaining to various activities. In particular, it shows some of the steps involved in populating the When-Where Data (300.3) and Quantity data (300.4) of the PADS database objects shown in FIG. 3.

Planned vs unplanned activities 1: Planned activities are considered to be activities that are either expected to happen if all is going well, or activities where things may not always be going well, but at least the deviations are likely enough to be anticipated, and the activities can often be analyzed using objective or numeric data.

In the business process context, a planned activity may be an activity that is expected to occur during a specific time frame, or that produces or consumes specific quantities of resources. In a preferred embodiment, the system is configured to analyze raw data reporting on various activities and populate various PADS database object data fields, such as (300.3, 300.4), etc. accordingly. The system can then automatically analyze these particular PADS database fields, and numerically determine (at least for planned activity) if the activity is going correctly, or if an exception for that activity should be reported. Unplanned activities will be discussed shortly.

For some types of planned activities (e.g. when the baseline properties used for exception analysis are available, and may be relatively simple data such as specific baseline properties of key dates, locations, and quantities), then exception analysis can be relatively straightforward. Here the system can determine, for example, if any of the actual (e.g. real world received) raw data properties represent an exception from the baseline (expected or desired) properties.

To do this exception analysis, the system may use various types of PADS database object information (e.g. the object header and when-where information) and determine if the actual when-where data matches the desired or expected key date baseline properties. Similarly the system can also use various types of PADS database object information (e.g. the object header information, location information) to determine if the "where" part of the when-where data corresponds to the base line location value. Likewise the system can use various types of PADS database object information (e.g. the object header information, and the quantity information) quantities to determine if the actual quantity data corresponds to the baseline quantity value. If the system finds a lack of correspondence, then the system can flag this PADS database object as being an exception.

Linking or Chaining Activities (Processes) Together to Form Larger Chains of Processes (Mega-Processes):

Note that as previously discussed, a PADS database object can describe a standalone activity (e.g. be associated with a single business process), or alternatively it may be associated with other PADS database objects for other activities, and thus be associated with multiple processes that together form a series of linked processes (which may alternatively be termed chained activities, process chain, or mega-process).

For example a material master record could be represented as a stand-alone PADS database object, and a purchase order could also be represented as a part of a stand-alone PADS database object procurement process. However it is often more useful to consider the broader context, and consider linkages to other things and activities, and consider how any given activity is itself part of a larger process. To assess the impact of an activity on a larger process, as well as on other things, in a preferred embodiment, the system can associate the PADS database objects for activities with larger processes. This can be automatically done using the association software module (400) and (410) as shown in FIG. 5. These modules in turn can use various business process chain configuration rules, which may be user defined, to allow the system to track these relationships.

Planned vs unplanned (non-planned) activities 2: Unplanned (non-planned) activities are generally defined as those activities that are rare, difficult to quantitate using precise rules, or otherwise undefined or unexpected. For example, if the raw data properties pertain to an activity, and if the system finds no previously defined baseline properties for these raw data properties, then the system can operate in a fallback mode. Here the system can use its at least one computer processor to further designate these types of activities as non-planned activities, and mark (e.g. store in memory in the appropriate data field) the fact that these PADS database objects are non-planned PADS database objects. The system can then use various pre-defined fallback rules for non-planned activity to analyze both these non-planned PADS database objects, as well their associated linked PADS database objects. This allows the system to attempt to determine what impact these non-planned PADS database objects and linked PADS database objects have on various real world processes. Examples of unplanned or unexpected activities: customer credit rating being set on hold, warehouse shutdown due to power outage, and the like.

Alternatively, if the raw data properties pertain to an activity, and if the system finds that no previously defined baseline properties for these raw data properties, then the system can operate in an alternative fallback mode. Here the system can again use its at least one computer processor to further designate these types of activities non-planned activities, but here the system can mark (e.g. store in memory in the appropriate data field) the fact that these PADS database objects are "affected" PADS database objects. The system can then use various pre-defined fallback rules for non-planned activity to analyze both these affected PADS database objects, as well as their associated linked PADS database objects. This allows the system to attempt to determine what impact affected PADS database objects and linked PADS database objects have on various real world processes.

FIG. 10 shows a software flow chart showing how the system determines if various activities are either "planned" activities (e.g. expected with standard rules for exceptions already established) or "unplanned" (not expected, so the system will automatically analyze exceptions using fallback rules because when standard rules are not available). In some embodiments, the system may be configured to obtain such fallback rules by analyzing patterns of historical data (e.g. automatically determine what has happened in similar situations like this in the past) and use this historical data to estimate the impact of any unplanned deviations.

For either planned or unplanned activities, in some embodiments, the system may also use various impact analysis rules to analyze the real world process exceptions according to the object exception information (300.5), and link attribute data stored in their respective PADS database objects. This allows the system to automatically determine various consequences of the exception, and classify the impact of the exception on various real world processes in terms of urgency, magnitude of impact, and cost of inaction. The system can then output data pertaining to these consequences and impacts.

The system may use various algorithms to analyze the impact of various exceptions. Often some impacts may be so minor that reporting them may be not be useful, or even harmful because important impacts alerts could be lost in a sea of minor impact reports. To help ensure that trivial impacts are not overly reported, in some embodiments, the system may use algorithms that analyze the impact of the exception marked PADS database objects and linked PADS database objects on the status of at least some real world processes by using the linked attribute data in the exception marked PADS database objects, and any linked PADS database objects, to determine any potential real world process exceptions. The system can then use a "likely impact database" (this can have information pertaining to the likely impact that the exception marked PADS database objects will have on the corresponding potential real world process exceptions, and can be based on various criteria including impact rules, historical impact data, and historical impact patterns) to determine if the projected impact exceeds at least one threshold of significance. If so, then the impact can be reported as a real world process exception, and if not the impact may be ignored for reporting purposes.

Even among non-trivial impacts, some problems will be more important than others. To help distinguish among the importance of various reported impacts, in some embodiments, the system may use one or more thresholds of significance to also categorize a priority or severity of the real world process exception, and also output this priority or severity data as well. Such impact rules can be based on historical impact data, or (for business systems) historical impact patterns based on business process rules, business process historical data, business process historical patterns, and so on.

FIG. 11 shows a software flow chart showing a first example of the invention's exception analysis system in operation for a business process. Here someone in the sales organization has informed the system that a particular "thing" (product normally available for sale) has been put on delivery hold (perhaps the product in inventory was defective and needed to be replaced). This "product hold could thus potentially impact the delivery dates for various customers, as well as other related processes.

In an important distinction over prior art OLTP methods, note that the management would probably not want to spend money advertising if a product is on hold pending a potential recall. Thus, in an ideal system, this product hold should automatically alert personnel in marketing that the product advertising schedule has been or should be also put on hold. According to the invention, if advertising actions and processes are incorporated into the invention's PADS database, then the system could automatically generate an advertising alert for that product.

FIG. 12 shows how, in this first example, the system can analyze the impact of placing a product on hold on subsequent (e.g. dependent) processes and activities. Here if the system determines that this hold is "planned", the system can use its standard expected value algorithms to determine the resulting impact. However if the system can't find standard rules, and determines that this "on hold" event was not "planned", and the impact of this exception can be analyzed using various fallback rules. Either way, the impact of placing the product on hold has on various downstream processes, such as various customer delivery dates, and even remote processes such as advertising, can be almost instantly calculated and reported by the system.

FIG. 13 shows a second example of the invention in operation. Here the system is handling the impact of bad weather on product shipments (e.g. from a supplier). In FIG. 13, the system is doing the initial data input and PADS object creation steps of the process.

FIG. 14 shows how, in this second example, the system then analyzes the impact of this supplier shipment delay on subsequent (e.g. dependent) processes and activities. As before, if the system determines that this shipment delay was "planned", the system can use its standard expected value algorithms to determine the resulting impact. However if the system can't find standard rules, and determines that this "shipment delay" was not "planned", and the impact of this delay can be analyzed using various fallback rules. Either way, the impact of the shipment delay on various subsequent business processes can be almost instantly calculated and reported by the system.

FIG. 15 shows a third example showing how the system can handle more complex OLAP or BI type problems, such as the problem of a supplier or vendor having chronic reliability or delinquency problems, using automatic data feeds from various external sources. Here the system can be configured to automatically receive business status information from an outside source, such as Dun & Bradstreet (D&B). The system can be configured so that the D&B status of all vendors are continually monitored on an automatic basis.

Here the system shows its value because it can automatically estimate the impact of an impending vendor failure on various products (things) or activities provided by that vendor, and hence on other dependent business processes. Here the data has been obtained from a business rating service provider (such as D&B), and the system is automatically linking this information, via the PADS database objects, to the various products or services provided by this problematic vendor.

FIG. 16 shows the continuing analysis of the third example previously discussed in FIG. 15. Since vendor failure is usually less likely than more routine problems of placing products on hold or bad weather, this third example is a good example of an unplanned activity. Here, for example, the system could use various fallback rules such as "analyze if vendor is experiencing a chapter 7 (vendor will likely cease operations) or chapter 11 (vendor will likely continue to operate) bankruptcy" and estimate the impact on various dependent processes accordingly.

Further Discussion

A key benefit of the PADS system is its capability to define relatively complex and deep chains of processes that accurately depict how certain business activities in a real enterprise may span multiple business processes. Example: a sales order may be related in part to a procurement order, shipment and deliveries, accounts receivables, and so on. The system can determine the appropriate linkages to reproduce these processes, and thus accurately predict how exceptions can impact real world business processes, giving deep OLAP type business intelligence at high (real time OLTP like) speeds.

Another benefit of the PADS database object type data model and architecture is that it allows both activities to be monitored for their variance from the plan, as well as the downstream impact of exceptions on other activities, processes, and things to be monitored.

Another benefit of the PADS system is that it uses historical data analysis and their impact on existing and future business objects to discover useful patterns that can subsequently be automatically used by the system to improve performance. For example: when a delivery on a purchase order for a particular raw material is delayed consistently, this affects the on time delivery (OTD) metric for the vendor or the material. The invention can make use of this historical data, and the previously discussed PADS database objects and methods, to use this historical data to predict, in real time, what impact present exceptions are likely to have on various business processes. This is possible because the PADS database objects methods allow both online transaction processing (OLTP) and online Analytic processing (OLAP) data (used for business intelligence systems) to reside on the same database, thus allowing both types of analysis to be done on a real-time or near real-time basis.

The PADS system may be used for almost any type of real world based business process. This can include, but is not limited to, cases where the real world processes are business processes, and the real world things are products such as goods (for example as defined under the UCC uniform commerce code). The real world things can also include customers, vendors, raw materials, other types of materials, and finished goods. Business services may also be managed using this system as well.

Specific examples of various activities managed by the system can include putting products on hold, releasing products for delivery, shipping products, product sales, product returns, changing one or more raw materials to work-in-process goods or finished goods, creating purchase orders for products, creating purchase orders for raw materials for a product, delay in receiving products, delay in receiving raw materials for a product, and so on. Other real world activities can also include various shipment methods, various manufacturing steps of a manufacturing process, a distribution process, marketing activities, financial activities, real estate activities, personnel activities, regulatory activities, quality assurance activities, and the like.

Extensions to the PADS System

One of the key features of PADS data-model is its ability to execute impact analysis across all linked processes within a "mega process" (FIG. 5, 540). The linkages between the related processes within a "mega process" are stored in the PADS data-model as "process chain" links.

The system's process-chain model links related process objects as parent object and child object(s). This link is established by pre-defined linkage attributes. These links are defined and stored as process chain configuration data (FIG. 18, 1800). To create a linkage between two process chain objects in the process-chain store, the attributes values of all the defined linkage attributes must match (FIG. 17, 300.6).

FIG. 17 is an extension to the PADS data-model previously described in FIG. 3, and shows the logical links and data structures of process-chains within the PADS data-model.

FIG. 18 shows an example of how two process objects can be linked via predefined linkage attributes, thus creating object links in the process-chain store (FIG. 17, 300.6).

In FIG. 18, a sales order line in a sales process is linked to a delivery document line in a delivery process. Both the sales order line and the delivery object/s line have attributes such as: sales order number and sales order line, which should match to establish a linkage.

Note further that in FIG. 18, a delivery document is created for a sales order. This delivery document is considered to be (and termed) a child object with respect to the parent sales order object.

As FIG. 18 shows, once the link is established linking the SERIAL-1 (sales line) with the SERIAL-2 and SERIAL-3 (delivery lines), the system then knows that all of the events/attributes reported to SERIAL-2 and SERIAL-3 (delivery lines) can also be directly considered for impact analysis on the SERIAL-1 (sales line).

Process Agnostics Measure Store (PAMS) as an Extension to PADS Data-Model

A typical enterprise measures its business via setting up various "business measures". These measures, although based on various types of raw data, usually require "cleaned up" data, rather than the raw data itself.

These various measures usually also reflect various additional transformations and operations on this raw data. These transformations and operations are typically chosen to provide a higher level assessment of the state of the business, so that changes in those business measures can be tracked over time (e.g. track improvement or decline in one or more enterprise businesses functions).

In order to track changes in business measures, the measure values should ideally be available for any particular time window in the system's (e.g. PAMS or PADS) history. Often these various business measures are further sliced and diced (e.g. analyzed) by various enterprise business units (for example product-group units, or manufacturing-facility groups) to determine what those trends (business measure pattern shifts) that are of most interest to these units/groups.

In the PADS/PAMS system, both business measures and business units are calculated/stored at the business objects level (for example at the sales order line level).

To determine historical business measures (along with ability to apply filter across any desired business attributes), the system is configured to store various key business measures and attributes both within a time-series and at business object level. This methodology allows the object data to be both easily fetched for various historical time window(s), as well as to be easily filtered. The results can then be compared in time phased manner, and used for further analysis.

The PADS data model provides the current snapshot of business process objects, which gives insight into current business state. With the available PADS data, the current business measure(s) can be efficiently fetched. Additionally, because the PADS data-model timestamps each of its entities, the PADS data model can also be used to fetch historical data.

However, at least for deriving "cleaned up" historical data, there are also a few limitations associated with PADS data-model.

1. The PADS data-model stores the current state of the business object information, but this does not necessarily reflect that that this information was or was not valid in past. For example, consider the following: a sales order-line SL1 is created for 10 PCs on 1MAR2017 and on 6MAR2017 the order-line quantity was changed to 20 PCs. Then on 10MAR2017, the order-line was confirmed. From 1MAR2017 through 9MAR2016, the sales order-line SL1 was in a "created" state and from 10MAR2017, the sales order line was in a "confirmed" state until another milestone was reached. If a given business measure requires the amount on sales order-lines in a "created" state, the PADS model may provide the SL1 quantity of 20 PCs from 1MAR2017 through 9MAR2017, which is incorrect. So here, the raw data needs some cleaning up.
2. To reverse a given business event, the PADS data model marks original events for deletion and stores relevant deletion timestamps. For example, consider the case where sales order-line SL2 was "confirmed" on 2MAR2017 and then on 9MAR2017 this order-line SL2 was then "un-confirmed" (reversal of confirmation). Within the PADS model, the current state of "confirmation" events for order-line SL2 is marked for deletion using a reversal occurrence timestamp. However the information on the validity of the confirmation event for order-line SL2 is unavailable in PADS model. As a result, the PADS model will consider order-line SL2 as "un-confirmed" from 2MAR2017 through 9MAR2017. So again some cleanup is needed.
3. Moreover, in order to query the PADS model to determine a given business measure as-of certain moment of time, multiple queries are needed. This is inefficient (e.g. slow and consumes more processor and memory resources) as there is no direct read based on time validity. For example, consider FIG. 24. In FIG. 24, sales order line SL3 was "un-shippable" on 1MAR2017 and became "shippable" on 3MAR2017. With the PADS data-model, in order to determine the "un-shippable" state time-window for the order-line SL3, the subsequent state, which is "shippable", must also be determined. Likewise, the shippable state time-window is determined by fetching its subsequent state. It would be preferable, when the historical state is desired, to use a direct read on the order-line SL3 state, with the appropriate validity period, to avoid having to use multiple PADS queries.

To resolve this issue, according to the invention, a new PAMS data-model and method has been introduced. This new data-model and method simplifies the process of deriving business measures from multiple events, and also prestores various business measures for various business objects, over various validity periods.

Likewise to incorporate changes in business object attributes, cleaned up attributes must also be stored with their validity periods. Thus in a preferred embodiment, the invention uses this new "Process Agnostics Measure Store" (PAMS) as an extension to PADS model. The PAMS extension is particularly useful for business measure purposes, because it stores "cleaned up" data in a form better suited for historical data retrieval. The PAMS data-model (FIG. 19, FIG. 20) can also be used for the "Impact Analysis and Exception Determination" (FIG. 5, 500) from historical data (FIG. 5,560), and patterns (FIG. 5, 570) modules previously shown in FIG. 5.

In the PAMS model, any business measure can be either following object information, or a combination of:
1. Milestone dates (for example requested delivery date)
2. Transaction quantities/amount (for example sales order quantity/amount, rejected quantity/amount)
3. Stages (for example sales order unconfirmed, sales order delivered)

The PADS data-model stores, for an object (FIG. 3, 300.0), milestone dates as when-where data (FIG. 3, 300.3) and quantities/amounts as quantity data (FIG. 3, 300.4). The object stage is determined by the latest when-where/quantity data reported to PADS.

PAMS approach is to combine the when-where and the quantity data, for a given object, from the PADS data-model and also assign time-window validity to this combination. In this discussion, generally whenever dates are discussed, this should be construed as implying "time-window validity". This combination of data is stored as various "measures" in the PAMS data-model, and by using measure validity; these measures can be fetched for any particular time-bucket in the system's history.

The PADS data model stores object attributes as attribute data (FIG. 3, 300.2). To derive historical patterns, changes in attributes are also assigned validity in the PAMS data-model. The PAMS data-model stores object attributes in a manner that is similar to the way in which the PADS model assigns date level validity.

In the real world, various business processes are typically linked. Similarly in the system various business process objects are also typically linked. For example a "sales order" object is typically linked to an "outbound delivery" object. These objects are linked to each other in the PADS data store via process chain (FIG. 19, 300.6) links.

In such scenarios, the main object measures are dependent on updates made to their respective linked objects. For example, the sales order-line stage will become "in-pick" when its corresponding linked delivery-line also is "picked". In order to make this "in-pick" status readily available to a corresponding sales order status, the measures from the linked objects must get hooked to the corresponding sales order-line. In the PAMS data model, our approach is to store all needed measures from the linked objects against the main object.

THE PAMS Data Model

In the invention's PAMS approach, business measure trending is performed on business units (defined as attributes in PADS data-model) that highlight changes (e.g. improvement/decline) in the respective business measures for these units.

As per the business measure trending requirements, the PAMS data-model (FIG. 19) is divided into "measures" 1900 and "attributes: 1902, forming a measures and attributes store. Both the measures and attributes stores have "valid-from" and "valid-to" columns. These are used to define the "validity" for the given record. By using the relevant measures and attributes validity field, the system's processor can easily fetch the appropriate business measures and attributes according to their particular time-window in history. These can then be further analyzed according to historical time-buckets as per the desired measurement.

PAMS Update

As previously discussed, the PAMS data-model/database is an extension to PADS data-model and makes use of data from PADS.

With each update to the relevant PADS "when-where" 300.3 and "quantity" data 300.4, the corresponding PAMS measure entry 1900 gets created. Similarly, with each update to the relevant PADS attributes 300.2, the PAMS attribute entry 1902 gets created. In order to segregate the PADS and PAMS updates, an intermediate storage buffer (FIG. 20, 2000) is created in PADS, which stores the reference key of the PADS attribute, as well as the "where-where" or "quantity" data being updated.

Periodically, the computer system can then automatically run a job that reads the unprocessed records from intermediate storage buffer 2000, and creates new entries in PAMS, and then marks these records as processed in intermediate storage buffer 2000. Since PADS and PAMS update are segregated, the PADS data-model is not necessarily the only data source for PAMS. In general, data from any data-model can be collected and stored in the PAMS data-model.

Thus although in this disclosure, use of PADS systems to provide data for the PAMS system is frequently discussed, the use of the PADS system is not intended to be limiting.

The PAMS techniques described herein are particularly useful for performing measurements of high business interest. For example, using these techniques, source data for business measures can be continuously correlated (e.g. the PAMS database can be fed on a continuous basis from the PADS data store) with particularly important "influencing" business attributes, such as customers, customer attributes, product, product attributes, location, location attributes, and people and people attributes.

For example, the PADS data store can capture enterprise relevant data by segregating the data into various categories based on the data type, in a manner that is irrespective of the process in question. These categories can include Date based parameters, Quantity based parameters, Amount Based Parameters, and Location based parameters, as well as additional parameters as desired. As previously discussed, this process allows data to be uniformly stored and accessed irrespective of process (e.g. whether the data belongs to Sales Orders, Purchase Orders, Production Orders, Shipping documents, Invoices, Plant Maintenance orders, and the like), and the PAMS database inherits these process agnostic aspects.

In particular, and as previously discussed, the invention's PAMS based methods, which use time-corrected data, allows for much faster speed (and reduced processor cycle time and energy) to fetch and analyze attributes that impact business measures. This allows for improved user selected and/or automatic detection of patterns, as well as better correlation measures to the most relevant attributes/activities/quantities.

FIG. 20 describes the update of PAMS from PADS as data source and how measures and attributes get updated based on configuration. The PAMS update logic is divided into attribute updates and measure updates. Since the attributes update logic is generic, one common routine exists for the attributes update. However, since measures are calculated from a combination of "when-where" and "quantity" data, as well as measure specific logic, the measure values vary. To handle this variation, a separate routine may be created for each measure, which can then get called during the various measure updates.

FIG. 21 describes the PAMS measure update logic in more detail.

FIG. 22, along with Table 1, describe an example of measure records creation in the PAMS system.

TABLE 1

| | PAMS Order Stage Measures for Sales Order-line SL3 | | | | | | | |
|---|---|---|---|---|---|---|---|---|
| Columns | Record 1 | Record 2 | Record 3 | Record 4 | Record 5 | Record 6 | Record 7 | Record 8 |
| MEASURE | Unshipable | Shipable | Shipable | Confirmed | Confirmed | In PICK | In transit | Invoiced |
| MEASURE TYPE | Stage | Stage | Stage | Stage | Stage | Stage | Stage | Stage |

TABLE 1-continued

PAMS Order Stage Measures for Sales Order-line SL3

| Columns | Record 1 | Record 2 | Record 3 | Record 4 | Record 5 | Record 6 | Record 7 | Record 8 |
|---|---|---|---|---|---|---|---|---|
| VALID FROM | Mar. 1, 2017 | Mar. 3, 2017 | Mar. 4, 2017 | Mar. 4, 2017 | Mar. 6, 2017 | Mar. 9, 2017 | Mar. 10, 2017 | Mar. 14, 2017 |
| SERIAL NUMBER | 1 | 1 | 1 | 1 | 1 | 1 | 1 | 1 |
| MEASURE COUNTER | 1 | 1 | 1 | 1 | 2 | 1 | 1 | 1 |
| MEASURE DATE | Mar. 1, 2017 | Mar. 3, 2017 | Mar. 4, 2017 | Mar. 4, 2017 | Mar. 6, 2017 | Mar. 9, 2017 | Mar. 10, 2017 | Mar. 14, 2017 |
| MEASURE TIME | 13:00 | 09:00 | 14:19 | 14:19 | 11:12 | 14:10 | 16:15 | 10:11 |
| PROCESS | Sales | Sales | Sales | Sales | Sales | Delivery | Delivery | Billing |
| FINAL MEASURE | X | X | | | X | X | X | X |
| QUANTITY | 20 | 20 | 10 | 10 | 10 | 20 | 20 | 20 |
| UOM | PC | PC | PC | PC | PC | PC | PC | PC |
| AMOUNT | 2100 | 2100 | 1050 | 1050 | 1050 | 2100 | 2100 | 2100 |
| CURRENCY | USD | USD | USD | USD | USD | USD | USD | USD |
| AGGREGATE QUANTITY | 20 | 20 | 10 | 10 | 20 | 20 | 20 | 20 |
| AGGREGATE AMOUNT | 2100 | 2100 | 1050 | 1050 | 2100 | 2100 | 2100 | 2100 |
| OBJECT QUANTITY | 20 | 20 | 20 | 20 | 20 | 20 | 20 | 20 |
| OBJECT UOM | PC | PC | PC | PC | PC | PC | PC | PC |
| OBJECT AMOUNT | 2100 | 2100 | 2100 | 2100 | 2100 | 2100 | 2100 | 2100 |
| LOCATION FROM | | | | | | | | |
| LOCATION TO | | | | | | | | |
| MEASURE END DATE | Mar. 3, 2017 | Mar. 6, 2017 | Mar. 6, 2017 | Mar. 6, 2017 | Mar. 9, 2017 | Mar. 10, 2017 | Mar. 14, 2017 | |
| MEASURE END TIME | 09:00 | 11:12 | 11:12 | 11:12 | 14:10 | 16:15 | 10:11 | |
| VALID TO | Mar. 2, 2017 | Mar. 3, 2017 | Mar. 5, 2017 | Mar. 5, 2017 | Mar. 8, 2017 | Mar. 9, 2017 | Mar. 13, 2017 | Mar. 14, 2017 |
| ... | | | | | | | | |

Time Phased Business Measures and Filters

The following example illustrates how the PAMS measure and attribute techniques can be used for time phased business measure determinations. This example draws upon table 1, table 2, table 3, and table 4. This process is also shown in more detail in FIG. 23.

Business Measure: Sales amount by stage; Reporting Window: 1MAR2017 to 15MAR2017, Frequency: Daily

TABLE 2

PAMS Attributes for Sales Order-line SL3

| | SERIAL NUMBER | ATTRIBUTE | VALID FROM | ATTRIBUTE VALUE | IDENTIFIER TYPE | VALID TO |
|---|---|---|---|---|---|---|
| Record 101 | 1 | SALES ORDER LINE | Mar. 1, 2017 | SL3 | SALES ORDER | Dec. 31, 2099 |
| Record 102 | 1 | SALES ORGANIZATION | Mar. 1, 2017 | 3000 | SALES ORDER | Dec. 31, 2099 |
| Record 103 | 1 | MATERIAL | Mar. 1, 2017 | M-12 | SALES ORDER | Dec. 31, 2099 |
| Record 104 | 1 | MATERIAL GROUP | Mar. 1, 2017 | MGRP-1 | SALES ORDER | Dec. 31, 2099 |
| Record 105 | 1 | PLANT | Mar. 1, 2017 | 3000 | SALES ORDER | Mar. 3, 2017 |
| Record 106 | 1 | PLANT | Mar. 4, 2017 | 2000 | SALES ORDER | Dec. 31, 2099 |

TABLE 3

PAMS Order Stage Measures for Sales Order-line SL4

| Columns | Record 8 | Record 9 | Record 10 | Record 11 | Record 12 | Record 13 |
|---|---|---|---|---|---|---|
| MEASURE | Un shipable | Shipable | Confirmed | In PICK | In transit | Invoiced |
| MEASURE TYPE | Stage | Stage | Stage | Stage | Stage | Stage |
| VALID FROM | Mar. 2, 2017 | Mar. 4, 2017 | Mar. 5, 2017 | Mar. 11, 2017 | Mar. 12, 2017 | Mar. 15, 2017 |
| SERIAL NUMBER | 2 | 2 | 2 | 2 | 2 | 2 |
| MEASURE COUNTER | 1 | 1 | 1 | 1 | 1 | 1 |
| MEASURE DATE | Mar. 2, 2017 | Mar. 4, 2017 | Mar. 5, 2017 | Mar. 11, 2017 | Mar. 12, 2017 | Mar. 15, 2017 |
| MEASURE TIME | 10:00 | 11:00 | 12:19 | 12:11 | 14:15 | 15:11 |
| PROCESS | Sales | Sales | Sales | Delivery | Delivery | Billing |
| FINAL MEASURE | X | X | X | X | X | X |
| QUANTITY | 10 | 10 | 10 | 10 | 10 | 10 |
| UOM | PC | PC | PC | PC | PC | PC |
| AMOUNT | 500 | 500 | 500 | 500 | 500 | 500 |
| CURRENCY | USD | USD | USD | USD | USD | USD |
| AGGREGATE QUANTITY | 10 | 10 | 10 | 10 | 10 | 10 |
| AGGREGATE AMOUNT | 500 | 500 | 500 | 500 | 500 | 500 |
| OBJECT QUANTITY | 10 | 10 | 10 | 10 | 10 | 10 |
| OBJECT UOM | PC | PC | PC | PC | PC | PC |
| OBJECT AMOUNT | 500 | 500 | 500 | 500 | 500 | 500 |
| LOCATION FROM | | | | | | |
| LOCATION TO | | | | | | |
| MEASURE END DATE | Mar. 4, 2017 | Mar. 5, 2017 | Mar. 11, 2017 | Mar. 12, 2017 | Mar. 15, 2017 | |
| MEASURE END TIME | 11:00 | 12:19 | 12:11 | 14:15 | 15:11 | |
| VALID TO | Mar. 3, 2017 | Mar. 4, 2017 | Mar. 10, 2017 | Mar. 11, 2017 | Mar. 14, 2017 | Mar. 15, 2017 |

. . .

TABLE 4

PAMS Attributes for Sales Order-line SL4

| | SERIAL NUMBER | ATTRIBUTE | VALID FROM | ATTRIBUTE VALUE | IDENTIFIER TYPE | VALID TO |
|---|---|---|---|---|---|---|
| Record 107 | 1 | SALES ORDER LINE | Mar. 2, 2017 | SL4 | SALES ORDER | Dec. 31, 2099 |
| Record 108 | 1 | SALES ORGANIZATION | Mar. 2, 2017 | 3000 | SALES ORDER | Dec. 31, 2099 |
| Record 109 | 1 | MATERIAL | Mar. 2, 2017 | M-12 | SALES ORDER | Dec. 31, 2099 |
| Record 110 | 1 | MATERIAL GROUP | Mar. 2, 2017 | MGRP-1 | SALES ORDER | Dec. 31, 2099 |
| Record 111 | 1 | PLANT | Mar. 2, 2017 | 2000 | SALES ORDER | Dec. 31, 2099 |

Historical Business Measure Detection and Trending Using PAMS

Most business measure trends can be viewed as being a type of graph or plot of one or more business measures versus time (i.e. against a time-series divided into multiple time-buckets). A typical business measure trends analysis (e.g. FIGS. 25A-25B) consists of following components:

1. At least one business measure or calculated business measure (from two or more business measure) 2602. For example: Sales order lines by stage, on-time delivery performance.
2. A reporting Window 2604: this is the time window for which trends are plotted. For example: current year, current quarter or specified date-range.
3. A Frequency (time-bucket) for which aggregates/averages/snapshot are done 2606. For example: daily, weekly or monthly.
4. Optional filters 2702

As another example, consider the measure: "sales amount by stage". In this example, assume that the reporting window is set to between Mar. 1, 2017 (1MAR2017) and Mar. 15, 2017 (15MAR2017), and the time frequency is set to a daily basis. The results of such a PAMS based query are shown below in Table 5.

TABLE 5

Sales Amount by Stage

| Time Bucket | Measure | Measure Value w/o filter | Measure Value Plant = 2000 | Remarks |
|---|---|---|---|---|
| 1 Mar. 2017 | UNSHIPPABLE | 2100 | 0 | On 1 Mar. 2017 SL3 plant = 3000 |

TABLE 5-continued

| Sales Amount by Stage | | | | |
|---|---|---|---|---|
| Time Bucket | Measure | Measure Value w/o filter | Measure Value Plant = 2000 | Remarks |
| | SHIPPABLE | 0 | 0 | |
| | CONFIRMED | 0 | 0 | |
| | IN PICK | 0 | 0 | |
| | IN TRANSIT | 0 | 0 | |
| | INVOICED | 0 | 0 | |
| 2 Mar. 2017 | UNSHIPPABLE | 2600 | 500 | On 2 Mar. 2017 SL3 plant = 3000 |
| | SHIPPABLE | 0 | 0 | |
| | CONFIRMED | 0 | 0 | |
| | IN PICK | 0 | 0 | |
| | IN TRANSIT | 0 | 0 | |
| | INVOICED | 0 | 0 | |
| 3 Mar. 2017 | UNSHIPPABLE | 500 | 500 | |
| | SHIPPABLE | 2100 | 0 | On 3 Mar. 2017 SL3 plant = 3000 |
| | CONFIRMED | 0 | 0 | |
| | IN PICK | 0 | 0 | |
| | IN TRANSIT | 0 | 0 | |
| | INVOICED | 0 | 0 | |
| 4 Mar. 2017 | UNSHIPPABLE | 0 | 0 | |
| | SHIPPABLE | 1550 | 1550 | SL3 is partially confirmed |
| | CONFIRMED | 1050 | 1050 | From 4 Mar. 2017 SL3 plant = 2000 |
| | IN PICK | 0 | 0 | |
| | IN TRANSIT | 0 | 0 | |
| | INVOICED | 0 | 0 | |
| 5 Mar. 2017 | UNSHIPPABLE | 0 | 0 | |
| | SHIPPABLE | 1050 | 1050 | |
| | CONFIRMED | 1550 | 1550 | |
| | IN PICK | 0 | 0 | |
| | IN TRANSIT | 0 | 0 | |
| | INVOICED | 0 | 0 | |
| 6 Mar. 2017 | UNSHIPPABLE | 0 | 0 | |
| | SHIPPABLE | 0 | 0 | |
| | CONFIRMED | 2600 | 2600 | SL3 is fully confirmed |
| | IN PICK | 0 | 0 | |
| | IN TRANSIT | 0 | 0 | |
| | INVOICED | 0 | 0 | |
| 7 Mar. 2017 | UNSHIPPABLE | 0 | 0 | |
| | SHIPPABLE | 0 | 0 | |
| | CONFIRMED | 2600 | 2600 | |
| | IN PICK | 0 | 0 | |
| | IN TRANSIT | 0 | 0 | |
| | INVOICED | 0 | 0 | |
| 8 Mar. 2017 | UNSHIPPABLE | 0 | 0 | |
| | SHIPPABLE | 0 | 0 | |
| | CONFIRMED | 2600 | 2600 | |
| | IN PICK | 0 | 0 | |
| | IN TRANSIT | 0 | 0 | |
| | INVOICED | 0 | 0 | |
| 9 Mar. 2017 | UNSHIPPABLE | 0 | 0 | |
| | SHIPPABLE | 0 | 0 | |
| | CONFIRMED | 500 | 500 | |
| | IN PICK | 2100 | 2100 | |
| | IN TRANSIT | 0 | 0 | |
| | INVOICED | 0 | 0 | |
| 10 Mar. 2017 | UNSHIPPABLE | 0 | 0 | |
| | SHIPPABLE | 0 | 0 | |
| | CONFIRMED | 500 | 500 | |
| | IN PICK | 0 | 0 | |
| | IN TRANSIT | 2100 | 2100 | |
| | INVOICED | 0 | 0 | |
| 11 Mar. 2017 | UNSHIPPABLE | 0 | 0 | |
| | SHIPPABLE | 0 | 0 | |
| | CONFIRMED | 0 | 0 | |
| | IN PICK | 500 | 500 | |
| | IN TRANSIT | 2100 | 2100 | |
| | INVOICED | 0 | 0 | |
| 12 Mar. 2017 | UNSHIPPABLE | 0 | 0 | |
| | SHIPPABLE | 0 | 0 | |
| | CONFIRMED | 0 | 0 | |
| | IN PICK | 0 | 0 | |
| | IN TRANSIT | 2600 | 2600 | |
| | INVOICED | 0 | 0 | |

TABLE 5-continued

Sales Amount by Stage

| Time Bucket | Measure | Measure Value w/o filter | Measure Value Plant = 2000 | Remarks |
|---|---|---|---|---|
| 13 Mar. 2017 | UNSHIPPABLE | 0 | 0 | |
| | SHIPPABLE | 0 | 0 | |
| | CONFIRMED | 0 | 0 | |
| | IN PICK | 0 | 0 | |
| | IN TRANSIT | 2600 | 2600 | |
| | INVOICED | 0 | 0 | |
| 14 Mar. 2017 | UNSHIPPABLE | 0 | 0 | |
| | SHIPPABLE | 0 | 0 | |
| | CONFIRMED | 0 | 0 | |
| | IN PICK | 0 | 0 | |
| | IN TRANSIT | 500 | 500 | |
| | INVOICED | 2100 | 2100 | |
| 15 Mar. 2017 | UNSHIPPABLE | 0 | 0 | |
| | SHIPPABLE | 0 | 0 | |
| | CONFIRMED | 0 | 0 | |
| | IN PICK | 0 | 0 | |
| | IN TRANSIT | 0 | 0 | |
| | INVOICED | 500 | 500 | |

FIG. 25A is a trend plot for the business measure "Amount by shipment state" from table 5, without any filter.

FIG. 25B is a trend plot for business measure "Amount by shipment state" from table 5, here applying a filter so as to just look at the status of a single source (manufacturing plant #2000).

As shown in FIG. 26A, in some embodiments, the PAMS system can be used to determine trends or patterns in the data. This can either be done manually, by pattern plotting or pattern analysis, or also can be done using software assisted pattern analysis. Here these various methods, and use of the invention's PAMS data model to assist in these various methods, will be described in more detail.

The Experience Knowledge Database (EKDB) as an Extension to the PAMS Data-Model

In some embodiments, the business measures and Key Performance Indicators ("business measures" or "measures") available through the PAMS store, can be combined with an experienced knowledge database (EKBD) to enable the system to learn from the data and experience.

With such machine learning methods, measures can be easily correlated to appropriate data attributes. The system can also be trained to identify the key influencer data attributes as well as detect any shift in the historical pattern of such key influencers. This is valuable to a business user as such insights can help them develop suitable actions—reactive or proactive—to the corresponding underlying real-world entities and business processes.

Not all users like to do the same type of data analysis, however, and many users may have their own favorite metrics. Because there can be many business users on the system, and many different business perspectives, the system can further be configured not to confuse or comingle each user's particular business perspective and metrics. As desired, the system can also be configured to perform various standardized analysis across the system for all users.

Thus some embodiments of the invention can further make use of Experience Knowledge Database (EKDB) data store methods, described in more detail below.

The invention's EKDB store is a type of machine learning method that can play an important role in recording what the user (or the machine itself) has attempted in the way of previous analysis, what was learned and the user's selections and feedback. This approach assists in speeding up future learning processes by speeding up the trial-and-error cycle, detecting shifts in historical patterns, and aligning the insights drawn with user's areas of interest. Of these, the user's areas of interest may be most fluctuating over time as the user is most aligned with the underlying real-world processes.

Thus, the EKDB store also includes various application programming interfaces (API) designed to prioritize specific experiences with a specific user with respect to the business measure and data attribute, for the purposes of dimensionality reduction, outlier identification, data range sub-selections quantiles, the prioritizing the iterative process of model selection and fit, and so on.

When there are multiple candidate (e.g. previous user analysis) experiences to draw upon, in some embodiments, the system can be configured to give priority to the more recent experiences (type of analysis). Users can also give feedback to the system by assigning a grade or other merit score to the analysis. Thus if the system suggests a particularly valuable analysis, the user can train the system positively by giving that analysis a high score. If the system is outputting something of low interest, the user can assign a low score. The system can also be designed to give some users (e.g. experienced users) a higher weight than other users (e.g. beginners), at least for purposes of training the system.

In some embodiments, the business user (e.g. the user interested in business metrics and trend analysis) can be allowed to make any arbitrary decision with regards to data selection. Similarly, the design of EKDB can also be oriented to prioritize the sequence of learning models to be attempted (with respect to the particular business measure, data attribute and choices of data range sub-selection quantiles) based on the goodness of fit achieved in past attempts, or the sequence of data transformations to be attempted with respect to the selected model. In this manner, the invention's EKDB store plays a pivotal role in providing a memory of the situations (types of analysis) users have encountered (or run) in the past and their success rates so that future iterations can be attempted in a sequence most likely to achieve success most efficiently. Here efficiency is defined as obtaining the best statistical result, or at least a result that users value.

A further quality of the EKDB store (data store, database) is that it provides a memory of the various learning outcomes. This can include, for example, various model coefficients and their standard errors for every valid model learned with respect to a business measure and a plurality of data attributes as applicable. Analogously, when learning seasonality and trend patterns of a business measure, there will not be any specific data attribute associated with the model, and the EKDB store design should facilitate such wide variations in searches. Thus, this EKDB memory also facilitates detecting any historical shifts in such coefficients or correlations that are meaningful to the user at that moment in time.

Examples of EKDB Analysis, and Machine Learning:

In FIG. 26B, E101, a business measure is selected for analysis. In this and following descriptions of the learning processes, "business measure" is meant to include any analyzable metric, KPI or business measure. The system learns (often via user feedback) if a given data attribute can provide a statistically meaningful explanation for the variations in the business measure across the cross-section of business objects that contribute to the business measure, and, furthermore, if such explanation is exhibiting a meaningful shift from its own historical trend. To clarify, data attributes are often categorical variables as opposed to continuous variables. Categorical variables are also sometimes called factors with two or more levels, often numerous levels.

In E102, the system retrieves the cross-sectional data series for the business measure, and the set of data attributes that are contemporaneous to the business measure data series, from the PAMS store.

Sometimes in a real-world use case, a categorical data attribute may have very high "arity" (e.g. it can encompass a large number of different things). For example, for a large business enterprise, the data attribute "product category" may range from dozens to hundreds or even more categories. In such a case, the arity can be reduced by assigning a threshold significance level, aggregating the lower values in a generic level name. This is a learnable process of dimensionality reduction.

In E104, the System fits a probability distribution to the data series. The distribution is examined for outliers that should not be included in analysis. The metrics for selecting outliers, for example, Cook's Distance or High Influence Points, are based both on heuristics as well as learned from user interactions retrieved from EKDB Store via a read process, E150$r$. The cutoff levels for the business measure, and more importantly any user feedback, can be saved in EKDB Store via a write process, E150$w$, for future use.

In E105, the user may additionally sub-select the data by quantile ranges; for example the user can select or deselect the "tails" or "shoulders" of the data distribution. The user may additionally sub-select the data by filtering for business objects from specific business segments. For example, the user can filter for a set of "business units" and/or "warehouses". This filtering can also be used to reduce the list of data attributes contemporaneous to the data. These selection choices can also be saved via in the EKDB store via a write operation, E150$w$. After this step, the system has a business measure data series to analyze and a set of data attributes from which to identify the key influencers.

A sequence of steps E107-E110 are now applied in a loop on this data series against each element of the set of data attributes as the predictor variable, so if there are N data attributes, there the loop iterates N times.

The system is typically configured so that when fitting a statistical learning model, the residuals of the fit are typically analyzed for conformance to the assumptions of the model, for example for stationarity or Normality tests. In some cases, the system may impose additional requirements, for example distributional properties in ANOVA. If the data fails to meet these tests, the system may take this as indicating a need to transform the data series in such a way that the revised model conforms without distorting the truth. Here the system may try common monotonic transformations, such as the Box or Power transforms.

To help the system learn from experience, this sequence of data transformations to explore can be seeded with a lookup (read) operation 150$r$ in the EKDB Store, where the system will check for prior experiences with various types of transformations for the given data and criteria. The actual transformations that the system ends up using can be saved back in the EKDB Store for future use via write operation E150$w$.

In E108, the system fits one or more statistical learning models, for example ANOVA, to the data series against the data attribute. This process of testing for assumptions, selecting a different data transformation, validating the model and testing the model outcomes for meaningful inferences is iterative in nature. It should also be noted that a suitable learning model may not be always be found. However the process can be expedited by this machine learning process.

The learning outcomes—or a failure to obtain a good outcome—saved back in EKDB Store via a write operation E150$w$ to facilitate detecting historical shifts in influencer patterns.

Once the system obtains a statistically valid and meaningful model, the system now steps through E110 to compare the model predictions against their own historical trend. The system correlates the learned pattern against its own historical norms for the business measure and data attribute as retrieved from EKDB E150$r$. Care is taken to ensure that business measure data subset used is invariant across the different EKDB scenarios being compared. The new patterns are saved in EKDB E150$w$ for future use, primarily for detecting future shifts in pattern.

The analysis results are presented to the user E115. The user can provide feedback on business value of any such detected patterns. This user feedback can be saved E150$w$ in the EKDB for future use.

After looping through the set of data attributes, in E119, the system identifies the data attributes that exhibit the highest correlations with the business measure, and/or determines if such correlations have turned significantly stronger or weaker. This process can also be seeded by the past lessons/user feedback retrieved E150$r$ from the EKDB Store, and results can also be stored back into EKDB store E150$w$ to help with future analysis.

Selected data attributes can also be suggested as candidates for further joint analysis. It should be noted that the selection of data attributes here should not be overly restrictive at this stage.

FIG. 27 shows that the system can attempt to identify and order key influencer data attributes in the context of an already selected set of data attributes for the business measure. This process can employ a learning process, similar to that previously shown in FIG. 26B. Alternatively, in an interactive use case, the user may manually make such a selection at step E207.

In E101-E105, a business measure is selected and the data series retrieved from the PAMS store and sub-selected for analysis.

In E208 the system iteratively applies one or more statistical learning models (for example N-Way ANOVA or Multiple Linear Regression (MLR)), to the data series against the set of data attributes. This step is analogous to steps E107-E111.

The system analyzing the statistical validity and meaningfulness of the resulting fit. The system can also search for the best parsimonious model, using common techniques for eliminating redundant predictor variables such as stepwise regression, collinearity avoidance via VIF analysis and regularization techniques to avoid the risk of overfitting. This allows data attributes that show no meaningful impact in a multi-attribute setting to be weeded out. It should again be noted that a suitable model fit may not always be found. The learning outcomes—or a failure to obtain one—are stored back in EKDB Store E150w to facilitate detecting historical shifts in influencer patterns in future runs.

Having obtained a statistically valid and meaningful model, the system in E210-E214 now steps through to vet the model-generated insights for interpretation.

In E210, the system first compares the influencers against the degree of influence detected when influencer variable was being fit singly against the business measure. It is quite common that relationships with a predictor variable (which may have otherwise appeared significant when analyzed in isolation) do not appear as significant when additional predictor variables are added. The system can automatically interpret such shifts for the user so that the user may update his or her understanding of influencer patterns. This understanding may in turn be useful for driving real-world business decisions in an intelligent direction.

In E212, the system also interprets the joint influencer patterns, and in E214 compares the joint influencer patterns against their own historical patterns retrieved from EKDB Store E150r. In this process, EKDB can be automatically searched for the best match of comparable set of predictor variables in the current data scenario.

In step E215, the system finally shows the user the fitted model results, significance of each data attribute when considered in a joint set of data attributes, and historical shifts in such joint influencer patterns, including any previous feedback from the user retrieved from E150r EKDB Store. Additionally, high influencer data attributes and any specific attribute values, or those with greatest deviances from their historical norms, are identified as potential action candidates for real-world process improvement or follow up business actions. Users may provide feedback to the system regarding the business value of identified predictors, and this feedback can be stored back in EKDB Store E150w for future use. One purpose of saving such feedback is that the system can be trained to not inundate the user with information he or she has already seen and/or previously indicated to be of lesser analytical value.

FIG. 28 illustrates how the system can set a predictive model score for a business measure by performing a seasonality and time series analysis of that business measure. To begin this process, in step E101, a business measure is selected for analysis. The objective of this analysis is to learn of the business measure's seasonality, cyclicality, trend and volatility patterns, as well as to make short term forecasts.

In step E302, the system uses PAMS to retrieve the historical data series of the business measure from PAMS. This data is termed a "temporal" data set.

The user may additionally sub-select the data by filtering for business objects from specific business segments, for example the user may filter by a set of "business units" and/or "warehouses". This causes the PAMS store to select a different set of business objects and, emit a different data series because, as previously discussed, the PAMS store computes business measures on the fly.

The system now fits two different time-series models. It is hoped, although never assured, that the two models will produce similar forecasts. One family of models is used to interpret the data patterns in terms of seasonality/cyclicality and trends, while the other family of models is used to interpret the same in terms of volatility clustering and propagation of shocks or disturbances over time. Together, the two approaches help the system and the user to better understand the behavior of the business measure over time, and make appropriate inferences about the underlying real-world business process.

In step E311, the system fits a seasonal model to the Data Series obtained in E302. In a given time series data, each of these seasonality/cyclicality and trends components themselves can be time-varying, i.e. each such component itself may vary over time. The business measure data series may require data transformations to satisfy the assumptions of the underlying statistical model used or obtain a good fit.

As before, to take advantage of machine learning, the sequence of data transformations can be automatically seeded with a lookup E150r in the EKDB Store to prioritize the potential transformations. Here the EKDB memory is particularly valuable in this process, as best data transformations for a business measure are likely to be relatively stable over time and therefore faster online responses could be produced. The system then iteratively attempts to employ common seasonality-trend Exponential Smoothing models. The fitted model is examined for statistical validity and explanatory power. If a good fit, the model and the data transformations utilized can be automatically saved in EKDB Store E150w for future use.

In step E312, the system interprets the fitted model in business terms. That is, the system represents the underlying real-world business process of the business measure to help the user better understand the applicability of the results in terms of factors such as broad trends (slope), seasonality patterns, and possibly long-term cycles. The system also evaluates the residuals of the fit for stationarity, so that the user is informed of the limitations of the fit. It should be noted that for identifying shifts from historical patterns, only models from the same class and data selection are comparable.

In step E314, the system compares the derived model coefficients (e.g. a vector of coefficients) against their own historical trends (here typically automatically retrieved from EKDB Store E150r). This helps the user understand how the underlying real-world business process is evolving over time.

In step E315, the system uses the derived model to make near-term forecasts, along with estimates of the accuracy of these forecasts. The number of future periods to forecast is either automatically configurable, or can be set on user demand.

In step E320, the system fits ARIMA/GARCH time series model to the same business measure data series previously used in step E311. This is an iterative process of fitting the most parsimonious model, evaluating the fit residuals for stationarity, and raising the model complexity until sufficiently complex models have been tried and discarded. As before, to take advantage of machine learning, the model search process can be seeded with a lookup E150*r* in the EKDB Store to learn what has worked best in the past for the specific business measure. This lookup can also let the system know the results of the trend-seasonality model previously fitted in step E311, which might provide a good initial guess for the order of the time-series process.

In step E323, the system interprets the time-series model for the user, and further explains explaining the model class, order and the coefficients in business terms to better explain the underlying real-world business process. The system can also compare any shift in model class, order, or model coefficients against its own historical trend E324 retrieved from EKDB Store E150*r*, and save the fitted model in EKDB Store E150*w* for future use.

The system makes near term forecasts E315 with their prediction accuracy using the model just obtained.

At step E330, the system takes the two different models previously used to make near term forecasts, and compares the two sets of forecasts for their predicted values and prediction accuracy. In step E332, the complete analysis is presented to the user.

In some embodiments, a batch process can be used to build or prebuild the models previously discussed in FIGS. 26B-28, and also keep EKDB Store updated with respect to the historical record of various business measures in the PAMS store. This is shown in FIG. 29.

This type of prebuilding can be very useful in interactive use cases, where it is desirable to provide fast responses to user queries. A periodic batch task can be run, for example, on a daily or weekly basis to build a better historical record for the various modeling processes.

To do this, the date or time window for which the historical record is being prebuilt is fixed. This can be automatically set via system or user adjusted configurations.

Next, system retrieves the list of the various available business measures from the PAMS store. This list used to build the historical record for each business measure according an iterative or looping process described below.

- As the first step in the iteration, the process of FIG. 26B is executed for the business measure iteration case for when there are no user interactions. As the final outcome of this step, a set of data attributes are output for additional analysis.
- As the second step in the iteration, the process of FIG. 27 is executed for the business measure iteration case for when the initial set of data attributes are taken from the output of the preceding step, and there are no user interactions.
- As the third step in the iteration, the process of FIG. 28 is executed for the business measure iteration case where there are no user interactions.
- As the final step in the iteration, the fact of having completed the iteration is logged.

This completes the steps for the business measure of iteration.

Trademarks: SAP HANA® is the trademark of SAP AG.

The invention claimed is:

1. An automated method of executing machine self-learning methods to detect and report measurements of a plurality of real-world processes, said real world processes comprising a plurality of real-world things and/or real-world activities, and wherein at least some of said real-world things and/or activities are linked together to form real-world processes, said method comprising:

receiving, by at least one computer processor, raw data properties pertaining to said real-world things and activities, said raw data properties comprising when-where data, attribute data, identifier data, and quantity data associated with said real-world things and activities;

wherein at least some attribute data comprise link attribute data, and wherein at least some identifier data comprise thing-activity identifier data;

creating and storing, by said at least one computer processor, in real time as said raw data properties are received, said raw data properties, thing-activity identifier data and any link attribute data in a process aganostic database system (PADS) database; as PADS database objects, said PADS database objects comprising object header information and at least one set of when-where data, attribute data, thing-activity identifier data, quantity data and object exception information;

continually executing measures rules to select data from said PADS database objects, irrespective of process, according to any of date, quantity/amount, and location based parameters, and continually operating on said measures rules selected data with measures rules selected transformations, thus continually creating measures rules selected and transformed data, and continually storing said measures rules selected and transformed data in a process agnostic measure store (PAMS) database;

wherein said measurements rules comprise algorithms for producing time-adjusted and corrected data obtained from said PADS database; and wherein said transformations comprise algorithms to fit at least some of said measurements into at least one model showing trends in said measurements over time;

and executing machine self-leaning methods to analyze said PAMS database and output a plurality of measurements according to said measures rules and measures transformations.

2. The method of claim 1, wherein said machine self-learning methods are implemented on a machine self-learning system comprising an Experience Knowledge Database (EKDB).

3. The method of claim 1, wherein at least some of said raw data properties are received from a human or automated user by a remote computerized device and a network connection;

wherein said remote computerized device has at least one remote processor;

wherein said at least one remote processor is configured to obtain said raw data properties from said user, and automatically link said raw data properties to said object header information;

thereby receiving, by said at least one remote processor and said network connection, raw data properties from said user along with said object header information.

4. The method of claim 1, wherein at least some of said raw data properties are received from a human or automated user by a remote computerized device and a network connection;

wherein said remote computerized device has at least one remote processor;

wherein said at least one remote processor is configured to obtain said raw data properties from said user, and automatically link said raw data properties to said thing-activity identifier data;

thereby receiving, by said at least one remote processor and said network connection, raw data properties from said user along with said thing-activity identifier data.

5. The method of claim 1, wherein said real-world processes are business processes, said real world things comprise products that are goods, and wherein said activities comprise activities selected from the group consisting of putting products on hold, releasing products for delivery, shipping products, product sales, product returns, changing one or more raw materials to work-in-process goods or finished goods, creating purchase orders for products, creating purchase orders for raw materials for a product, delay in receiving products, and delay in receiving raw materials for a product; or
   wherein said real world things are selected from the group consisting of customers, vendors, raw materials, materials, and finished goods
   or wherein said real world activities comprise various material movement & manufacturing steps of a manufacturing & distribution process, marketing activities, financial activities, real estate activities, personnel activities, regulatory activities, and quality assurance activities.

6. The method of claim 1, wherein
   said PADS database objects comprise process agnostic objects that handle said raw data according to generic data models and machine self-learning processor imlemented methods executed on said at least one computer processor;
   wherein said object header information is received along with said raw data properties, or wherein said object header information is obtained by said at least one computer processor to compare said raw data properties against a previously defined set of categories of real-world things and activities, and classifying said raw data according to said previously defined categories of real-world things and activities, thereby determining said object header information;
   wherein said object exception information is obtained by said at least one computer processor to compare said raw data properties against a previously defined baseline properties of said previously defined set of real-world things and activities to further determine if any of said raw data properties represent an exception from said baseline properties, and if said exception is found, storing it as object exception information;
   wherein PADS database objects comprising at least one stored object exception information are exception marked PADS database objects;
   linking, by said at least one computer processor, at least some different PADS database objects comprising data pertaining to real-world things and activities together to form real-world processes by setting said link attribute data in said different PADS database objects to create said links according to at least one set of process linking rules;
   wherein PADS database objects linked together by setting said linked attribute data are linked PADS database objects; and
   wherein said method continually uses said measures rules to select data from said PADS database objects.

7. The method of claim 6, wherein analyzing, by said at least one computer processor and at least one algorithm, said exception marked PADS database objects and linked PADS database objects and determine an impact of said exception marked PADS database objects and linked PADS database objects on a status of at least some of said real world processes, and updating said PAMS database, is done either on a real-time basis as said data properties are received, or on a non-real time basis as determined by schedules set according to other criteria.

8. The method of claim 6, wherein a given PADS database object comprising data pertaining to real world activities is linked with zero or more different PADS database objects comprising data pertaining to real world things, and wherein said given PADS database object is also linked with zero or more different PADS database objects comprising data pertaining to different real world activities; and
   further altering, by said at least one processor, at least some of said links according to at least one set of business process link configuration rules.

9. The method of claim 6, further analyzing, by said at least one computer processor and at least one algorithm, said exception marked PADS database objects and linked PADS database objects and determining an impact of said exception marked PADS database objects and linked PADS database objects on a status of at least some of said real world processes, thereby determining real-world process exceptions;
   and outputting, by said at least one computer processor, data pertaining to at least some of said real world process exceptions.

10. The method of claim 9, further analyzing, by said at least one computer processor, said machine self-learning methods, and impact analysis rules, said real world process exceptions according to said object exception information, and said link attribute data, of their respective PADS database objects, thereby determining at least one of an urgency, magnitude of impact, and cost of inaction the impact of said exceptions on said real world processes, and outputting data pertaining to at least some of said real world process exceptions according to at least one of said urgency, magnitude of impact, and cost of inaction of said exceptions on said real world processes.

11. An automated method of executing machine self-learning methods to detect and report measurements of a plurality of real-world processes, said real world processes comprising a plurality of real-world things and/or real-world activities, and wherein at least some of said real-world things and/or activities are linked together to form real-world processes, said method comprising:
   receiving, by at least one computer processor, raw data properties pertaining to said real-world things and activities, said raw data properties comprising when-where data, attribute data, identifier data, and quantity data associated with said real-world things and activities;
   wherein at least some attribute data comprise link attribute data, and wherein at least some identifier data comprise thing-activity identifier data;
   creating and storing, by said at least one computer processor, in real time as said raw data properties are received, said raw data properties, thing-activity identifier data and any link attribute data in a process agnostic database system (PADS) database as PADS database objects, said PADS database objects comprising object header information and at least one set of when-where data, attribute data, thing-activity identifier data, quantity data and object exception information;
   said PADS database objects being process agnostic objects that handle said raw data according to generic data models and machine self-learning methods executed on said at least one computer processor;

wherein said object header information is received along with said raw data properties, or wherein said object header information is obtained by said at least one computer processor to compare said raw data properties against a previously defined set of categories of real-world things and activities, and classifying said raw data according to said previously defined categories of real-world things and activities, thereby determining said object header information;

wherein said object exception information is obtained by said at least one computer processor to compare said raw data properties against a previously defined baseline properties of said previously defined set of real-world things and activities to further determine if any of said raw data properties represent an exception from said baseline properties, and if said exception is found, storing it as object exception information;

wherein PADS database objects comprising at least one stored object exception information are exception marked PADS database objects;

linking, by said at least one computer processor, at least some different PADS database objects comprising data pertaining to real-world things and activities together to form real-world processes by setting said link attribute data in said different PADS database objects to create said links according to at least one set of process linking rules;

wherein PADS database objects linked together by setting said linked attribute data are linked PADS database objects;

b) continually executing measures rules to select data from said PADS database objects, irrespective of process, according to any of date, quantity/amount, and location based parameters, and continually operating on said measures rules selected data with measures rules selected transformations, thus continually creating measures rules selected and transformed data, and continually storing said measures rules selected and transformed data in a process agnostic measure store (PAMS) database;

and executing machine self-leaning methods to analyze said PAMS database and output a plurality of measurements according to said measures rules and measures transformations.

12. The method of claim 11, wherein said measurements rules comprise algorithms for producing time-adjusted and corrected data obtained from said database; and wherein said transformations comprise algorithms to fit at least some of said measurements into at least one model showing trends in said measurements over time.

13. The method of claim 11, wherein said machine self-learning methods are implemented on a machine self-learning system comprising an Experience Knowledge Database (EKDB).

14. The method of claim 11, further analyzing, by said at least one computer processor and at least one algorithm, said exception marked PADS database objects and linked PADS database objects and determining an impact of said exception marked PADS database objects and linked PADS database objects on a status of at least some of said real world processes, thereby determining real-world process exceptions;

and outputting, by said at least one computer processor, data pertaining to at least some of said real world process exceptions.

15. A machine self-learning system for automatically detecting and reporting measurements of a plurality of real-world processes, said real world processes comprising a plurality of real-world things and/or real-world activities, and wherein at least some of said real-world things and/or activities are linked together to form real-world processes, said system comprising:

at least one computer processor and memory;

process agnostic database system (PADS) database object management methods stored in said memory, said PADS database object management methods configured to direct said at least one computer processor to receive raw data properties pertaining to said real-world things and activities, said raw data properties comprising when-where data, attribute data, identifier data, and quantity data associated with said real-world things and activities;

wherein at least some attribute data comprise link attribute data, and wherein at least some identifier data comprise thing-activity identifier data;

said PADS database object management methods further configured to direct said at least one computer processor to create and store in said memory, in real-time as said raw data properties are received, said raw data properties, thing-activity identifier data and any link attribute data in a PADS database as PADS database objects, said PADS database objects comprising object header information and at least one set of when-where data, attribute data, thing-activity identifier data, quantity data and object exception information;

said PADS database objects being process agnostic objects that handle said raw data, according to generic data models and at least one computer processor configured to run machine self-learning methods;

wherein said PADS database object management methods are further configured to direct said at least one computer processor to receive said object header information along with said raw data properties, and/or wherein said PADS database object management methods are further configured to direct said at least one computer processor to obtain said object header information by comparing said raw data properties against a previously defined set of categories of real-world things and activities, and to classify said raw data according to said previously defined categories of real-world things and activities, thereby determining said object header information;

wherein said PADS database object management methods are further configured to direct said at least one computer processor to link at least some different PADS database objects comprising data pertaining to real-world things and activities together to form real-world processes by setting said link attribute data in said different PADS database objects to create said links according to at least one set of process linking rules;

wherein PADS database objects linked together by setting said linked attribute data are linked PADS database objects;

wherein said at least one computer processor is further configured to measures rules to select data from said PADS database objects, irrespective of process, according to any of date, quantity/amount, and location based parameters, and continually operate on said measures rules selected data with measures rules selected transformations, thus continually creating measures rules selected and transformed data, and to continually store said measures rules selected and transformed data in a process agnostic measure store database (PAMS) database; and wherein said at least one computer processor is further configured to use machine self-leaning methods to analyze said PAMS database and output a plurality of measurements according to said measures rules and measures transformations.

16. The system of claim 15, wherein said measurements rules comprise algorithms for producing time-adjusted and corrected data obtained from said database; and wherein said transformations comprise algorithms to fit at least some of said measurements into at least one model showing trends in said measurements over time.

17. The system of claim 15, wherein said machine self-learning methods further implement a machine self-learning system comprising an Experience Knowledge Database (EKDB).

18. The system of claim 15, wherein said PADS database object management methods are further configured to direct said at least one computer processor to obtain said object exception information by comparing said raw data properties against a previously defined baseline properties of said previously defined set of real-world things and activities to further determine if any of said raw data properties represent an exception from said baseline properties, and if said exception is found, storing it as object exception information; and wherein PADS database objects comprising at least one stored object exception information are exception marked PADS database objects.

19. The system of claim 18, wherein said PADS database object management methods are further configured to direct said at least one computer processor configured to execute at least one algorithm to analyze said exception marked PADS database objects and linked PADS database objects and determine an impact of said exception marked PADS database objects and linked PADS database objects on a status of at least some of said real world processes, thereby determining real-world process exceptions;

and wherein said PADS database object management methods are further configured to direct said at least one computer processor to output data pertaining to at least some of said real world process exceptions.

* * * * *